US009449183B2

(12) United States Patent
Wu

(10) Patent No.: US 9,449,183 B2
(45) Date of Patent: Sep. 20, 2016

(54) SECURE FILE DRAWER AND SAFE

(76) Inventor: Jianqing Wu, Beltsville, MD (US)

(*) Notice: Subject to any disclaimer, the term of this patent is extended or adjusted under 35 U.S.C. 154(b) by 1124 days.

(21) Appl. No.: 13/360,722

(22) Filed: Jan. 28, 2012

(65) Prior Publication Data

US 2013/0198521 A1 Aug. 1, 2013

(51) Int. Cl.

| | | |
|---|---|---|
| *H04L 9/32* | (2006.01) | |
| *G06F 21/62* | (2013.01) | |
| *G06F 21/64* | (2013.01) | |
| *H04L 9/08* | (2006.01) | |
| *H04L 9/14* | (2006.01) | |
| *H04L 29/06* | (2006.01) | |

(52) U.S. Cl.
CPC ....... *G06F 21/6209* (2013.01); *G06F 21/6245* (2013.01); *G06F 21/645* (2013.01); *H04L 9/0894* (2013.01); *H04L 9/14* (2013.01); *H04L 9/3263* (2013.01); *G06F 2221/2107* (2013.01); *H04L 63/0428* (2013.01)

(58) Field of Classification Search
CPC ........... G06F 21/6209; G06F 21/6245; G06F 21/645; G06F 2221/2107; H04L 9/0894; H04L 9/14; H04L 9/3263; H04L 63/0428
See application file for complete search history.

(56) References Cited

U.S. PATENT DOCUMENTS

| | | | | |
|---|---|---|---|---|
| 7,373,517 B1* | 5/2008 | Riggins | ................. | H04L 9/0863 380/44 |
| 8,140,847 B1* | 3/2012 | Wu | ............................... | 713/175 |
| 8,543,816 B2* | 9/2013 | Mercer | ................. | G06F 21/606 705/2 |
| 9,294,267 B2* | 3/2016 | Kamath | ................. | H04L 9/0822 |
| 2002/0046188 A1 | 4/2002 | Burges et al. | | |
| 2002/0111946 A1 | 8/2002 | Fallon | | |
| 2003/0163433 A1* | 8/2003 | Lam et al. | ....................... | 705/71 |
| 2005/0203885 A1* | 9/2005 | Chenevich et al. | .............. | 707/3 |
| 2006/0106822 A1* | 5/2006 | Lee et al. | ........................ | 707/100 |
| 2006/0179155 A1* | 8/2006 | Bunting et al. | ................ | 709/232 |
| 2007/0220614 A1 | 9/2007 | Ellis et al. | | |
| 2007/0276754 A1* | 11/2007 | Parmelee et al. | ................ | 705/43 |
| 2008/0082821 A1* | 4/2008 | Pritikin | ......................... | 713/169 |
| 2010/0223456 A1* | 9/2010 | Schneider | ...................... | 713/152 |

OTHER PUBLICATIONS

SecretSync et al (retrieved from https://web.archive.org/web/20111228030152/http://getsecretsync.appspot.com/download/lifehacker, Dec. 28, 2011, pp. 1-2).*
DataVault et al (Datavault for Android User Guide, Oct. 27, 2011, pp. 1-9).*
Safely sync your confidential files; access date Jan. 13, 2012; source: http://getsecretsync.com/ss/getstarted.

* cited by examiner

*Primary Examiner* — Jung Kim
*Assistant Examiner* — James J Wilcox
(74) *Attorney, Agent, or Firm* — Jianqing Wu

(57) ABSTRACT

An online file storage system comprising individual secure file drawers and safes is disclosed for securely storing and sharing confidential files. The system comprises a web-based user interface, tools for setting up server-side encryption method and client-side encryption method, tools for synchronizing encryption between different computers, tools for uploading files, tools for tracking files, tools for granting the right of access to files to the owners of other safes, and tools for generating authenticity certificates for proving the upload time and the substance of the files in a future time.

23 Claims, 46 Drawing Sheets

Register User Account

| | | |
|---|---|---|
| Safe Name | [_____] | ← 205 |
| *Password | [_____] | ← 210 |
| *Re-type Password | [_____] | |
| Email Address | [_____] | |
| Access Code | [_____] | |
| First Name | [_____] | |
| Last Name | [_____] | |
| Title | Select title ▼ | |
| Street Address | [_____] | |
| City | [_____] | |
| State | Select a state ▼ | |
| Zip | [_____] | |
| Phone | [_____] | |
| Security Question | Where was you born? ▼ | ← 215 |
| Answer | [_____] | ← 220 |

[Register]   [Clear Form]

FIG. 2A

Login Your Account

Log in Name
Password

[Log In] [Clear Form]

Forget Password?
If you do not have a safe account,
You can create a free safe, click sign up.

File Summary | Account | Access Management | Certificate | Upload File | Download File Safe: Person1      Today date: Thursday 1/21/2012

Account Details
Change Password
Update Account
Recover Password
Set up Server Encryption Method
Set up Client Encryption Method

— 225

Change Password for Safe: Person 1

Old Password
New Password
Re-type Password

[Change] [Clear Form]

If your password is changed successfully, a confirmation will be sent to your email address!

FIG. 3A

Back to Home

Reset Your Password

Type in your account name and click the Continue button, you will be presented with a security question.

Your Login Name [        ]

[Continue]  [Clear Form]

FIG. 3B

Enter Answer to the Security Question

Type your answer to the security question, your password will be sent to your email address!

Your security question:
  Where is the place you visited on May 13, 2005?

Your Security Answer [        ]

[Recover]  [Clear Form]

FIG. 3C

| Safe: Person3 | Today date: Thursday 1/10/2012 |

Change Password

Warning : At lease one person knows your password. You must change your password before you can use the account.

Old Password
New Password
Re-type Password

[Change]  [Clear Form]

FIG. 4

Set Up Default Encryption Method

Encryption Key: TREY YUTR TRED BVCX YTRE FDSJ — 505

Mark for Encryption Synchronization:
- ◉ Use following text
  - Your Encryption Key Is OK. — 510
- ○ Select a file format and a file path
  - JPG ▼ [_____] Browse

Mark's Storage Location on the Server: — 515
- ◉ Folder: Server's property folder ▼
- ○ Database: User table, mark field ▼

Search Order for Finding Encryption Key on Client:
1. Browser cookies ▼ — 520
2. Specific system folder ▼
3. User data folder ▼

Default Encryption Key Location on Client: — 525
USB Drive ▼

☒ Encrypt files on the client computer ← 526
☒ Encrypted files are uploaded as server-encrypted files ← 527

[Submit] [Clear Form]

FIG. 5A

| File Summary | Account | Access Management | Certificate | Upload File | Download File |

Safe: Person1　　　　　　　　　　　　　　　　Today date: Thursday 1/21/2012

Upload a File to Safe

Select An Encryption Method

○ Upload file to your file drawer　—601
　Key Status: | Your Encryption Key is OK |

◉ Use one private key [Help]　—602

| Key Hint | Single-key memo |
| Key | ******************** |
| Re-type key | ******************** |

○ Use two private keys [Help]　—603
○ Upload encrypted file　—604
　File Sharing Status:　—605
　　◉ Private ○ Share ○ Global

Usage Information

| Max File No | 100 |
| Used File No | 20 |
| Max Size (K) | 102400 |
| Used Size (K) | 38.7 |

—610

[X] Encrypt file on client　[ ] Encrypted file as one-key encryption file
　—606　　　　　　　　　　　　—607

Description　—608

| June 12, 2001 meeting memorandum |

Select A File　—609

| /root/Desktop/testfile.pdf | Browse |

[ Upload ]　　[ Clear Form ]

FIG. 6A

Your file was uploaded successfully

| | |
|---|---|
| File No | 0000-0000-0000-0005 |
| Description | Text file |
| Size (K) | 12.8 |
| Upload Time | 01/10/2012 18:42:07 |
| Encryption Method | Single Key |
| Safe Name | Person 1 |
| Safe Owner Name | White Smith |

Would you like to verify that your uploaded file is good?

◉ Yes (Strongly recommended )  — 611, 612

| | |
|---|---|
| Your hint for key | June 12 meeting memorandum |
| Type encryption key | ******************************** |

[ Yes ]   [ Verify Later ]

Opening test_file.txt

You have chosen to open
☐ test_file.txt
   which is file from http://localhost:9080
What should Firefox do with this file?

◉ Open with    [ Text Editor (default)      ▲ ]
○ Save to Disk
☐ Do this automatically for files like this from now on.

[ Cancel ]   [ OK ]

FIG. 6C

Confirm Uploaded File's Condition

Server: Now please save the file and verify it.

| | |
|---:|:---|
| File No | 0000-0000-0000-0005 |
| Description | Text file |
| Size (K) | 12.8 |
| Upload Date/Time | 01/10/2012 18:42:07 |
| Encryption Method | Single Key |
| Safe | Person 1 |
| Safe Owner Name | White Smith |

Can you open and read the file?

Yes    No

| File Summary | Account | Grant Access | Certificate | Upload File | Download File |
| --- |
| Download File | Send Message | Receive Message | Global Search | Decrypt File |

| Safe name | Safe owner | Safe No | Access code |
| --- | --- | --- | --- |
| Person 1 | White Smith | 0000-0000-0000-0005 | 100001 |

— 710     FILE SUMMARY     — 700
— 705

Your Own Safe     Other User's Safes     Your File Drawer

Files in Your Own Safe

| File No. | Description | Uploading Date/Time | Size (K) | Encryption | Share | EC | Action |
| --- | --- | --- | --- | --- | --- | --- | --- |
| 0000-0000-0000-0027 | Persona file For party | 09/15/2008 18:54:01 | 199.5 | Two Keys | Private | V | Decrypt |
| 0000-0000-0000-0025 | Test file | 09/13/2008 22:36:24 | 0.3 | Single Key | Active | UV | Download |
| 0000-0000-0000-0024 | Test file 2 | 09/16/2008 11:33:48 | 52.3 | Encrypted File | Active | | Download |
| 0000-0000-0000-0023 | Inactive file | 09/13/2008 21:33:58 | 0.2 | Safe Password | Active | | Download |
| 0000-0000-0000-0022 | Back recd | 07/13/2008 21:29:15 | 0.2 | Not Encrypted | N/A | | Download |

12 Records | 1 ▼ of 3 pages | 5 ▼ Per Page | First | Back | Next | Last

FILE SUMMARY

Your own Safe    Other User's Safes    Your File Drawer

Files You Have Right to Access

| File No. | Owner | Description | Size (K) | Uploading Date/Time | Encryption | Access Type |
|---|---|---|---|---|---|---|
| 0000-0000-0000-0012 | Person 2 | Software Development plan | 199.5 | 09/15/2011 14:10:12 | Two keys | Decrypt |
| 0000-0000-0000-0020 | Person 4 | House plan | 20.5 | 09/13/2011 05:45:13 | Encrypted | Download |
| 0000-0000-0000-0050 | Geen Bay | Business Plan | 48.5 | 04/15/2011 12:00:24 | One key | Decrypt |

10 Records | 1 ▼ of 1 pages | 3 ▼ Per Page | First | Back | Next | Last

FIG. 7B

FILE SUMMARY

Your Own Safe    Other User's Safes    Your File Drawer

Files in Your File Drawer

| File No. | Description | Size (K) | Uploading Date/Time | Action |
|---|---|---|---|---|
| 0000-0000-0001-0050 | Software Source Code | 123.5 | 09/15/2011 14:10:12 | Download |
| 0000-0000-0001-0055 | House Bidding Prices | 30.5 | 09/13/2011 05:45:13 | Download |
| 0000-0000-0001-0076 | Will | 30.7 | 04/15/2011 12:00:24 | Download |
| 0000-0000-0001-0086 | Business Plan June 12, 2010 | 48.5 | 04/15/2011 12:00:24 | Download |

10 Records | 1 ▼ of 1 pages | 3 ▼ Per Page | First | Back | Next | Last

FIG. 7C

| Download File | |
|---:|:---|
| File No. | 0000-0000-0000-0001 |
| File Owner | Person 1 |
| Description | Promotion Plan |
| Size (K) | 200.2 |
| Encryption Method | Common Key |
| Total Access Number | |
| The Accesses You Have Used | |
| The Access Number Remaining | |
| Your Access Right Will Expire | |

Submit   Close

FIG. 7D

Descrypt & Download File

Message : File is download successfully. —735

| | |
|---|---|
| File No. | 0000-0000-0000-0001 |
| File Owner | Person 1 |
| Description | Promotion Plan |
| Size (K) | 200.2 |
| Encryption Method | Common Key |
| Total Access Number | |
| The Accesses You Have Used | |
| The Access Number Remaining | |
| Your Access Right Will Expire | |

(regardless of the number of remaining access.)

WARNINGS: If you do not provide keys, you will not be able to Decrypt, download and read this file.

⦿ Decrypt & Download (Provide your key(s)) —740

| | |
|---|---|
| Your hint for Key | Using June 12, 2001 memo |
| Enter your Key | ************************ |

○ Download

[Submit]  [Close]

FIG. 7F

| File Summary | Account | Access Management | Certificate | Upload File | Download File |

Safe: Person1  Today date: Thursday 1/21/2012

View File Details

Delete File
Change File Status
Change Access Right
Order Certificate
View Encrypted Details
View Access History 800
801 →

File Details

| | |
|---|---|
| File Number | 0000-0000-0000-0005 |
| Description | Text file |
| File Size | 12.8 |
| Upload Date/time | 01/10/2012 18:42:07 |
| Encryption Key | Single Key |
| Status | Global |

Third Party Having Right to Access the File

| Safe Name | Access Code | Type |
|---|---|---|
| Person 4 | 100004 | Summary |
| Mount Boy | 100232 | Decrypt |

FIG. 8A

Change File Status

| File No. | 0000-0000-0000-0009 |
|---|---|
| Current Status | Share-able |

802 → ● Private    ○ Share-able    ○ Global

Share-able: Right of access may be granted to any safe.
Private: Right of access may not be granted to any safe.
Global: Anyone can get the file, but need key to read it.

[Change] [Cancel]

FIG. 8B

Grant Access Right (Step 1)

Message: Access Right for following file has been granted (Detailed File Information as shown in the start page.)

Enter Recipient Safe and Access Code:     — 816

(To create a safe, click "CREATE")
(To find access code for a safe, click "FIND")

| Safe Name (CREATE) | Person 2 |
|---|---|
| Access Code(FIND) | 100006 |

More Recipient Safe    Fewer Recipient Safe
— 817 —                                        — 818

Provide Access Definition:

| Type of Access | Access No Limit | Access Time Limit |
|---|---|---|
| ○ View Summary only | ○ 3 times | ○ 3 days |
| ○ View Summary/Download | ○ 10 times | ○ 10 days |
| ◉ Download & Decrypt File | ○ ☐ times | ○ ☐ days |
|  | ◉ No limit | ◉ No limit |

[Continue]   [Back]

FIG. 8F

Order Authenticity Certificate

[View E-Certificates] [View Hard-copy Certificate]

Order New Certificate [Help] — 870

Select Certificate Type for the Following File

| File No. | Description | Ordered E-Certificate |
|---|---|---|
| 0000-0000-0000-0005 | text file | View |

⊙ Order Electronic Certificate — 871
○ Order Hard-Copy Certificate — 872

[Continue] [Clear Form]

Order Electronic Certificate (Step 1)

You Have selected the following file for certificate

| File No. | Uploading Date/Time | Size (K) | Description | Status |
|---|---|---|---|---|
| 0000-0000-0000-0005 | 09/16/2008 18:42:07 | 12.8 | Text file | Active |

Enter Recipient Safe: — 873

| Safe Name (CREATE) | Person 2 |
|---|---|
| Access Code (FIND) | 100006 |

More Recipient Safe  Fewer Recipient Safe

[Submit] [Back] [Clear Form]

FIG. 8L

Order Electronic Certificate (Step 2)

Server: Electronic Certificate is Ordered Successfully for the following file.

| File No. | Uploading Date/Time | Size (K) | Description | Status |
| --- | --- | --- | --- | --- |
| 0000-0000-0000-0005 | 09/16/2008 18:42:07 | 12.8 | text file | Active |

To view PDF certificate, click here.

Do you want to order another certificate?

Yes    No

Order Hard-Copy Certificate (Step 1)
You Have selected the following file for certificate

| File No. | Uploading Date/Time | Size (K) | Description | Status |
|---|---|---|---|---|
| 0000-0000-0000-0005 | 09/16/2008 18:42:07 | 12.8 | Text file | Active |

A. Enter Recipient Safe (Optional) ← 875

| Safe Name (CREATE) | Person 2 |
|---|---|
| Access Code (FIND) | 100006 |

More Recipient Safe    Fewer Recipient Safe

B. Enter Recipient Address    Use the recipient safe address ☐
← 876

| Prefix | Select title ▼ |
|---|---|
| First Name | |
| Last Name | |
| Street Address | |
| City | |
| State | Select a state ▼ |
| Zip | |
| Phone | |
| Country | ▼ |

C. Include file to be certified: ☒ ← 877

[Continue] [Back] [Clear Form]

FIG. 8N

Order Hard-copy Certificate (Step 2)
Select Additional Madia for Sending Files ← 878

| File No. | Decryption Keys | Encrypted files on CD | Decrypted files on CD | Hard Copy Certificate |
|---|---|---|---|---|
| 0000-0000-0000-0005 | ************ | ☐ | ☒ | ☒ |

Submit    Back

FIG. 8O

Order Hard-Copy Certificate (Step 3)
Server: hard-copy certificate is ordered
successfully for the following file.

| File No. | Uploading Date/Time | Size (K) | Description | Status |
|---|---|---|---|---|
| 0000-0000-0000-0005 | 09/16/2008 18:42:07 | 12.8 | text file | Active |

To view PDF certificate, click here

What do you want to do next? ← 879

| Order a certificate for another safe | Go |
|---|---|
| Order another certificate for another file | Go |
| Go to File Summary | Go |

FIG. 8P

THIS IS TO CERTIFY THAT THE FOLLOWING FILES ARE STORED ON THE SECURE FILE SYSTEM

File No: 0708140233333104

Upload Date/Time: 08/14/2007 14:33:33

Size (K): 5.0

Description: This is a test file

Status: Active

By the chief security officer of the Secure data storage system of XYZ corporation.

To get a PDF version, click here. ← 900

FIG. 9

| File Summary | Account | Access Management | Certificate | Upload File | Download File |
| Download File | Send Message | Receive Messages | Global Search | Decrypt Files |

| Safe name | Safe owner | Safe No | Access code |
|---|---|---|---|
| Person 1 | White Smith | 0000-0000-00000005 | 100001 |

Access Management

| View Granted Access | Grant Access | Revoke Access |

— 1001

1002 → Grant New Access (Step 1)

Select Files For Granting Access Right:

| | File No. | Size (K) | Description | Encryption |
|---|---|---|---|---|
| ☒ | 0000-0000-0000-0010 | 0.2 | Test | Not Encrypted |
| ☒ | 0000-0000-0000-0008 | 12.8 | Test file | Single Key |
| ☐ | 0000-0000-0000-0007 | 0.2 | Test 2 | Two Keys |
| ☐ | 0000-0000-0000-0006 | 0.2 | Test 10 | Single Key |
| ☐ | 0000-0000-0000-0005 | 12.8 | Test file | Single Key |

8 Records | 1 ▼ of 2 pages | 5 ▼ Per Page | First | Back | Next | Last

[Continue] [Clear Selection] — 1003

FIG. 10A

Access Management — 1004

| View Granted Access | Grant Access | Revoke Access |

Grant New Access (Step 2) — 1005

| File No. | Size (K) | Description | Encryption |
|---|---|---|---|
| 0000-0000-0000-0010 | 0.2 | Test | Not Encrypted |
| 0000-0000-0000-0008 | 12.8 | Test file | Single Key |

A. Enter Recipient Safe and Access Code:

(To create a safe, click "CREATE")
(To find access code for a safe, click "FIND") — 1006

| Safe Name (CREATE) | Person 2 |
|---|---|
| Access Code(FIND) | 100006 |

More Recipient Safe    Fewer Recipient Safe
— 1007

B. Provide Access Definition: — 1008

| Type of Access | Access No Limit | Access Time Limit |
|---|---|---|
| ○ View Summary only | ○ 3 times | ○ 3 days |
| ○ View Summary/Download | ○ 10 times | ○ 10 days |
| ⊙ Download & Decrypt File | ○ ☐ times | ○ ☐ days |
| | ⊙ No limit | ⊙ No limit |

[Continue]  [Back]

FIG. 10B

Access Management

| | View Granted Access | Grant New Access | Revoke Access | |
|---|---|---|---|---|

Revoke Access

File No: [_____] — 1040  Recipient Safe: [_____] — 1041  [Search]

| | Recipient's Safe | File No. | Granted Date | Access Type | Access No. | Expiration Date | |
|---|---|---|---|---|---|---|---|
| [x] | person2 | 0000-0000-0000-0007 | 09/18/2008 14:53:43 | Download | NL | 09/28/2008 | Revoke |
| [x] | person2 | 0000-0000-0000-0008 | 09/18/2008 14:58:43 | Decrypt | 10 | 09/28/2008 | Revoke |
| [ ] | person2 | 0000-0000-0000-0010 | 09/18/2008 14:58:43 | Download | 10 | 09/28/2008 | Revoke |

[Revoke All] [Back]

Access Management

| View Granted Access | Grant New Access | Revoke Access |
|---|---|---|

Revoke Access — 1042

Server: Access right was revoked successfully.

File No: [_____]  Recipient Safe: [_____]  [Search]

| | Recipient's Safe | File No. | Granted Date | Access Type | Access No. | Expiration Date | Revoke |
|---|---|---|---|---|---|---|---|
| [ ] | person2 | 0000-0000-0000-0010 | 09/18/2008 14:58:43 | Download | 10 | 09/28/2008 | |

[Revoke All] [Back]

FIG. 10F

| File Summary | Account | Access Management | Certificate | Upload File | Download File |
| Download File | Send Message | Receive Messages | Global Search | Decrypt Files |

| Safe name | Safe owner | Safe No | Access code |
|---|---|---|---|
| Person 1 | White Smith | 0000-0000-00000005 | 100001 |

Certificate Management — 1100

| View E-Certificate | View Hardcopy Certificate | View Others' Certificate |

Order New Certificate [Help]

Select Files for the Following Files

| ☐ | File No. | Size (K) | Description | View electronic Certificate |
|---|---|---|---|---|
| ☒ | 0000-0000-0000-0010 | 0.2 | Test | View |
| ☒ | 0000-0000-0000-0008 | 12.8 | Test file | View |
| ☐ | 0000-0000-0000-0007 | 0.2 | Test 2 | View |
| ☐ | 0000-0000-0000-0006 | 0.2 | Test 10 | View |
| ☐ | 0000-0000-0000-0005 | 12.8 | Test file | View |

8 Records | 1 ▼ of 2 pages | 5 ▼ Per Page | First | Back | Next | Last

◉ Order Electronic Certificate — 1101
○ Order Hard-Copy Certificate

[Continue]  [Clear Form]

FIG. 11A

SECURE FILE DRAWER AND SAFE

FIELD OF THE INVENTION

The present invention generally relates to shared file storage systems and particularly to the secure remote file storage systems.

BACKGROUND OF THE INVENTION

Safe boxes are used for storing money, legal instructions, important intangible things, and important documents. Most banks lease conventional safe boxes to their customers for the storage of valuable items. If a subject stored in a conventional safe is a document, the safe can only preserve the document. It is not intended to prove what is on it and when the document starts its existence.

Banks provide conventional safes to customers for their convenience. After a customer rents a safe, the customer can store items in the safe for secure storage. Each time when the customer accesses the safe, the customer must personally visit the safe, present the key to a representative of the bank, and sign an access form which contains access date and time. The bank representative then uses both its key and the customer key to open the safe. This system is safe because the bank employees cannot open the safe without the customer key.

In providing this conventional safe service, the bank keeps track of each access by the customer, but makes no attempt to track the stored items as to their identities and deposit times. The user of the safe must make a trip to the bank for each access, stand and wait in a line for a customer representative, and sign an access log form. Due to the nature of this service, a customer can rent a safe only from a local bank or safe provider.

Since the advent of the Internet, it is obvious that digital files can be stored on a remote server. The service of accepting and maintaining files on a server has been long existed. Using a server to keep files is a natural extension of the server's storage capacity. The file storage systems have the common goal that they allow their users to get copies of the files from the servers if their original files are lost.

Some companies have provided file storage services by using an online file storage system for years. Those companies provide a central server where each of the remote customers is assigned a folder associated with a user account so that customers can store files. Some companies may provide additional features of improved security for the stored files. For example, the customer may encrypt the files using the password of the user account.

The online file storage system is similar to the conventional safe in its utility. When the originals of a customer are destroyed by fire, natural disasters, or acts of crimes, the customer may get a copy of the files from the server as the secondary evidence of the lost original files. Such secondary evidence is acceptable in court in the case that the originals are unavailable. Even if the secondary evidence is unacceptable in some cases, the copies can help the owner reconstruct information in the original files. However, the system does not provide any proof when each of the items starts its existence. Nor is it possible to authenticate the substance of the file. For example, after the original is destroyed in a fire, a person can question if a copy recovered from such a system is a true copy of the destroyed document.

Moreover, the current file storage system does not fully address all safety issues. In a typical system, files are encrypted using account password. This password must be stored on the server for authenticating the owner. Even if the password is stored in a hashed form, it is still possible to reverse the hashed form to the original password. Thus, as long as a security measure is based on account password, the files can be accessed by anyone who has access to the server. Moreover, after the password is used in encrypting files, it is very burdensome and risky to change it.

Nor the encryption methods used in some file storage systems can prevent hackers from accessing stored files. In such a system, hashed passwords and account names are kept in a file or database table. If a hacker gets this file by illegal means, the hacker can reverse all hashed passwords to real passwords for all accounts. Therefore, the hacker not only can get login names, but also can get the passwords for decrypting stored files. Therefore, this encryption method is not safe enough to prevent illegal and illegitimate access. Any safe system that uses account passwords as encryption keys is not secure enough for storing highly confidential information.

One obstacle to the clouds computing technologies is the at-rest data security while the public is much less concerned with data transport security. This opinion is based upon the observation that businesses and individuals are willing to use email to send confidential files, but much reluctant to save their confidential information and personal secrets on others' servers for storage. The users apparently take the chance that it is highly unlikely for someone to intercept their messages or jack their keys among millions of messages transmitting in the Internet.

Many noted key attack trials have demonstrated that key attacks are computationally infeasible. For AES-128, the key can be recovered with a computational complexity of $2^{126.1}$ using bicliques. For biclique attacks on AES-192 and AES-256, the computational complexities are $2^{189.7}$ and $2^{254.4}$ respectively. Related-key attacks can break AES-192 and AES-256 with complexities $2^{176}$ and $2^{99.5}$, respectively. Therefore, the security vulnerability is generally not in encryption algorithms.

The public does not have confidence in multiple-party security arrangements. While such arrangements can provide good protection against law-abiding people, it cannot prevent unlawful access for many reasons. First, the biggest problem arises from the insider jobs by those who are involved in the arrangement. Insider threats discourage the sharing of storage space. When a hacker is interested in acquiring secret information from a target user, the hacker can approach those knowing the target. Internal policy and law will not stop such contact. If secret information sought has a huge economic value, no private agreement can stop commercial espionage and conspiracy. Second, the entire infrastructure is vulnerable. For example, information transmitting on the Internet can be intercepted by middlemen, and passwords and encryption keys can be jacked in transmission; the whole database can be dumped and taken by an insider; the server software can be tampered to engage in unauthorized activities; and spy-ware and virus can be installed secretly on client computers to get confidential information, encryption keys, and passwords; and even the server itself can be tampered to capture the information in memory. Finally, all multiple-party security arrangements are vulnerable to abusive legal process. A person can file a lawsuit against another person, whether it is frivolous or for improper purpose, to gain subpoena right. By the time the case is dismissed, the person might have acquired the secrets. Those observations show that "trusted system," trusted vendors" and "trusts components" cannot be trusted.

Transport layer security and the public key infrastructure were considered a great protection of confidential data in transmission. However, its vulnerability has long been found. See "Keyjacking: the surprising insecurity of client-side SSL, John Marchesini et al., Computers & Security (2004). This article concluded by stating "we demonstrate via a series of experiments that this assumption does not hold with standard desktop tools, even if the browser user does all the right things. A fundamental rethinking of the trust, usage, and storage model might result in more effective tools for achieving the PKI vision."

Many file storage systems are developed on the basis of a flawed assumption that all people on the Internet play their games by rules, and thus true credentials and trust can be established. By implication, those systems can only stop law-abiding people from committing unlawful acts. The hackers do not follow any rules and they can use any unlawful means, including intercepting messages, bribing employees, soliciting secrets from third parties, and abusing the legal process. Data storage security cannot achieved by relying upon the rules and laws, corporate practices, moral standards, private contracts, criminal sanctions, trusted hardware components, trusted software components, trusted third parties, and trusted employees. The data on the public cloud must be treated as intelligence information sought by hostile entities, competitors and individual hackers. True data security in the Internet can be achieved only by two ways: messages transmission in anonymity and encrypting messages on the client computer.

Sending and storing messages in anonymity would be the most effective way of combating against targeted hacking operations, but it is inconsistent with the web protocols and the legal constraints. The internet is a high way with millions of transmitting messages in any moment. It is practically impossible for any hacker to capture all passwords, all encryption keys, and all messages. Each successful attack would require great financial resources and a long implementation time, from collecting intelligence information, exploring vulnerabilities, identifying and finding insiders, formulating a plan, to carrying out the plan. For a given hacking operation, the first thing a hacker would do is to determine a target, either based upon hacker's purpose, or the desire to seek certain type of information. For whatever objectives, sender and receiver identities and the detectable key words in transmitting messages are the first things that the hacker seeks. When a person sends a message with true identity concealed and without any red flags, no body would capture this message in a second time window. Even if a hacker has found a target person by other means, the hacker still lacks information necessary to associate the target person with a particular message in transmission. Hacking all messages is practically impossible.

Multiple-party security arrangements not only fail to prevent target attacks, but increase the vulnerability to target attacks. If a website has been identified as the attack target, little can be done to stop it. The third parties and their employees, the true identities of the target persons or entities, the published information concerning the site, and the detailed arrangements would serve as useful leads for the hacker to use in making an attack plan. In contrast, the hacker could not find any lead with respect to an anonymous message. To achieve the highest data security in transmission and at storage, one strategy is to eliminate or reduce unnecessary middlemen.

The other secure method is to encrypt the data on the client computer before the data are sent out. The security of the data depends upon if the encryption method is strong enough to be immune from cracking. Encryption of data on client computers presents an obstacle to encryption synchronization. One solution is employing a third party to manage encryption method and encryption key. The existence of the third party leaves valuable leads for hackers to seek.

Therefore, there is a need for a new online file storage system for storing files which can be easily accessed anywhere; there is a need for an online file storage system which is truly safe and secure; there is a need for an online file storage system which can provide proof as to the time of existence of the stored files and the substance of the files, when necessary; and there is a need for an online file storage system that allows other persons to access stored files for the purpose of establishing the substance of the stored files; and there is a need for an online file storage system capable of tracking the access history of the files.

SUMMARY OF THE INVENTION

The present invention is a secure file drawer, which provides plural file drawers for remote users to securely store files, which may be text files, application files, image files, video files, sound files, computer programs or source codes, executable programs, and anything that can be converted to digital files.

The user can have any of the files encrypted by using single encryption key, two-key combination, and a common private key. The keys are not permanently saved on the server, nor are kept by a third-party vendor. A file may be encrypted using a private key, may be encrypted by a shared key, and stored on database or in a folder, and accessed by other authorized users. Upon downloading, the server generates a page prompting the user to provide the keys for decrypting the file using the same encryption algorithm. The system also implements an optional method of determining if the client computer has encryption algorithm and keys that are compatible with the algorithm and keys used on the server. Therefore, the client computer can take over the encryption task from the server.

The synchronization of encryption method is realized by using an encryption mark. The user creates an encryption mark, encrypts the mark by a private key, and installs the encrypted mark ("E-mark"), preferably, at two locations on the server. By decrypting E-mark, the same user at a different client computer or a second user can knows if a user-provided key is identical to the key used to create the E-mark. The method may include an optional step of installing on the server a reference encrypted mark, known as R-mark, which is created by encrypting a copy of the mark by a permanent password. If a first mark produced by decrypting E-mark by a test algorithm and a test key is identical to a second mark produced by decrypting R-mark on the server, then the test algorithm and key are the same as what were used to encrypt the E-Mark. By using this method, the user is able to find a common encryption algorithm and common key for any client computers and any users who share the data. The system also provides an optional method of downloading an encryption algorithm to a client computer, and allowing the user to verify if the downloaded encryption algorithm is compatible with the encryption algorithm that has been used on the server or on the client when the encryption method was set up. This method allows client computers to take over server's encryption function. By using the client encryption method without any involvement of a third party and employees, the system can achieve the maximum data-transmission security and storage security technically possible.

The safe owner can also order an authenticity certificate that certifies the uploading date and time and the substance of the file. The user can grant the right of access to any file to other safes' users so that they can view, download and decrypt authorized files. The user can directly order authenticity certificates for other safe users, make the files accessible from recipient safes, and have them sent to recipients' email addresses. The user may order hard-copy files in encrypted or decrypted state together with an authenticity certificate for intended recipients.

The system of the present invention comprises a fully functional server connected to the Internet, at least one client computer that is connected to the server by a network connection. The system includes the features for creating an encryption mark and saving it on the server, determining if the user has provided the same encryption key and if the server and the client computer have a common encryption algorithm. The system includes measures for setting up server default encryption method, managing safe accounts, uploading files, encrypting the files according to user's choices, downloading files, changing the access status of files, viewing uploading date/time, file size, encryption method, and owner identity for each file. The system can grant the right of access to a file to the safes of other persons so that the other persons are allowed to download and decrypt the file and allows the user to order authenticity certificate for authenticating the uploading time and the substance of the file. The system may contain optional methods for verifying the condition of uploaded files, accessing files by any users from the outside of safe accounts, managing a safe by at least two owners, and printing a hard-copy certificates for authenticating the uploading time and substance of any of the files. Optionally, it has the features of maintaining file grant histories and file-accessing histories. The invention also includes a process and the program code for performing the functions and features of the system.

This online file storage system of the present invention is different from the conventional online file storage system in the capability of maintaining the file information for each file, encryption methods, access control structures, file sharing methods, and the methodology for proving the uploading time and the substance of each of the files.

Cracking encryption keys from an encrypted mark is more difficult because the hacker does not have any hint on the original mark and encryption key. Even if the hacker knows the mark's text, cracking the encryption key from the encrypted mark is more difficult than cracking the encryption key from a hashed key. Therefore, the encryption method of the present invention improves the at-rest data security.

The present invention has the promise to reduce the "at rest" risks from insider threats, disgruntled employees conspiracy, commercial espionage, breach of agreements, unlawful cracking and hacking, cold attack, and abusive legal process, but raises an implementation difficulty. Since the server does not save encryption keys, cracking encryption keys on the server side is nearly impossible, except under exceptional circumstances.

In a second aspect, the safety of transmitting encryption keys depends upon the transport layer security (TLS). Despite the known vulnerability, key jacking in transmission for unidentified senders and receivers are statistically impossible. Additional encryption methods may be used to increase the safety of the keys in transmission. To mitigate the risk of key jacking, the encryption keys should be transmitted in an innocent variable and in a hashed form or other encrypted form.

In the third aspect, key hacking from the server side of the invented system is more difficult. Encryption key's residence time on the server is to the minimum. The keys are deleted from the memory whenever an encryption and decryption is finished. This reduces the chance of cold attack. The attacker has only a limited time to reboot the server or remove memory chips to retrieve the keys, and key jacking by cold attack is therefore more difficult than key jacking from a key database. In comparison, getting the key from current "trusted" systems is relatively easy by those who have access to the server or know the details of the server.

In another aspect, the method can make exhaustive search more difficult. If a hacker gets the password file in a decrypted form or hashed form, it gives the hacker useful hints for cracking passwords. If the hacker knows that key length and permissible characters, the hacker can crack the encryption keys by searching narrowed ranges. Since this method allows the system to avoid saving encryption keys, the hacker would not know anything about the key. Without getting any help, "brute force" attack would be more difficult.

In yet another aspect of the present invention, the elimination of encryption keys on the server creates an inherent problem that users may use inconsistent encryption keys and make encryption method unworkable on the file drawer. However, the present invention provides a detailed process for synchronizing encryption key. Whenever an authorized user or the same user on a different client computer provides a wrong key, the user, the server, or the client computer will know the wrong key immediately. Therefore, the user can avoid disrupting the sharing of data.

Finally, by using client-side encryption method, the system will achieve the highest at-rest data security practically possible. In this case, the only thing a hacker can get is an encrypted mark. A hacker has little incentive to tamper with the creation of the encryption mark because the tampering of the process for creating the mark would prevent collection data. If the encrypted mark is created on a client, the user can fully control the encryption method. In this case, data encryption and encryption method synchronization are performed on all client computers. This would reduce the room for middleman interception and key jacking, and achieve the highest data security possible in both transmission and at storage. This method can reduce the impact of tampering server's application software because the server contains encrypted data only.

BRIEF DESCRIPTION OF DRAWINGS

FIG. 2A shows the page for registering a safe or user account.

FIG. 2B shows the page for logging in to a safe.

FIG. 3A shows the page for changing the password of the safe.

FIG. 3B shows the page for resetting or recovering account password.

FIG. 3C shows the page for entering a security question.

FIG. 4 shows the page for prompting the user to change password after the password has been exposed to someone else.

FIG. 5A shows the page for setting up an encryption method for the file drawer.

FIG. 6A shows the page for uploading files, showing the encryption mark "Your Encryption Key Is OK".

FIG. 6B shows the page for prompting the user to provide encryption key in a verification step after a file is uploaded.

FIG. 6C shows the file download dialog appearing in verifying an uploaded file.

FIG. 6D shows the page for prompting the user to confirm whether the uploaded file is good at the end of a verification test.

FIG. 7A shows an example view of "File Summary" with links for opening user's own safe, other user's safes, and the file drawer.

FIG. 7B shows "File Summary" of the files that the owner has right to access.

FIG. 7C shows the files in the secure file drawer.

FIG. 7D shows the page for downloading a file that does not require individual encryption key.

FIG. 7F shows the page for decrypting and downloading a file.

FIG. 8A shows "File Details," including uploading date/time, file size, encryption method, and other safes that have right to access together with a left-side menu.

FIG. 8B shows the page for changing the status of the file in the user own safe.

FIGS. 8E-8G show the pages for granting right of access for a single file to one or more safes.

FIGS. 8K-8M show the pages for ordering an electronic authenticity certificate for a single file.

FIGS. 8N-8P show the pages for ordering a hard-copy authenticity certificate for a single file.

FIG. 9 shows an example authenticity certificate.

FIGS. 10A-10C show the pages for granting right of access for a plurality of files in a safe.

FIGS. 10E-10F show the pages for revoking right of access for any of the files from safes.

FIG. 11A shows the page for invoking the pages for viewing authenticity electronic certificates, viewing ordered hard-copy authenticity certificates, viewing certificates from others safes.

DETAILED DESCRIPTION OF THE INVENTION

Files in this disclosure mean text files, word-processor files, image files, video files, sound files, and anything that is capable of being transmitted through the Internet.

A. The Components of the System

Figure 1:
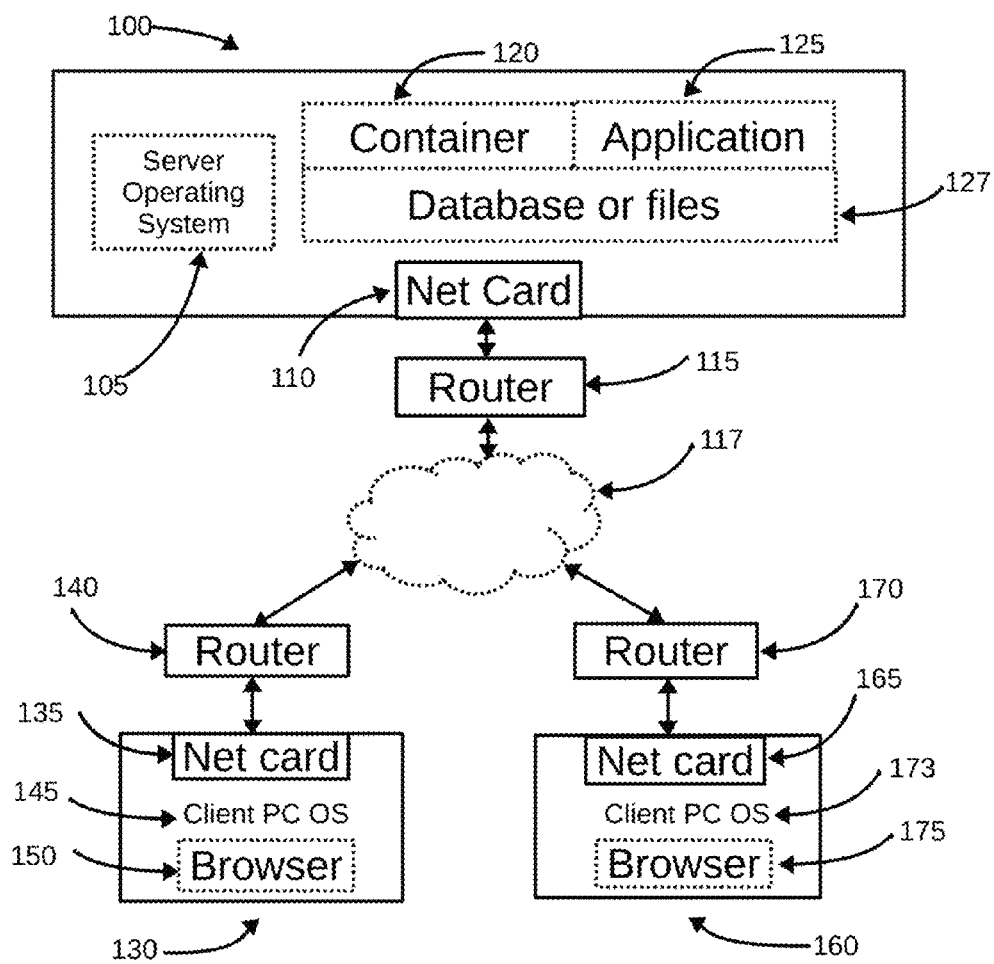
FIG. 1 shows the basic hardware components of the Secure File Drawer and Safe of the present invention.

The system of the present invention (FIG. 1), also referred to as secure file drawer and safe, comprises a server 100 and client computers 130 and 160, all of them are connected in a network so that they are able to exchange data using common data transmitting protocol such as TCP. Each of the client computers is able to access the server using WWW protocol and access the web pages sent by the server according to any of the current standard HTTP protocols (1.0, 1.1, and 1.2).

The server 100 runs an operating system 105 and is fully functional, has a network interface 110, and is connected to the Internet 117 through a router 115. In one version of the embodiment, the server is an Intel D945PNS motherboard with a Pentium D 840 processor operated by Fedora Core 5. Although the system came with a package of Java tool, a Java Development Kit (JDK version 1.5.06) is installed for compiling Java class files. In the ext folder inside the lib folder of the Java Runtime Environment (/usr/share/jdk/jre/lib/ext), activation.jar and mail.jar are placed. To handle file uploading, a package known jspsmartupload (or equivalents), which includes several class files, is used. The server is installed with Apache Tomcat 5.5.15 and MYSQL 5.0.27, which come with the system. To allow Tomcat's Java class component to access the MYSQL database, mysql-connector-java.jar is placed inside the lib folder under the common folder of the Tomcat installation folder.

The client computer 130 is also operated by its own operating system, has a network interface 135, and is connected to the Internet 117 through an interface 140. The client computer 130 runs a browser or a similar HTML rendering application so that it is able to browse standard web pages rendered by the server 100. Optionally, a second computer 160, which is also operated by its own operating system 173, has a network interface 165 and HTML rendering application 175, and is connected to the Internet 117 through its router 170.

A database application 127 such as MYSQL is used for safe account management and for storing files. If speed and productivity is not an issue, it can be completely dispensed with. For example, Perl database may be used as an alternative. Files may be stored in folders.

All server application files developed for the present invention are placed in one single application folder 125. The source code files in JSP format are directly placed in this application folder or sub-folders, and Java class components are placed in the class folder under WEB-INF. The WEB-INF folder includes two folders: lib and classes. The lib folder contains some jar files for run-time use. Each of the Java class files is compiled to form a class file by using Javac from Java Development Kit (1.5.06), whose jre/lib/ext contains necessary API jar files.

Since this system is intended to securely keep highly confidential files with a capability of verifying the existence of the files and substance of the files in the event of the loss of the original files, it is desirable that the system is deployed in at least two separate data facilities. If duplicate data facilities are unavailable, it is necessary to backup files on two sets of permanent media and the backup media are stored in two separate locations. If the data residing on the system's hard disks are permanently lost or irrecoverably damaged, the backup data media at the second location may be used to retrieve files.

B. Use of the Secure File Drawer and Safe

The main use of the system is that a user can upload important files that are encrypted by user-provided keys. When the user needs to prove the earliest creation time, existence, and substance of the file, the user can download it from the server with a certificate. The system provides at least two menus: Access my Safe and Register a safe. In addition, user instructions menu may be placed on a home page as an option so that a prospective user can learn its basic concepts.

First, a user can open a safe or user account from the client computer and log in the safe. After the user logs in, the user can see all of the files in the safe and the files of other safes the user has right to access. Second, the user can set up an encryption method for the server and for the client computer's session. Third, the user may upload files to the server for secure storage. In the process of uploading a file, the user is prompted to select an encryption method from a list of choices. Fourth, upon submitting the file-uploading page, system uploads the file to a temporary folder or in a folder designated for the user's safe account. Fifth, the server encrypts the file according to the user's choice of encryption methods. Encryption may be performed on-the-fly or anytime before the file is written into the database table or folder on the server. Sixth, the server creates basic information about the file, including uploading date and time, file size, encryption method, and owner name, and writes the information in the database table for permanent record. Seventh, the server writes the file into a field of a database table or, in the alternative, in the safe's folder. Eighth, the user can download the file anytime as long as the user is able to authenticate the safe account and provide correct encryption key(s) if the file is encrypted. Ninth, the user may grant right to access to a file to another person who has a safe on the server or who is offered a guest safe account. Encryption may be performed at the client computer before the file is submitted to replace the server-side encryption at the Fifth step.

Optionally, the user may download a certificate, in a web format or PDF file format, containing the basic information about the file, together with the file itself in an encrypted or decrypted state. Optionally, the user may request that an authenticity certificate be sent to a second user's safe. The certificate is a document or just a document containing a simple statement. This certificate is saved in the database table "certificates" or the safe account folder. In the alternative, the certificate may be written in the safe folder of the second person's safe account or mailed to the email address of the second user. It is preferable to issue a web message informing the availability of the certificate when the second user logs in its safe next time. If the second user is also granted right of access to the file, the second user can get both file and the certificate.

The owner of the safe may also order a hard-copy certificate for authenticating uploading time and the substance of the file. In ordering the certificate, the user has the option to include a hard copy of the file to be sent to the second user, and is prompted to provide encryption keys for decrypting the file when the user places its order. After the order is submitted, the server retrieves the file, decrypts it, and saves it together with the certificate in the certificates table or the account folder. A printer connected to the server may automatically print the decrypted file according to prearranged schedule or in response to a manual command of a server administrator.

The hard-copy file may be produced and automatically bound as a booklet by a printer that has binding function. The staff of the system may use commercial applications that support the file formats of decrypted files to print hard copies. E-certificate in web page format may be printed using a printer connected to the server or any client computers displaying the certificate. E-certificate in PDF may be printed using any application that supports PDF format. Scanning device and proper image software may be used to check printing quality (e.g., image density and text margins). The printing operator of the system may conduct only limited visual inspection to ensure that files are printed properly without infringing the privacy of the files.

Visual inspection may be dispensed with if the user has downloaded the file, decrypts it, and sends a feedback concerning the file conditions to the server. If the user has provided a good feedback on the file conditions, the operator of the system only needs to ensure that the printer functions properly and sufficient image density exists in the printed file. Therefore, careful visual inspection of the printed file by humans is unnecessary.

For the files that the user has failed to conduct a downloading verification test or failed to send a feedback, visual inspection of the quality of the printed files may be necessary. One key or two keys encryption methods should be used for the files that require the highest security. Files may be printed in different printing shops with different levels of privacy. For the highest security files, visual inspection of file quality by humans may be prohibited.

Optionally, if the user agrees to the waiver of privacy of a file, the user may provide the keys to the printing staff of the system and have a copy of decrypted file prepared for the user. The file may be inspected before it is sent to the designated recipient. The system administration finally mails out a hard copy of sealed authenticity certificate together with the files to be certified to the designed recipient.

Optionally, the files may be designated as global files that can be directly accessed by any person. While safe name and safe password are not used in encrypting files, logging into a safe is a prerequisite for accessing private files. An option may be provided so that the user may designate his files as global files that may be accessed directly without using a safe.

Optionally, the file storage system may also implement a verification step for verifying the condition of an uploaded file. When a file is uploaded, the user is prompted to verify the condition of the file by downloading the file for a verification test. If the user tries to open the file, the user then is asked to confirm whether the uploaded file can be opened successfully. The substance of user's confirmation may include the condition of the file. This step helps the user find those files that are damaged during the uploading process.

C. Web Interface and Software Components

For a real secure file storage system, the details of the real software components shall not be disclosed to the public because such details would be sought by hackers and thus reduce the security of the system. However, it is impossible to hide all functional features. The program code and database table structures in this disclosure are examples only. They should not be used in a real file storage system without sufficient adjustments.

The software developed for practicing this invention includes the server-application and the code for web browser. The main components of the system include safe account managing component, file uploading component, file downloading component, access-controlling component, encrypting and decrypting components, file verification component, certificate-creating component, hard-copy certificate ordering component, and email notification component. Not all of them are essential for the practice of the invention. Solely for the convenience of disclosing the invention, all software components that jointly perform a well-defined function are referred to as a component.

Each of the software components may have code in two or more different software modules or files. For example, the uploading component contains both client-side code for browsing the client computer and server-side code for receiving the files to be uploaded, getting current system time, getting file size and ownership information, and writing them in database table or proper folder in non-database implementation. Likewise, the encrypting component works on-the-fly when the file is being uploaded. Thus, it is hard to separate the uploading component from the encrypting component because they work in a cooperative manner. After a file is uploaded, the server automatically updates the file_info table reflecting the changes caused by the file. It is therefore obvious that some code is shared and used by many components.

D. The Safe Account Management

"Second user" means any person other than the owner of the safe. It includes second person, second user, a third-party user, third parties, and file recipients. It may mean corporate entities and government agencies.

The home page of the system for a public member may contain two menus on the navigation bar: "Access My Safe" and "Get A Safe." By clicking on the "Get A Safe" or "You can create a free safe, click "sign up" button on the login page (FIG. 2B), the system opens the "Register A Safe" (FIG. 2A). By clicking on the "Access My Safe" button, the user can reach the page for logging in the safe (FIG. 2B).

The "Forget Password" is provided for recovering or resetting password (FIGS. 3B-3C). The user may open an instructions page by clicking the "Help" button, which may be placed in the bottom link bar or the main navigation bar.

Any prospective user can open an account by using the registration page (FIG. 2A). To register a safe, the user starts the registration process by clicking the "Register a safe" on the home page or the "sign up" link at the bottom of the login page (FIG. 2). In response, the server sends the registration page (FIG. 2A). The user then enters basic information, including safe name 205, password 210, Security Question 215, and Answer 220, into the proper boxes, and hits the "Enter" key or clicks the "Register" button. In processing the registration request, the server first verifies whether the safe name 205 is available. If the safe name is used, it responds with a message prompting the user to select another safe name. In returning this message, the server gets the values for all variable names, and fills them in the input boxes for the variable names in the new form so that the user does not need to re-type all of the data in next attempt except for the passwords. Optionally, the user may use an email address as the safe's name.

After the server ensures that the proposed safe name is unique, the server saves the data in proper fields of the database table "user_info." The fields of an example user_info table includes: safe_name, safe_no, access_code [optional in a version], prefix, firstname, lastname, title, address, city, state, zip, country, phone, email, activated, create_date, login_time, password, question, answer, regst_password, regst_question, regst_answer, plus fields for encryption settings. In addition, the server may also send a message to the user's email address to confirm the registration of the safe without disclosing the password. If the server encounters no error, it sends a page to display the message "An account is registered successfully!" Otherwise, the server sends a page to display the message that "The server is unable to create a safe for you." In any case, the server gets values of all variable names that the user has typed, and fills them in the respective boxes on the responsive page so that the user can correct errors in another attempt.

To register a safe successfully, the safe name must be unique, and proposed password, email address, and access code are in compliance with optional formality requirements. For example, the server may require that the safe name contain at least four characters, that a good password have the length between a minimum number of characters and a maximum number of characters, and contain both numeric digits and letters. An access code may be implemented using a fixed number of characters for the convenience of the users.

The access code is used for account verification purpose. When the system holds a large number of safes, it is possible that many safe names are similar, and a user may type in a wrong safe name by mistake. This kind of errors can be serious if a user grants right of access to a confidential file to a wrong safe. Access code is not used for account security reason. Other data such as account owner name, street address, city, and zip code may be used for authentication purposes. However, it is preferable to use an access code because it is the most effective and simple way to eliminate identity mistakes.

A registered user can access the safe by using the log in page (FIG. 2B). A registered user types in a safe name and a password into the "Safe Name" and "Password" boxes respectively, and hits the "Enter" key or clicks the "Login" button. In response, the system gets the values of the safe name and the password that the user has provided and compares them with the values in "safe_name" and "password" fields for all the records in the database table user_info. If a record is found, the user is allowed to sign in. If the user provides a correct safe name, the user may be allowed to make several attempts to log in the safe. The number of failed attempts may be stored in a session object. If the total number of the failed attempts exceeds an allowed limit, the server may temporarily disable the connection (regardless of how many safe names the person tries) and send warning email to the owner's email address. However, this feature may burden the users who access the system from public computers. When the user logs in the safe successfully, the current time of the server is saved in the "login_time" field of the database table "user_info." If the server is unable to authenticate the user because of a wrong password or a wrong safe name, the system sends the login page again with the old password value cleared, and sends a page to display an error message like "Incorrect password." The user is prompted to log in again.

In implementing this security feature, a session object is declared for the connection. After two or three login attempts, the system prevents the user from making further attempt. The number of failed attempts is accumulated. If the total number of failed attempts exceeds a permissible number, the server informs the user that no more attempts are allowed for security reasons, and a contact phone number is provided to the user. The number of failed attempts for the safe is reset to zero whenever the user has successfully logged in the safe. The permissible number should be set to a reasonably large number. Also, it is possible that many users share the same computer and the safe user is not in the position to fix computer problems.

If the user forgets the safe password, the user can retrieve password by clicking on the "Forget Password?" link (FIG. 2B). The first page opened by this link contains an input box for safe name (FIG. 3B). The user types in a safe name and proceeds. In response, if the safe name exists on the database table "user_info," the server retrieves the value from the "question" field of the record in the user_info table, and sends a page to display it together with an input box (FIG. 3C). The user then types in an answer to the security question in the box and hits the "Enter" key or clicks the "Recover" button. The server gets the value of the answer that the user has just typed in and compares it with the value in the "answer" field of the record for the user in the database table "user_info." If the two values are identical, the user is treated as the true owner of the safe, the server sends the password to the user's associated email address, and sends a message like "Password is sent to your email address!" If the answer is incorrect, the server responds with a message that the user failed to prove its identity and sends the page for recovering password again. If the safe name the user has provided does not exit, the server sends a page to display the message that "The safe name you provides does not exist!" and prompts the user to retype a safe name.

The "user_info" table contains the fields "password", "question" and "answer." It also contains "regst_password", "regst_question" and "regst_answer." The duplicate security-related fields are used so that the user is allowed to change safe login password. If the account password is used as an encryption key, it cannot be changed. It would require that all files be decrypted and re-encrypted whenever the user changes the safe password. When the user registers for a safe, the value of its security question, the value of its answer to the security question, and the value of its password are written to both sets of the fields. The values in the "regst-" set of fields are permanently saved for encrypting and decrypting files only. The server uses the fields "password", "question" and "answer" for authenticating the safe user, and the user can change the values in those three fields. Change of the registration password may be allowed only if the safe does not contain any data encrypted by the password.

After the registration password is disclosed to others, the files encrypted using the registration password may be decrypted by those knowing the password. The user can change the login password for the safe, thereby preventing those who knew the password from accessing the safe.

When a user grants right of access to a second user, the user must provide both the safe name and the access code. Both the safe name and the access code must match with the values for an account in the database table "user_info." The use of the combination reduces the chance of granting right of access to an unintended safe. There are several ways of generating access code. One of the methods is that the access code is stored in an independent field. In this case, the user must provide the access code during registration. The access code may be a portion of the characters from the value of other database table field. The table "user_info" includes the "safe_no" field, which holds unique safe numbers mainly for convenience. Therefore, access code may be the last 6 digits of the safe number. Optionally, the server may use a two-step authenticating method. It first retrieves the user's safe account record from the database table "user_info," and determines if the "access_code" field has a value. If the field has a value, the server uses this value as access code. If this field is empty, the server takes the last portion of the safe number as access code. The server must inform the user of this access code on the system's home page so that the user knows it. Access code so implemented may be changed from time to time by changing the value in the "access_code" field.

A registered user can manage the account by clicking on "Account" on the navigation bar, the server sends a page that allows the user to update the information for the safe account. The user can open the registration page (FIG. 2A) by clicking "Sign up" to create a guest safe account. Upon clicking "Change Password" on the account page (FIG. 3A), the server opens the page for changing safe password. This page has top menu 230 and side menu 225, The user can change safe password by typing in the old password and a new password in duplicate, and hits the "Enter" key or click the "Change" button. In response, the server returns the message like "Password is changed successfully" and may optionally inform the user of recent change in password (without telling the new password) by email. If the data the user provides is invalid or the server encounters an error, the server sends a page to display an error message that "Old password is incorrect!" or "New password is invalid." The password information is saved on the "password" field of the database table "user_info." One example of the SQL statements for implementing the change-password function would be: update user_info set password='Encrypt.decryption(new password)', where safe_name='The user safe name'.

This page also allows the user to change address by clicking on "Update Address" by calling the page similar to the page on FIG. 2A. On this page, all the data input boxes are populated with the data the user previously entered in the database table "user_info" except password. However, the user can change any of the data and have it saved. To change any data in the address, the user deletes existing data such as street address or phone number, types in updated data, and hits the "Enter" key or clicks the "Update" button. In response, if the server finds no error, it updates the address successfully with a confirmation message that "Address is updated successfully!" Otherwise, the server returns an error message that "You are required to provide data for street address!" The "activated" field holds an indicator if a safe account is inactive. Any known method for changing account records can be used for updating account information.

The user may recover password by clicking "Recover Password" on the page and providing necessary data (FIG. 3A). The process for recovering an account password is similar to that initiated from the link "Forget Password." This function is implemented using the database table "user_info." One of the SQL statements for implementing the "Recover" password function would be: select password, email from user_info where safe_name='the user's safe name' and answer='the entered answer'. The system sends password to the associated email.

The users can share the files with a second person by creating a guest safe. To create a guest safe account, the user uses the page similar to FIG. 2A. The user types in a proposed safe name, a proposed password, and an optional proposed access code, and hits the "Enter" key or clicks the "Create" button. If a portion of safe number is used as access code, the server creates an access code for the second user. In response, the server checks the database table "user_info" to determine if the proposed safe name is already taken by another user. If the safe name is available and the proposed password is acceptable, safe information is saved in the proper fields of the database table "user_info." Upon successful creation of the safe, the server generates a safe number and returns a message that "Guest safe is created successfully!" If the server is unable to create a safe account, it returns a page showing an error message that "This safe name already exists!" or "Your selected password is not acceptable!"

The newly created guest account is marked as an unidentified safe account. After the creation of the guest safe account, preferably, the system sends an email invitation to the email address of the intended second user if an email address is provided so that the second user can log in. Optionally, the email message contains a link to the server address so that the second user can open a page for logging in the newly created guest account by clicking the link. If the user has not provided an email address, the user must provide the safe name and the temporary password to the second user by email, fax, phone call, or other means.

When the second user logs in the guest safe the first time, the system automatically sends a page prompting the second user to change the password (FIG. 4) and requires the second user to change password. After the second user changes the password, the system automatically sends the login page. When the second user logs in the safe, the second user is prompted to provide its account information such as full name, email address, and phone number. Optionally, the server sends some information on the second user such as owner name, email address, and contact phone number to the inviting user for further verification.

In changing the password, the server first gets the value for the old password and compares it with the value stored in the password field. If the inputted old password is correct, the server then determines if the two new passwords are identical and acceptable. If the new password is good, the server then determines if the new password is different from the old password. If the new password is acceptable and is different from the old password, the server writes the new password in the database table "user_info" to replace the old password, and sends a page to display a message that "Password is changed successfully!" on the browser. If there is any error, the server responds with a message that "The old password you entered is incorrect." or "Two passwords you provided are not identical" or "The new password is invalid."

In one version embodiment, the general steps for making a guest safe account are summarized as follows:

(1) The first user makes a request for creating a guest safe account.

(2) The server prompts the user to enter a proposed safe name and a proposed password (access code may be necessary in some implementations).

(3) The server creates a safe account by creating a private folder for the second user and writes required records in all related database tables.

(4) The server records the password as a provisional password and marks the safe account as an unverified or unconfirmed account.

(5) The server sends an invitation to the second user in email or by other means.

(6) The second user logs into the new safe account the first time.

(7) The server prompts the second user to change the password.

(8) The server retrieves the new password and compares it with the old proposed password. If there is a difference between the old and new passwords, the server accepts the new password. Otherwise, the server responds, prompting the second user to change the password again.

(9) The server prompts the second user to provide account information. If no further verification is implemented, the safe is ready for use.

In an alternative, an authorized user may invite a second user to open a safe account. If the inviting user knows the email address of the second user, the user may request that the server send an email invitation to the email address of the second user. The email invitation contains a link for creating a safe account. This embedded link contains the inviting safe name in its link path or a special code for the inviting safe. In response to the invitation, the second user accesses the system by clicking the embedded link, and uses the page to register a new safe account. The newly created safe is ready for use without the need for changing password. From the special data in the link, the server knows the inviting safe name and informs the inviting user of the newly opened safe name and its access code. Now, the inviting user can grant right of access to the files to the new safe.

E. Setup of Encryption Method for the Server

As a requisite for setting up a data encryption method, the user must log in the server. An encryption mark 510 is used for testing if the user knows the common encryption key. An encrypted mark may be a simple text, single image, a sound file or any distinctive file, which is encrypted by a program using one or more encryption keys. The encrypted mark is stored on the server and is used to help all users on different client computers to synchronize encryption method and encryption keys. When a private encryption key is shared among many users on different client computers, the user at each of the client computers must provide the key each time. The purpose of using a private encryption key is to offer the highest "at rest" data security, prevent the insider's threats, and effectively stop hackers from accessing "at-rest" data.

The mark 510 is encrypted by the shared key and is then saved on the server. Each time when a user accesses the server to exchange data, user provides the key. The key may be saved on the client computer and is sent to the server in each of the requests for exchanging data. The server uses the key to decrypt the encrypted mark, and places the mark on the page that serves as a request for data exchanges. If the user has provided a correct key, the user sees the mark in the original text such as "Encryption Key is OK" or "Your key is in synchronization with the rest of the users only if you can see the line." If the user has provided a wrong key, it will not see the original mark. Therefore, the mark helps all authorized users to determine if the user has provided the same encryption key and if the encryption algorithm is common.

Other suitable choices of the mark include an image file, human friendly text, sound file, or short video files. It may be the group name, a company logo image, a project description, or any other suitable words and phrases. If the mark is an image, the user will not see the original image if the user has provided a wrong key. If the mark is a sound file or video file, the user will not hear the normal sound or see normal pictures if the user has provided a wrong key.

When image file is used, the rendering code on web page should be implemented so that it will not disrupt the web page. If sound file or video file is used, it should be embedded as file so that the user can listen the sound or view the picture. If an encryption algorithm requires the minimum length of the encrypted text, a text meeting the length requirement should be used. The displayed part of the mark may be a human friendly phrase which is constructed by extracting a certain number of characters at fixed index locations. For example, the short phrase may be formed by extracting N characters from a longer mark at index positions such as [5, 10, 26, 30, 80, 83, 90 . . . ]. One example of the human friendly phrase may be "Your Encryption Key Is OK" which can be conveniently displayed on any pages that are used to send, receive, and exchange confidential data. And the mark is placed on any other pages which are used to upload and download files, and edit, change, and delete the data on the server. Optionally, the server may embed a link for showing the whole text mark if it is a long mark.

The requirements for the mark location 515 ("ML") on the server include that (1) the mark location is secure and will not be overwritten by application data; (2) the mark location should be appropriate for the shared data; (3) the mark location should have a sufficient storage size; (4) preferably, the location should store two copies so that corruption of the primary mark will not disable the synchronization mechanism. The mark location may be a user account folder or a sub-folder or other dedicated folder, a suitable file descriptive field of a file directory where safe data are stored, a system folder such as /etc in a Linux system, a special file in a system folder or user-data folder, binary fields in a user table, binary fields of a generic project or group table, binary fields of a table for managing system properties, and any other suitable tables.

To increase the "at rest" data security, the owner should avoid using a mark proposed by the server staff. Since an encrypted mark is stored on the server, the knowledge of the original mark would help a hacker who wants to crack the key. During application deployment or debugging, server staff may need to access one or more application pages so they may see the decrypted text and image mark. For this reason, sound file and video file may further increase the security. Use of a method of comparing a decrypted mark with a decrypted reference mark can eliminate the need for human comparison. Use of duplicate copies of the encryption can improve system reliability. When the primary mark is corrupted, the server gets the backup copy and overwrites the corrupted mark with the backup copy.

The search order 520 is the order by which a client computer will search for an encryption key when a new client computer is called to access the system. The action for searching encryption key may be triggered by calling a page intended to exchange data with the system. The options available for search order, for example, include the Browser's cookies database or the keystore file, a specific clients user data folder, root ".encryption_key" in the root folder of a Linux system, Window specific system folder, Window specific data folder, a USB drive with or without sub-folder, and a smart card. The system may use different search orders for Windows, Linux, and Mac machines. The program should search for encryption key according to the specified order. If the client computer uses a USB drive or smart card, the client computer stops searching when it finds a mounted USB drive or a mounted smart card. If there is no USB drive, the client computer saves the encryption key on the default key location or user-designed location on the client computer.

Figure 5B:
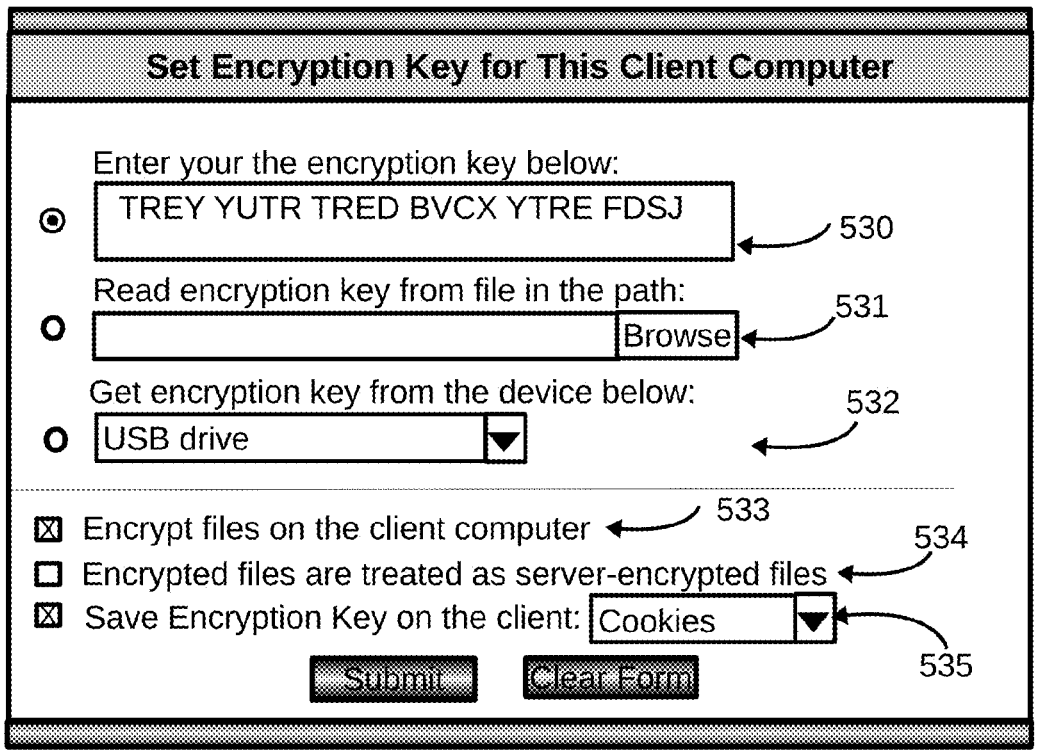
FIG. 5B shows the page for providing an encryption method for the file drawer when a client computer accesses the file drawer the first time.

The Key location 525 is the place to find the encryption key on the client computer on the connection session. If this is cookies or an accessible medium, the client will save the encryption key in the cookies or the medium, and the browser or the client gets the encryption key each time that the client computer or the server uses it. If the key location is in a USB drive, the client computer will write a record on the USB drive through a plug-in component. If the key location is in a smart drive, the client computer just accesses and gets the encryption key by using a plug in component. Smart cart in this invention needs to contain only the encryption key. The search program should try the common directories according to the convention used Windows, Linux, and Mac systems. In setting up the client computer, if the client computer finds an encryption key from the search path, the client computer populates the key in the input box for the key (FIG. 5B). If the client computer could not find the key, the client setup page prompts the user to fill the key, points to the path for finding the key file, or select the device to read the key.

The system may include additional option for selecting encryption algorithm (not shown in the FIG). A symmetrical encryption algorithm should be used so that the same key or keys are used to encrypt and decrypt files. If the algorithm used in the system requires a minimum file size, the mark should meet this requirement. In all cases, the keys may be encrypted by using a JavaScript encryption algorithm using the account password in the transmission in addition to the transport layer security protection.

In setting up an encryption method for the server, the safe user can open for setting up encryption page from in FIG. 3A. On the Set Up Default Encryption Method page (FIG. 5A), the user types in an encryption key in an input box at Step 505, enters an encryption mark at Step 510 (or select a file and file type), selects a location for saving the encrypted mark on the server at Step 515, sets up the search order for finding the encryption key on the client computer at Step 520, and has an option to set up a default key location on the client computer (Step 525), and has options to select client-side encryption method and treat encrypted files as server encrypted files at Steps 526 and 527. The setup data are saved in the additional fields in the user_info table or a separate database table. The setup determines the encryption model and the behaviors of the server for this account. Therefore, the encryption setup for server may be referred to as "encryption setup for the safe."

Figure 5C:
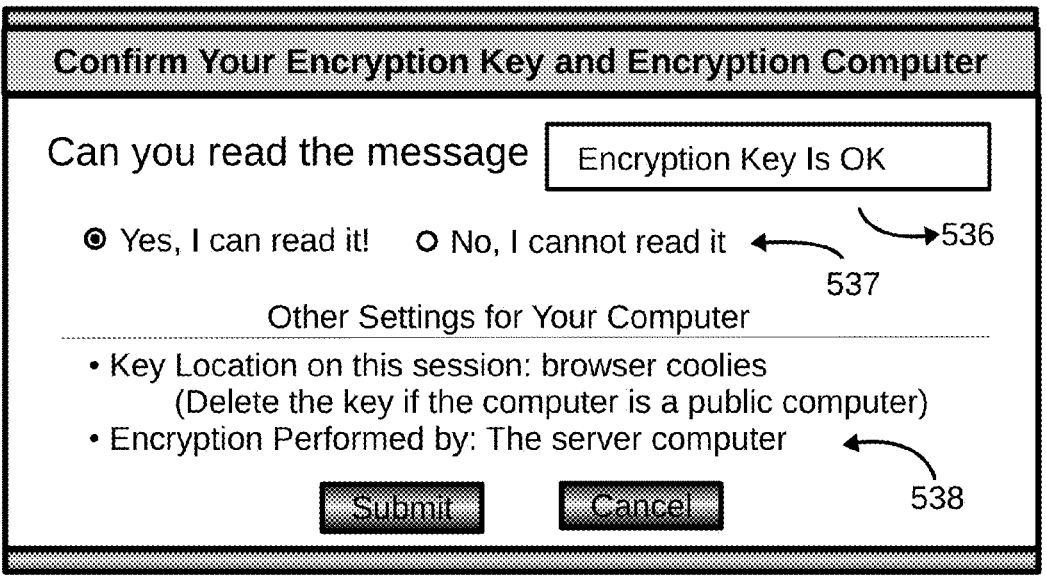
FIG. 5C shows the page for prompting the user to confirm if the user can read the encryption mark.
Figure 5D:
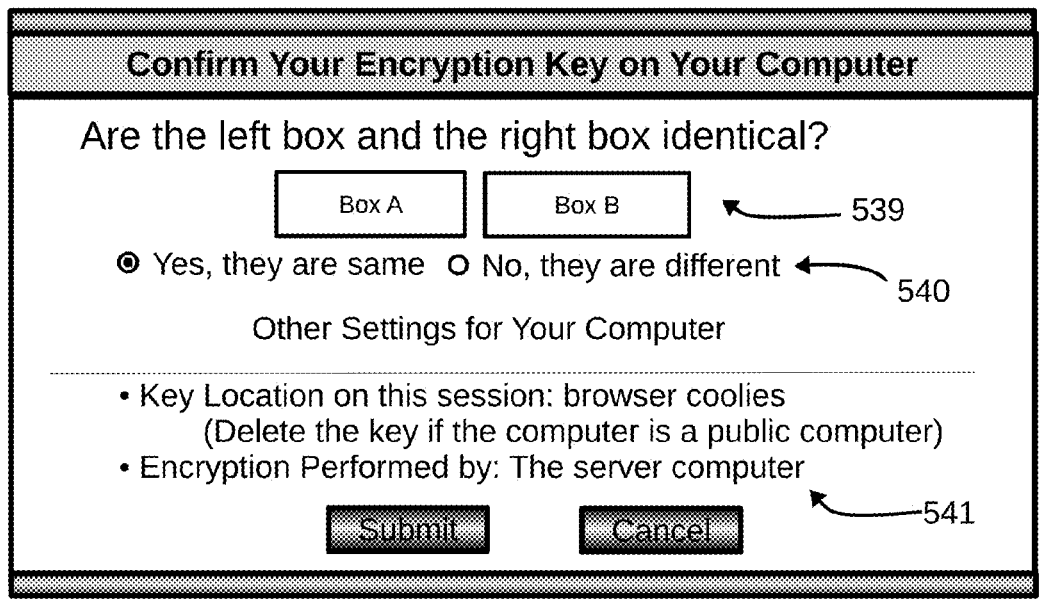
FIG. 5D shows an example page for prompting the user to confirm if two marks on the web are same.
Figure 5E:
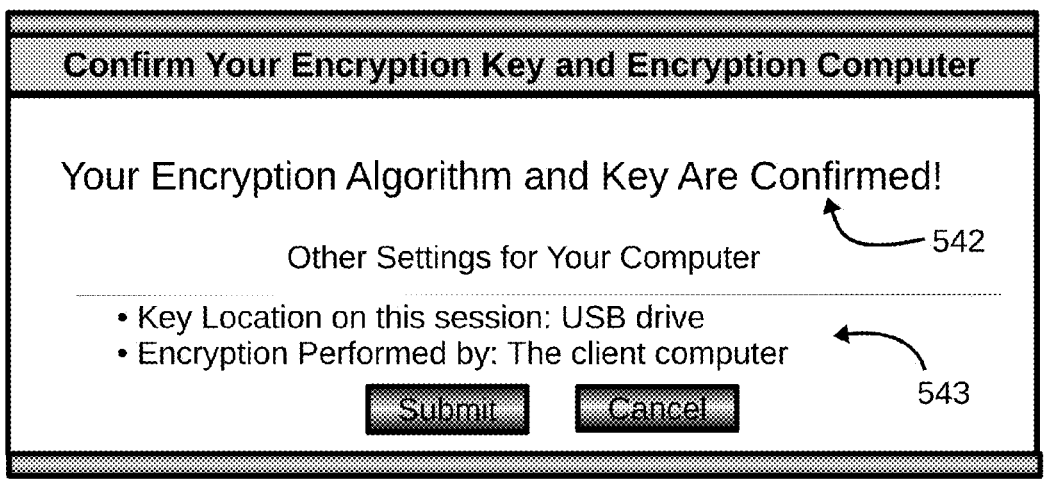
FIG. 5E shows the page for prompting the user to confirm after the client computer has determined that the client-side encryption algorithm and keys are consistent with the server-side encryption method.

Since the user may use different client computers, a client must set up with the encryption method. FIG. 5B shows three setup options: entering encryption key in 530, reading encryption key from a file in a selected file path in Block 531, and getting encryption key from a device selected in a drop-box Block 532. It shows check box for selecting client machine in Block 533, check box for treating encrypted files as server-encrypted files in Block 534, and checking box for selecting the key's saving location in Block 535. When the server processes the clients setup in FIG. 5B, it gets the encryption mark, decrypts the mark using the key, and sends a responsive page to the user (FIG. 5C) together with the decrypted mark in Block 536. After the user confirms the key is good in Block 537 and is presented with the setup information in Block 538, the client computer saves the encryption key in the key location designated by the server's setup or by client's specific setup. The server also saves the key location on the session object, a dedicated database table, or an equivalent file. The client confirmation page may contain options for changing default key location, encryption platform, and how to treat pre-encrypted files. The setup for the client computer is effective for the connection session only unless the user wants to save it as permanent setting. After the encryption key is saved on the client computer and key location is saved on the server, the client computer and the server can exchange data in encrypted form. FIG. 5D shows two boxes for the user to compare in Block 539, an option for indicating if the boxes are identical in Block 540, and setup information in Block 541, FIG. 5E shows a confirmation message 542 and setup information 543.

Figure 5F:
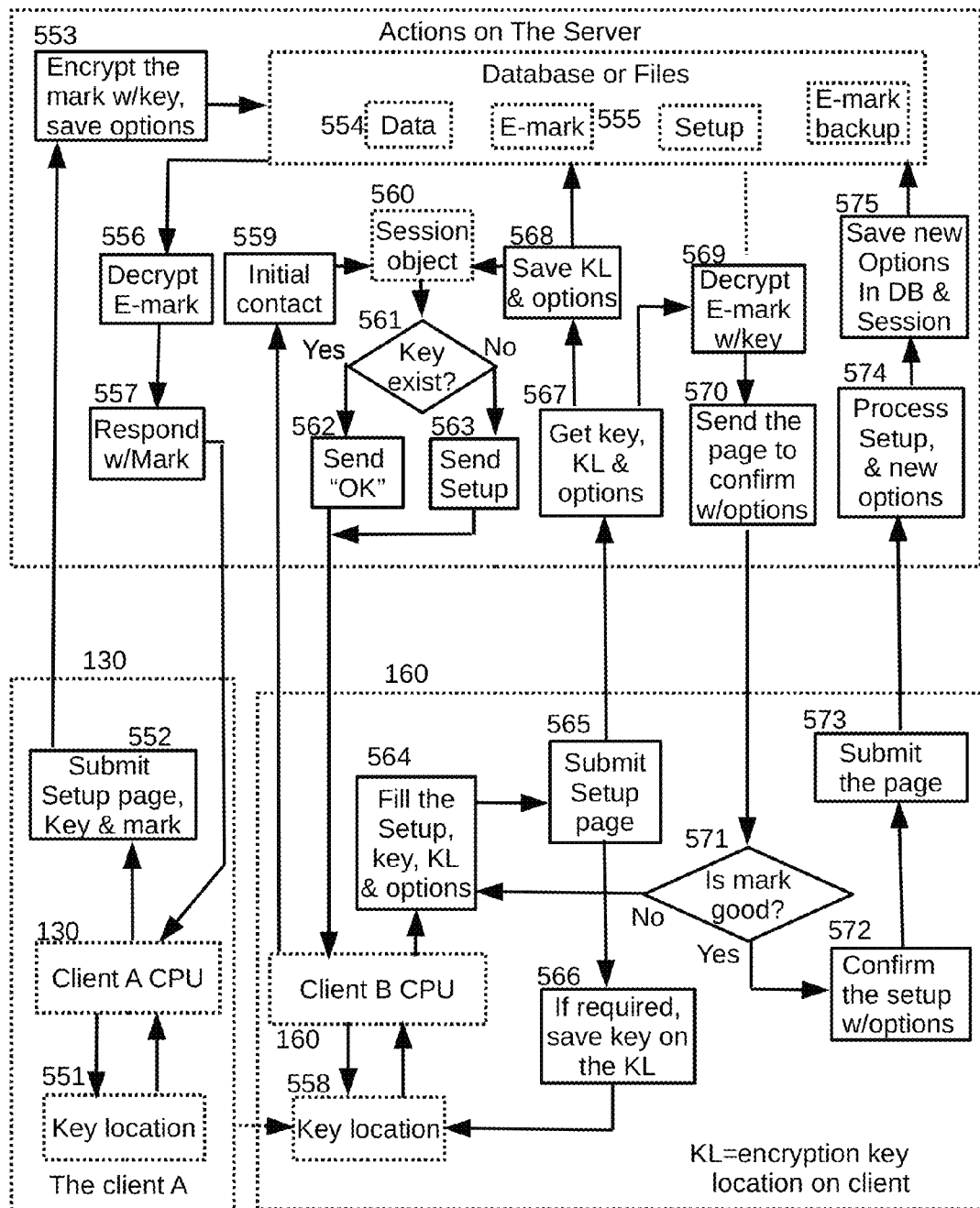
FIG. 5F shows the process for setting up a method for synchronizing encryption key between client computers.

FIG. 5F shows the process for setting up an encryption synchronization method. The user on the client computer 130 submits the page containing the encryption mark and key 551 to the server at Step 552, have the mark encrypted on the server at Step 553, and written in the database or folder 555. The server gets the e-mark and decrypts it in 556 using a user-entered encryption key and sends a response in 557. Additional page may be used to send a request with encryption key to the server to get, decrypt, and generates a test page. The user provides the key to an authorized user or the user self on a client computer 160. The user on client computer 160 sends an initial request to the server 100 at Step 559. The server checks if an encryption key has been set on the session object or database table at Step 560. If the server finds the key location has been set, the server will send an OK page to the client at Step 562. If the server finds that no key location has been set, it sends a setup page to the client computer at Step 563. One example setup page is shown in FIG. 5B. The user fills the setup page at Step 564 and submits the page at Step 564. Upon submission at Step 565, the client saves the key in the key location at Step 558, and the server processes the setup page and gets the key, key location and other options at Step 567. The server saves the key location in the session object (in 560), the database table or equivalent file at Step 568. The server gets the encrypted mark and uses the key to decrypt it at Step 569, and creates a confirmation page at Step 570. One example confirmation page is shown in FIG. 5C. The user determines if the mark is good at Step 571. If the mark is an image file or a video file, the user opens and plays the file to determine if the mark has been properly decrypted. If the mark is not good, the user may repeat the process by sending the setup page at Step 564. If the encryption mark is good, the user submits the confirmation page at Step 573. The server processes the confirmation page at Step 574, and saves the options in the session object or its equivalent at Step 575. After the encryption method is set up, the user does not need to enter encryption key each time in the session, and the client computer reads encryption key from the default location or from a USB drive or smart card each time it uses. If encryption is done on the server, the key is carried by a variable of a hidden field, which may be encrypted by using the account password, and the encryption key is deleted after each use with the shortest resident time. If encryption is done on the client computer, server-side encryption is not necessary.

The steps of creating an encryption mark for another embodiment by sequential actions include:

(1) In setting up shared data, the user selects a page for setting up data share or a database.

(2) Optionally, the server informs the user of a special mark be assigned by the server, and informs the user of proposed mark for encryption synchronization.

(3) The user provides a private encryption key and a mark to the server. If the user wants to use a longer text, it also provides a text and index locations for extract characters. If the user chooses a file, the user can select, among others, bitmap, jpg, text, pdf, tiff, doc, text, wave and video files and then uploads the file.

(4) The user submits the page to the server.

(5) The server gets the mark and the key and encrypts the mark using the key, and saves the encrypted mark on the server to be used as an indication of encryption synchronization.

(6) The server sends a page asking the user to specify the order for finding the encryption key on a client computer and the storage location of the encryption key on the client computer. The search order is saved on the server.

(7) The server may have an option of saving a default location for saving the encryption key or finding encryption key on the client computer.

(8) The user distributes the encryption key to the user who shares the safe or access the safe on another client computer.

(9) The user contacts the server for uploading or downloading a file, the server sends a client setup page for testing encryption key. On this page, the user enters encryption key or the file for holding the encryption key. The user may optionally initiate this set up page from a menu on account management.

The setup may contain options for the user to change all server settings, including the key location on the client computer, client-side encryption, and treatment of encrypted files as server encrypted files. If the client computer could not find the encryption key from the default location in the last step, the user may type in an encryption key or provides the file location for getting the key, the client computer saves the encryption key in the default location designated in the server setup or on this setup. If the user uses a USB drive or smart card to provide the encryption key, the user may specify the device. In this case, the user needs to plug the USB drive or smart card for the entire session. To improve productivity, if the user chooses to use a USB drive, a smart card, or a medium device, the server writes the drive location in the session object. The page can modify the server setup setting for this session.

(10) The user submits the setup page to the server.

(11) The server gets the encryption key from the submitted page, gets the encrypted mark from the folder or database table on the server, and decrypts the mark on the server, sends a confirmation page to the client computer. The confirmation page asks the user to confirm if the user can read the mark.

(12) If reference mark is not used, the user inspects the encryption mark. If the mark is a file, the user downloads and examines the mark file by clinking the file link, and confirms if the encryption mark is good. If the system uses a reference mark and determines the encryption status, the user just confirms the setup.

(13) Upon submission of the confirmation page, the server writes the key location in the session object for the user.

After the client setup is finished, the server sends File Summary page. The server knows from the session object that the encryption key has been set, and thus will not call the client setup page again. The user clicks the "Upload files" link, calling the link for uploading file. The server generates the uploading page. The uploading page includes a hidden variable for the encryption key with a null value and the code necessary for getting the encryption key from the key location. This page does not need to show the decrypted mark, but it may show the mark or embedded image or link. When the user submits the page with a file, the submission action triggers the embedded program to search for the encryption key on the client computer using the method specified in the user's set up. If it finds no key, it reports an error. If it finds the encryption key, and it assigns the value of the encryption key with the value. The client computer sends the file with the hidden encryption key to the server. The encryption key itself may be encrypted by a unique identity string generated by the server. If the client computer is unable to find an encryption key in the designated default location, the server will send the client setup page again.

When the user submits the page, the submission triggers an embedded script to get the encryption key in the key location and assigns the value to the hidden variable for the encryption key. During transmission, the encryption key and data are encrypted by a transport encryption method and further encrypted by a server-generated string. The lack of an active encryption key on the client computer at any time causes the server to send a page with an embedded program for searching for an encryption key.

By using this process, the user can ensure the user uses the same encryption key on different client computers, and all authorized users can use the same key. The mark displayed on the file-uploading page will serve as a quick indicator for the user to know if the user has used the same encryption key.

Figure 5G:
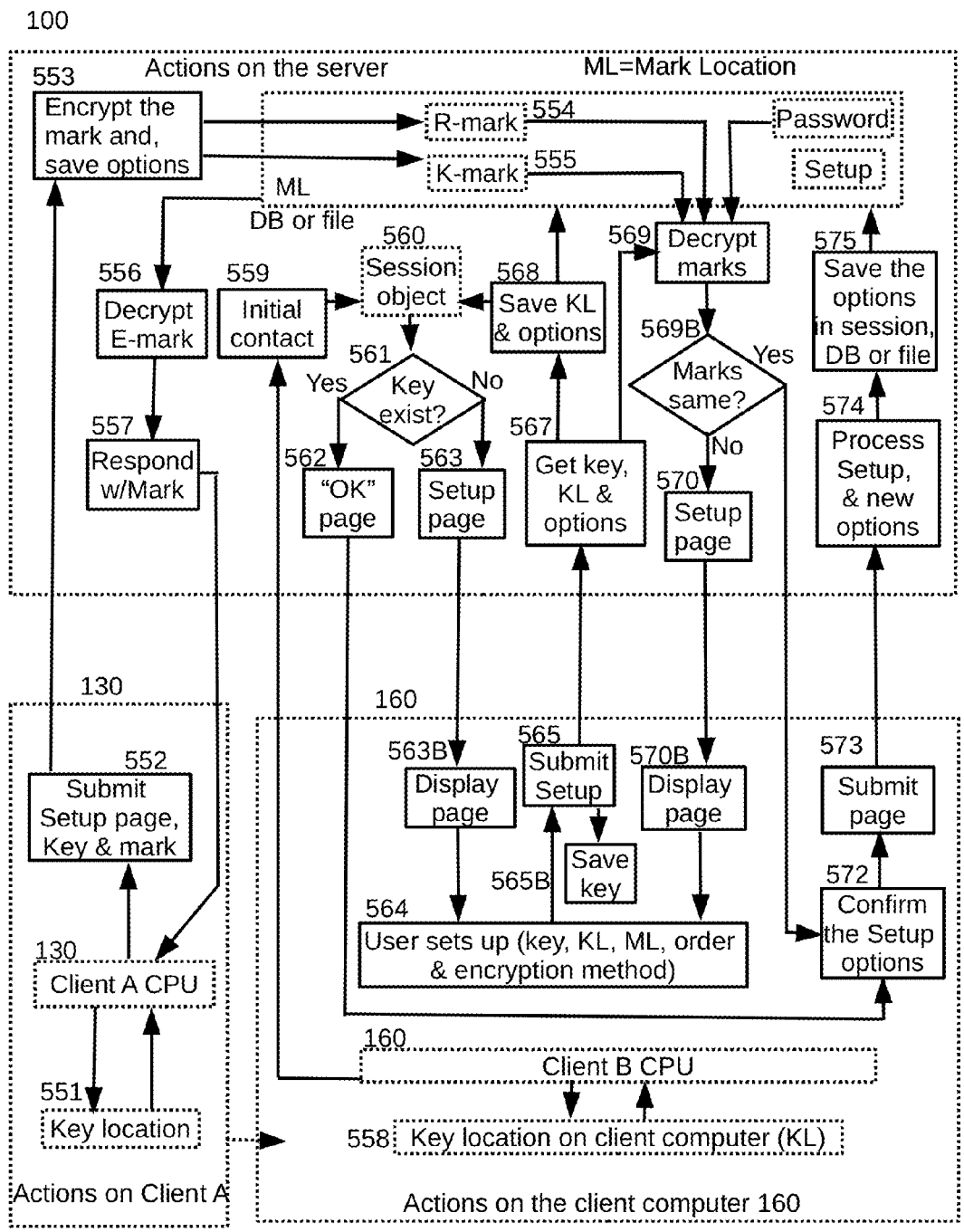
FIG. 5G shows the process for setting up a method for synchronizing encryption key between client computers where the server is able to automatically detect wrong encryption key.

FIG. 5G shows the process where the server can detect if the client key is good. The method is based upon the concept that the server encrypts one copy of mark by the key and one copy of the mark by using the user's account permanent password at Step 553. Since the account password is saved on the server, the server can decrypt it to get the original mark. When the client computer 160 sends the key, key location, and other setup options to the server at Step 567, the server gets the password and decrypts the password-encrypted mark (R-Mark), and uses the user-provided key to decrypt E-mark at Step 569. Since the password cannot be wrong, the server must get a correct mark. However, whether the mark, which has been decrypted from using the user-provided key is the same as the original mark, depends upon if the key is right. If the server finds that two marks are identical, the user key is good at Step 569B, the system allows the user to confirm the setup with optional options at Step 572. The server may use a confirmation page used in FIG. 5E (except the encryption method in Block 543 is server-side encryption). However, if the server finds that the two resulting marks are not same, the server sends the setup page again at Step 570. Therefore, the server can detect if the key used in the second client computer 160 is right. The method slightly increases the vulnerability because the server staff can use the password or hashed password to get the original mark.

The implementation of using session object and cookies to track the encryption key location is a common method, but has a negative effect on system performance when there are too many big session objects. One method of improving the system performance is to reduce session object storage sizes. For example, the entire setup method is represented by one short word "csdxyz", where the first letter is a flag for client-side encryption, the second letter is a flag for using a USB drive, the third letter is for key location on the client computer, and the last three letters define the search order for encryption key. There are other well know methods for tracking sessions. One of the method was described in "A Recipe for Replacing Session Variables", Susan Perschke, Feb. 22, 2006 12:00 AM (http://www.sqlmag.com/). Any other methods, which have the function of tracking web session identities, may be used as alternative.

When a web browser is used as the interface between the server and the client computer, it needs a plug-in component to work as the interface with the client's hardware. The plug-in component needs to have only generic functions of initializing the device, finding specific encryption key, reading the key, and returning the key. In addition, the plug-in component can be invoked directly by a call from an embedded script, which is triggered by a user action. The encryption function may be invoked by the user's event of submitting action. The script first calls a plug-in component with the device name and other device information and gets the encryption key from the key location. The script then calls an encryption program with data and the retrieved encryption key, and gets encrypted data and key. The encrypted program may be a browser plug-in component or an embedded script. The browser developers can integrate all functions into a single function. After the user sets up an encryption algorithm and key location on the form, when the user submits the form, the browser finds encryption key from the designated location, calls an encryption algorithm to encrypt the file and data, and sends the encrypted file and data to the server in one integrated action.

The user may need to reset the encryption key in the event of a mistake in distributing the encryption key. Since the key has been used in creating the mark for encryption synchronization, the encrypted mark must be recreated. If the user or any other user has uploaded a file to the server, the file must be uploaded again with a correct encryption key so that the file can be opened later.

To reset the encryption key on the client computer by using following steps:

(1) The authorized user calls a web page for resetting the encryption key.

(2) Upon submitting the page, the server first checks if there is any data. If there is data, the user is prompted to use the normal method for changing encryption key.

(3) If the user ignores warning at Step (2), the server generates a form for resetting encryption key, which accepts new encryption key and encryption mark.

(4) The user fills the form and submits it to the server.

(5) The server retrieves the new key and the new encryption mark, encrypted the mark with the key, and saves the newly encrypted mark in the selected locations on the server.

(6) Optionally, the user is prompted to verify the encryption key by calling a test page to determine if the decrypted mark is good.

(7) Upon successful encryption, the user can distribute the key to all users or users on other client computers.

If it is necessary to change the encryption key for the file drawer. The user may do so by the following steps.

(1) The user calls the page for changing the common encryption key for the file drawer.

(2) The user provides both the old encryption key and a new encryption key on a web form, and submits the form to the server.

(3) The server gets all files and data records, decrypts them, encrypts them using the new key, and saves newly encrypted files in a temporary folder and saves newly encrypted data records in a temporary database table which is accessible to the user for a test.

(4) The server sends two web pages, one page asking the user to view the newly encrypted files or data records, and one page prompting the user to confirm if the operation successful.

(5) The user reviews all effected files and data.

(6) The user enters a feedback page after the user has reviewed the newly encrypted files and data records, and submits the feedback to the server.

(7) The server gets the confirmation page.

(8) If the user has provided a success confirmation, the server deletes all old files and data records, or, optionally, keeps those old files and data records in a temporary folder and a temporary database table for a period of time.

(9) The server reminds the user of changed encryption key each time when a user tries to access the files.

When encryption is performed on the server, transport layer security technologies such as TLS, SSL and S-HTTP are used to prevent random security attacks in transmission. When SSL or TLS is used in uploading and downloading a file, it protects the file and encryption keys in transmission. After the file is uploaded but before the file is saved, the file is encrypted and then is saved on the server. In retrieving the file, the user sends a request together with the encryption keys again in transmission. After the file is read from the disk, the system decrypts the file before it is sent to the user. During download, the file in data stream is also encrypted. Therefore, the combination of using SSL or TLS and file encryption in storage makes the system highly secure. Moreover, the security of encryption key in transmission may be further increased by encrypting the key using account password or using all commonly used methods for encrypting or hashing keys in transmission.

Available encryption algorithms include AES, Blowfish, DES, IDEA, and MD5. The server application may use a global variable for storing a list of encryption algorithms and allow for selecting a global encryption algorithm for all encryption needs. If the system allows user to select different encryption algorithms to encrypt the files for the owner safe, the file_info table must have an additional field for storing algorithm, and other changes in the application are made accordingly. Rijndael Encryption Algorithm in JavaScript is available in both original version and modified versions.

To ensure that each file can be successfully decrypted, it is desirable to do a file verification test after the file is uploaded.

F. Client-Side Encryption Method and Anti-tampering Measures

To achieve the maximum at-rest and transmission security, the ultimate encryption solution is to use client-side encryption. The present invention provides a method for verifying whether encryption key and algorithm are in synchronization with the server's key and algorithm. The user must determine if the client computer has a common algorithm in the browser or on the client computer. An encryption program may be installed on a system bin file, a specific application folder, or installed in the browse. If it is installed as a bin file, it will be available in the command line. If it is installed as a standalone application, a user can use it just like other programs. If it is a browser's plug-in program, the user calls it from the browser.

The encryption method of the present invention depends on the encryption mark, which may be created on the server or the client computer. The user downloads the encrypted mark to the client computer, decrypts it by using an algorithm, and determines if the mark is good. It is reasonable to assume that any error in using the key and encryption algorithm would result in a bad mark. If the mark is good, both the encryption algorithm and the key must be good, and the client computer can perform the encryption function.

If the encryption algorithm on the client computer is common with the server encryption algorithm, the algorithm can be used in all encryption methods including the one-key, two-key and common key encryption methods (by selecting the option in Block 527 in FIG. 5A). In this case, a file encrypted on the client computer can be decrypted and shared by other safes that use the same encryption algorithm. After the client-side encryption method is synchronized with the server's encryption method, the client-side encryption method can be used to substitute the server-side encryption method. The server can decrypt any file that has been encrypted on the client computer by using one-key, two-key, and common key methods. The change in the encryption location does not affect other features. The files, which are encrypted by one key, two keys, and no-key methods on the client computer and uploaded to the server, have the same features: access by other authorized safes, global accessibility, detailed tracking of file access histories, and authenticity certifications while the files in the secure file drawer continue to have their own basic features.

The other way of using client-side encryption method is to use the "Upload encrypted file" option. This class of files is entered just like those one-key and two-key files except that the server does not provide a server decryption option during download. The user can use this option by checking "encrypted files are treated as server-encrypted files" option (Block 527 in FIG. 5A). The user can use this option only if the client computer has a common encryption algorithm or the same encryption algorithm downloaded from the server. When this option is selected, the server will treat a file as same as a file encrypted by the one-key method. Upon downloading this file, the user will have two options: [ ] decrypt it on the server or [ ] decrypt it on the client computer. If the user selects the first option and provides the key, the server decrypts the file on the server and downloads the decrypted file to the client computer. If the user selects the second option, the server downloads the encrypted file to the client computer, and the user then decrypts the file on the client computer.

A seamless client-side encryption method requires additional support of the browser. Ideally, the request for an encryption algorithm directly causes the server to download an encryption algorithm to the browser, and the encryption algorithm is called by script. After the user sets up with the client-side encryption, the browser uses selected encryption algorithm and user-provided the key to encrypt data and files on the client computer. The call includes a reference to an encryption algorithm and a reference to the encryption key. The function may be triggered by a user action or an event on the uploading page. Browser vendors can implement those changes. In the alternative, encryption may be performed by Rijndael Encryption Algorithm JavaScript published in 2001.

The log-out page is modified to include a reminder. This page asks the user to remove the USB drive or Smart Card, and provides an option (i.e., check boxes) to keep or delete the encryption key stored in the key location. The default choice (e.g., the default selection) on the reminder page is to delete the encryption key, but the user may change the default selection. On the setup page (FIG. 5A), the user should be warned that the user should delete the encryption key if the client computer is a shared computer. Optionally, the server can use the session identity to send a page with code for deleting the encryption key in the designated key location before the session expires. This deletion action on the browser may be triggered by time. The browser? needs to call a plug in component for deleting the key if the key is not saved on the client computer cookies.

Figure 5H:
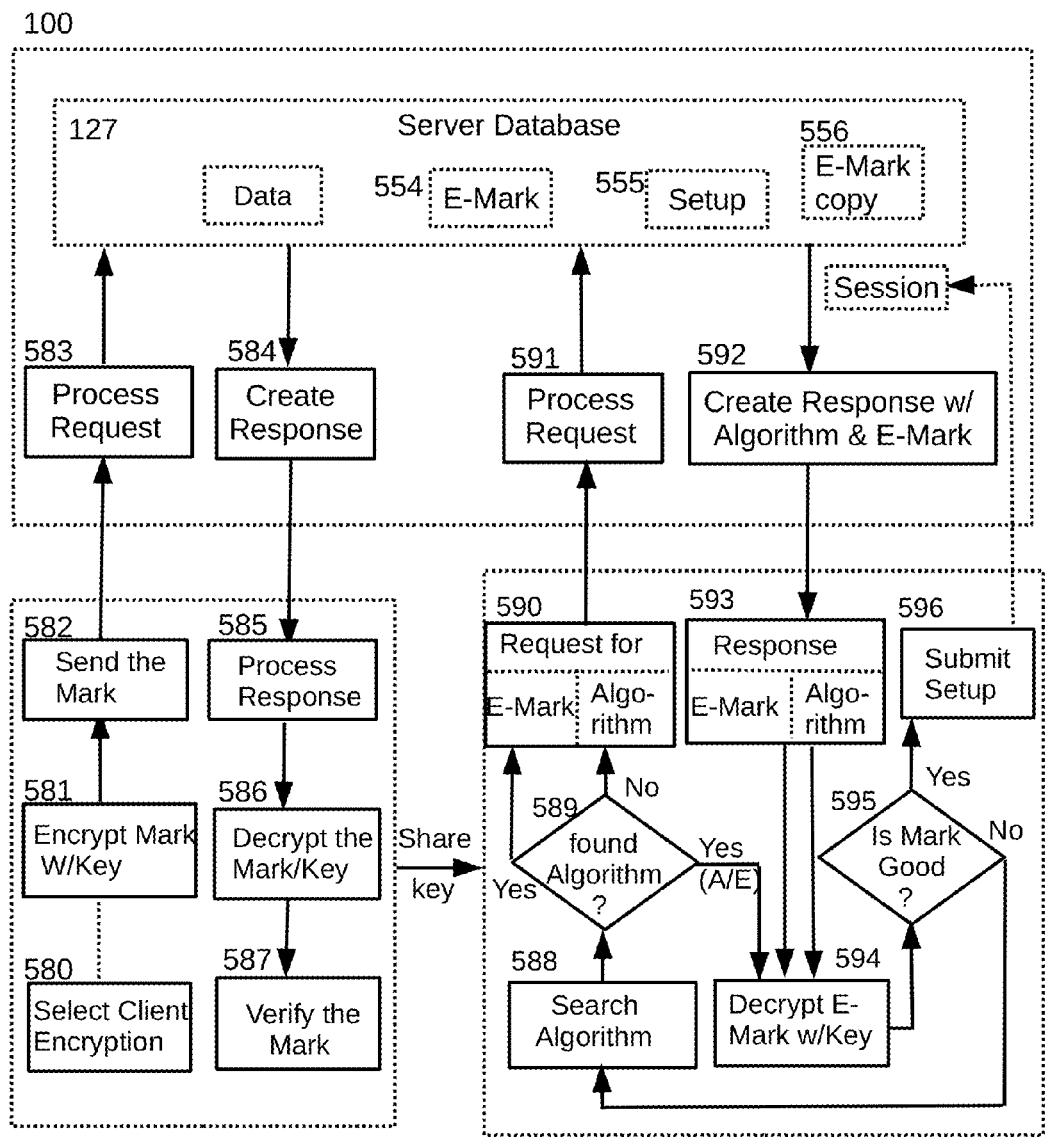
FIG. 5H shows the process for setting up a client-side encryption method, which is in synchronization with other client computers where synchronization is determined by observation.

The process of using client-side encryption method is shown in FIG. 5H. The user opens the page for setting up the client-side encryption at Step 580, encrypts a mark with encryption key at Step 581, and sends the encrypted mark to the server at Steps 582, 583. In response, the server creates a response at Step 584, processes the response on the client computer at Step 585, decrypts the mark using the encryption key on the client computer at Step 586, prompts the user to determine if the decrypted mark is good at Step 587. The user then starts with a second client computer 160 with the same encryption key. The client computer searches for encryption algorithm at Step 588. If no algorithm is found at Step 589, the client computer sends a request for downloading an encryption algorithm and the encrypted mark at Step 590, processes the request on the server at Step 591, gets both the encryption algorithm and the encrypted mark at Step 592, processes a response on the client computer at Step 593, and decrypts the mark with the encryption algorithm Step 594. The user determines if the encryption algorithm and the key are both correct at Step 595. If the mark is bad, the client computer repeats the process at Step 588. If the mark is good, the client may send a page to the server to save the information on encryption algorithm and key location on the session object or its equivalent. If the prior search at Step 588 finds an encryption algorithm, the request will be sent to get the encrypted mark but not an encryption algorithm at Step 590, the server processes the request at Step 591, gets and sends the encrypted mark at Step 592, the client computer gets only the encrypted mark at Step 593, and decrypts the encrypted mark on the client computer at Step 594. It then goes on to Step 595 again. If an algorithm and the E-mark both exist, as indicated by "Yes A/E", the client directly goes to the Step 594.

Figure 5I:
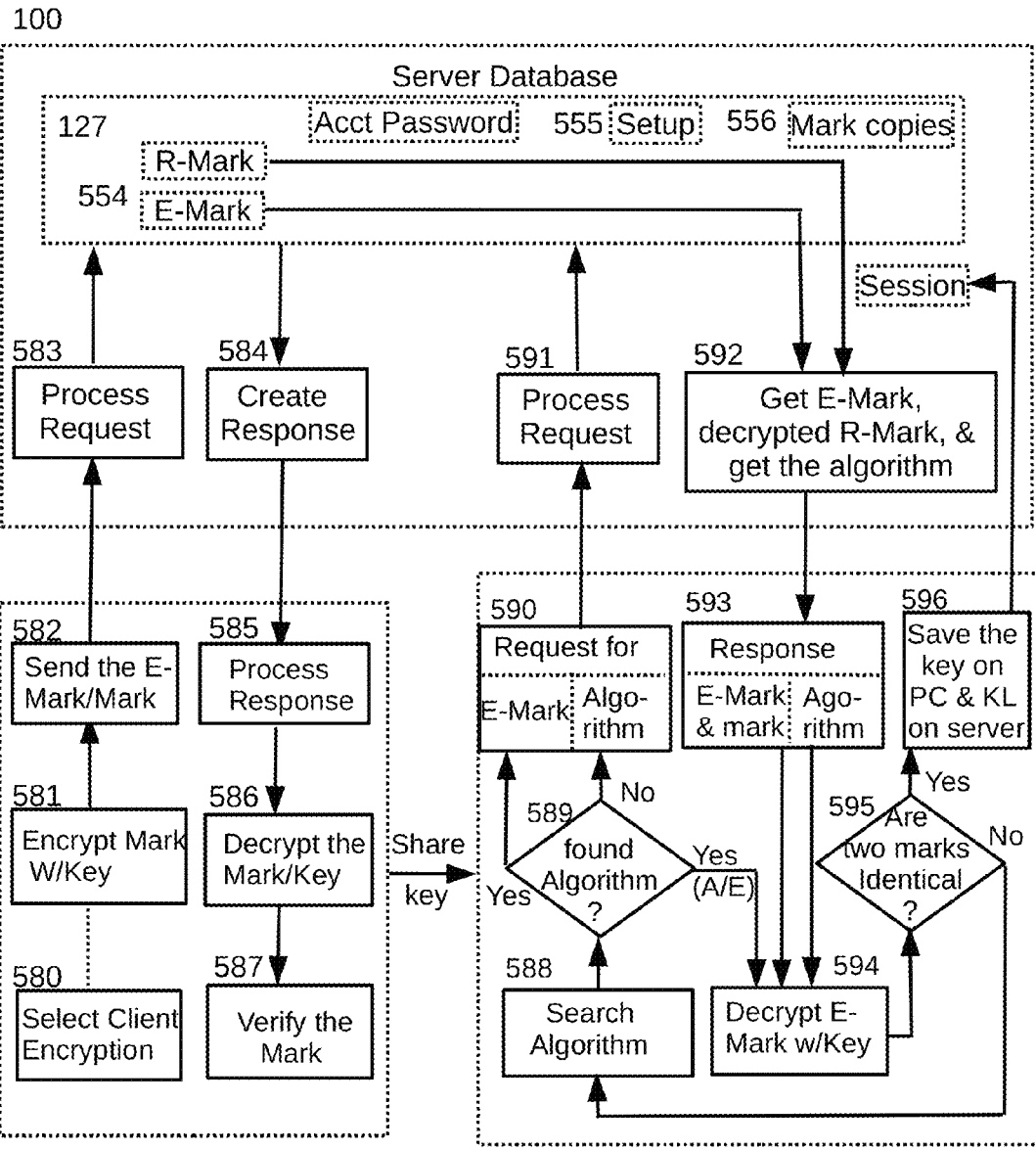
FIG. 5I shows the process for setting up a client-side encryption method, which is in synchronization with other client computers, where the client computer determines encryption synchronization status automatically.

The method of synchronizing encryption method on different client computers can be performed automatically by using a modified method shown in FIG. 5I. In setting up a client encryption method, the client computer sends an encrypted mark (E-mark) and an original mark to the server at Step 582. The server encrypts the mark using a permanent password to create R-mark, and saves both E-mark and R-mark in a proper database table or file at Step 583. When a second client computer sets up the encryption method, the client computer gets E-mark and R-mark, decrypts the R-mark to get a first mark, and gets optional encryption algorithm at Step 592. After the download, the second client computer then gets the E-mark and the first mark at Step 593, and decrypts E-mark with the algorithm on the client computer to get a second mark at Step 594. The first mark cannot be wrong. If the second mark is same as the first mark, both the encryption algorithm and the encryption key must be good, and the second client computer saves the key on the client computer and saves the information on the key location on the server at Step 596. If the two marks are not identical, the second client computer goes back to search for an algorithm on the browser and the client computer at Step 589, and restarts with the step of sending a request for E-mark and encryption algorithm at Step 590.

An anti-tampering measure is implemented to ensure the probative value for those files in the owner safe. This can be done by creating a file details string which contains file size, file description, file uploading time, and encryption method (e.g., s=64.5 k; d='my test file'; t='Jan. 28, 2012: 12:34:28'; m=2; em=SE) and is then encrypted by using the same encryption key and algorithm. This sting is encrypted on the server and is written in the field for encrypted file details. This record cannot be changed by any person except the owner of the file, but can be viewed by clicking the "View Encrypted Details" link in FIG. 8A. When the user sends a request for viewing the file details, the server prompts the user to provide encryption key, decrypts the file information data, sends the page showing the file details, and deletes the key. In the alternative, when the user downloads the file, the file details can be generated from the encrypted field.

If the user chooses the client computer to encrypt file, the browser or the user's client, at the time of uploading the file, gets the file details and upload time, and packs them as a properly delimited string (e.g., 64.5 k; 'my test file'; 'Jan. 28, 2012: 12:34:28'; 2; CE). To get the file size before uploading, a script may use an activeX object or calls a plug-in component. To get system date and time, the script may use the date object to get current date and time. The rest of data are inputted by the user. This string is encrypted on the client computer, is written in a file for encrypted file summary. When the user sends a request for viewing encrypted file details, the server retrieves this record, sends the encrypted file details string to the client computer, prompts the user to provide one key or two keys on browser, decrypts the string on the Browser using the keys, shows the file details by generating table by a script or assigning the file detail values to the hidden variables in the web page. The file details string may be created on the server, and encrypted by the registration password.

G. Upload Files Using Various Encryption Methods

Figure 6E:
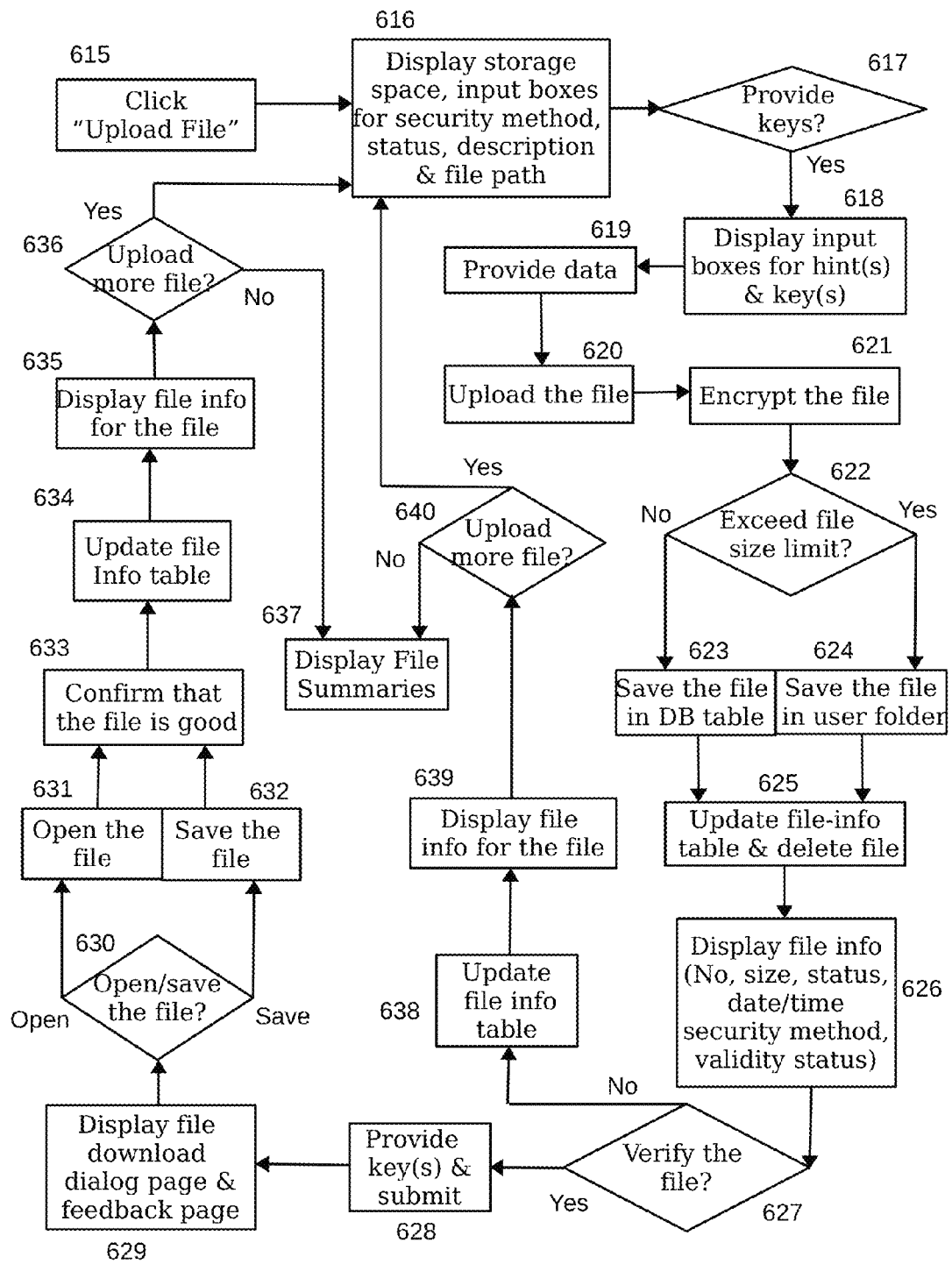
FIG. 6E shows the steps for uploading, encrypting and verifying a file.

By opening the page associated with "File Upload" on the navigation bar, the user can upload a file into the server (FIGS. 6A-6C). On the page in FIG. 6A, the user is asked to select an encryption method (in Block 606), provides a description (in Block 608) for the file and the file path 609 where the file can be found. The description field is used to store a short description so that the user can identify the file. The user can pick up a file path by clicking on the "Browse" button and using the path-finding dialog. The user must select one of the encryption methods under the "Select an encryption method" before the file can be uploaded successfully. The options include "Secure file drawer (in Block 601)," "Use one private key (in Block 602)," "Use two private keys (in Block 603)," "Upload encrypted file (in Block 604)," optional, "Not-encrypted file." The system-selected default option may be "Secure file drawer." Block 607 allows the user to select a file-sharing status from the choices: private, share and global.

All files in the secure file drawer are encrypted using a common key. The files are saved in a safe's root folder or database table. The files are encrypted using a common encryption key, which is not the account password. The server has to keep track of the physical locations of those files so that the server can find and download them. The server does not need to issue a system-wide unique file number for those files, does not track their access histories, and does not allow other safes to share those files. When a file in the file drawer is deleted, the server does not keep anything about it. Thus, the server cannot provide authenticity certificate for them and the user cannot grant access right to any other safes. The basic information on those files is saved in the "file_info" table or a separate table.

"Use one private key" means that one single key is used in encrypting the file. The server uses the key in decrypting the file. Upon uploading the file, the server first checks the validity of the key, and then uses the key and the encryption algorithm to encrypt the file before the file is being written in the "file_content" field of the file record in the database table "file_info" or in a separate file table or in a folder if the file is over-sized. Upon being written successfully, the server immediately deletes the key and the file from the server's memory. The server does not save the key in any other form. However, the server saves in the "security" field the information that is sufficient for instructing the server to decrypt the file using the same key and same algorithm. When the user makes a request for downloading the file, the user is prompted to provide the key. The server uses all necessary information in the "security" field to construct the decryption method and uses the key to decrypt the file. Upon successful decryption and download, the server again permanently deletes the key and the file from its memory. When the client-side encryption method is selected, the encryption and decryption are performed on the client computer.

"Use two private keys" means that two keys are used in encrypting the file. The server needs the two keys in decrypting the file. No matter what keys are used, the only requirement is that the user must provide the same two keys (key 1 and key 2) without swapping their identities. Upon uploading the file, the server first checks the validity of the two keys, uses the two keys and a right encryption algorithm to encrypt the file, and writes the file into the "file_content" in the file record in the table "file_info," or separate file table, or the safe folder if the file is over-sized. Upon being written successfully, the server deletes both of the keys and the file from its memory. The server does not save the key in any other form. However, the server must save the information that is sufficient for constructing encryption and decryption method using the two keys. When the user downloads the file, the user is prompted to provide the two keys. The server then uses the necessary information to reconstruct the encryption method, and uses the two keys to decrypt the file. Upon successful downloading, the server deletes the two keys and the temporary file. When the client-side encryption method is selected, the encryption and decryption are performed on the client computer.

"Upload an encrypted file" means that the file has been encrypted on the client computer, and thus the server does not encrypt it. The user is solely responsible for decrypting the file. The file is entered in the safe, can be viewed by other safes upon proper authorization, and can be marked as a global file. The system may be implemented to provide a second layer of encryption by using the common encryption key or a private single encryption key for further protection. However, two layers of encryption may complicate the process of proving the uploading time and substance of the file afterwards.

"Not encrypted file" means that the file is not encrypted before it is uploaded. When this option is used, the file, if properly downloaded, can be opened by anyone.

The user may use two layers of encryption in various ways. The files in the secure file drawer is encrypted by a common private key and also protected by the account password. If the common encryption key and the account password have been stolen, the user can change the safe account password for temporary protection. The user can then change the common encryption key. Two layers of encryption may be achieved by encrypting an encrypted file. For a file that has been encrypted, the user may encrypt the file again using single-key and two-key encryption methods. However, due to the use of multiple encryption processes, there is a risk that the user eventually forgets the keys for decrypting the file. Therefore, it is highly desirable that multiple keys and decryption instructions are stored in separate security firms without disclosing their purposes.

After the user selects an encryption method, provides required keys (if necessary), and provides the file path of the file on the client computer, the user then hits the "Enter" key or clicks the "Upload" button to submit the form (FIG. 6A). The system uploads the file into a temporary folder (overwriting the existing file of the same name). It then gets the current time of the system. The server generates a file number for the file. If the file is not very large, the file is written in the "file_content" field of the database table "file_info" or equivalent file table. The file number, file size, description, and file type are saved in the "file_info" table. The file may be saved in the safe folder due to its excessive size, and the whole file path is saved in the "file_path" field. If the file is saved in a folder, the file name must be unique so that it does not overwrite another file in the folder.

The name of a file may be its original file name, the unique file number, file number and safe number combination, original file name appended with a unique string, a notation such as "F" or string plus the upload date and time string, and original name appended with part of the file number. If a naming method cannot ensure the name's uniqueness, the server must check all files in the safe's folder to determine if a particular name has been used. If a file name exists, the server prompts the user to change file name, and sends an uploading form again. Regardless of the difference in storage locations, their properties are stored in the database table.

If there is an error, the server sends a page to display the message that "The server is unable to find the file!" or "An error occurs in uploading file." If the file is uploaded successfully, the server sends a page of displaying a file summary including the uploaded file. On this page, the user can click on the button "Print" to print the page or "Save" to save the file information on the client computer. The server then prompts the user to upload another file. After the user has uploaded all files and responds with "No" to the uploading prompt, the server automatically shows the "File Summaries" page (FIG. 7A).

When one-key or two-key encryption is used, encryption may be performed on-the-fly while the file is being uploaded. This would reduce the risk, but increases the server's CPU usage and locks up the network. It is preferred to separate the encryption process from the upload process. The file is uploaded and saved in a temporary folder, read and encrypted by an encryption program, and finally written in the destination folder, in the file_content of the file_info table, or a separate file table. After the file is found to be valid, the temporary file and the keys are deleted. Two methods, prior-encryption and client-side encryption, may be used to reduce the chance of losing confidential files. At the end of uploading the file, the server then gets the file size, system current time, file path, and safe name, and writes them in respective fields in the "file_info" table.

To ensure that the file can be successfully decrypted, it is desirable to ask the user to conduct a verification test at the end of the uploading process. The user is asked to decrypt and download the file and to provide a feedback on whether the downloaded file can be opened and legible. However, the verification test cannot be used to verify any pre-encrypted file in failed cases because it is impossible to tell which of the two phases, decryption on the server or post-download decryption, causes the failure of the verification test.

Regardless of the differences in encryption keys and the final storage destination, the general steps for uploading and encrypting a file in the preferred embodiment (FIG. 6E) are as follows:

(1) The user clicks on the "Upload File" button at Step 615.

(2) The server creates and sends an uploading form that contains input boxes for accepting file status, file path, and encryption methods for the file at Step 616. The page may show an encryption mark.

(3) The user selects a proper encryption method at Step 617.

(4) The page generates input boxes for accepting encryption keys and associated hints at Step 618.

(5) The user selects a file to be uploaded by browsing the client computer, and enters one or more encryption keys and associated hints if necessary at Step 519.

(6) The user submits the page for uploading the file at Step 620. The file is first written to a temporary folder.

(7) The server encrypts the file at Step 621. The server first retrieves the encrypted encryption keys from the submitted page, selects a right algorithm, and encrypts the file.

(8) The server determines if the file exceeds the size of the storage field in the file_info table at Step 622.

(9) If the size exceeds the limit, the server saves the encrypted file in the safe folder at Step 624. Otherwise, the server writes the file in the "file_content" of the record in the "file_info" table, or a separate table, or a file folder at Step 625.

(10) The server writes file information in the file_info table and deletes the temporary file and the encryption key at Step 625.

(11) The server sends a page to display file information and the selectable options for verifying the condition of the file (FIG. 6B) at Step 626.

(12) If the user chooses to verify the file condition at Step 627, the user provides encryption keys in the input boxes and submits the completed page at Step 628.

(13) The server sends a file download dialog (FIG. 6C) prompting the user to save the file or open the file at Step 629, and sends a page for accepting feedback page (FIG. 6D) concerning the file condition at Step 629.

(14) If the user chooses to open the file, the server starts downloading the file at Step 630.

(15) If the user has chosen to save the file, the server saves the file to the disk of the client computer at Step 631. If the user has chosen to open the file, the server opens the file using a suitable application at Step 632.

(16) The user clicks on "Yes" to confirm that the file described in file information 611 is good (FIG. 6D) or bad at Step 633.

(17) The server updates the file basic information for the file, indicating the file condition by "V" at Step 634 (or deletes the file if the file is bad).

(18) The server sends file information, asking whether the user wants to upload another file at Step 635.

(19) If the user selects "No" for uploading another file at Step 636, the server sends the File Summaries page at Step 637. Otherwise, the server sends the file-uploading page for next file at Step 616.

(20) If the user chooses not to verify the file at Step 627, the server updates the "verified" field with "U" at Step 638.

(21) The server sends a page including file information and options for uploading more files at Step 639.

(22) If the user chooses "No" at Step 640, the server sends the File Summaries page at Step 637 or if the user has selected "Yes" at Step 640, the server sends the File Upload page again at Step 616.

At the end of an uploading cycle, the server deletes the encryption keys from its memory and deletes the original file from the memory and the temporary folder. The user may conduct a file verification test after the file is uploaded. If the file cannot be successfully decrypted, the user is asked to upload the file again.

The server needs to keep track of the file path on the server so that it can find the file for download. In one version of implementation, when a file is uploaded, the file is first uploaded to a temporary folder. It is then written in a proper folder for permanent storage, the file is deleted from the temporary folder, and the memory is cleared. Since the file storage path is known, when the server generates a file-uploading form, the server includes the final destination path, which is passed to a back-end program. In the alternative, the file may be directly uploaded into a destination folder while encryption is performed on-the-fly. The file path is tracked.

Figure 6F:
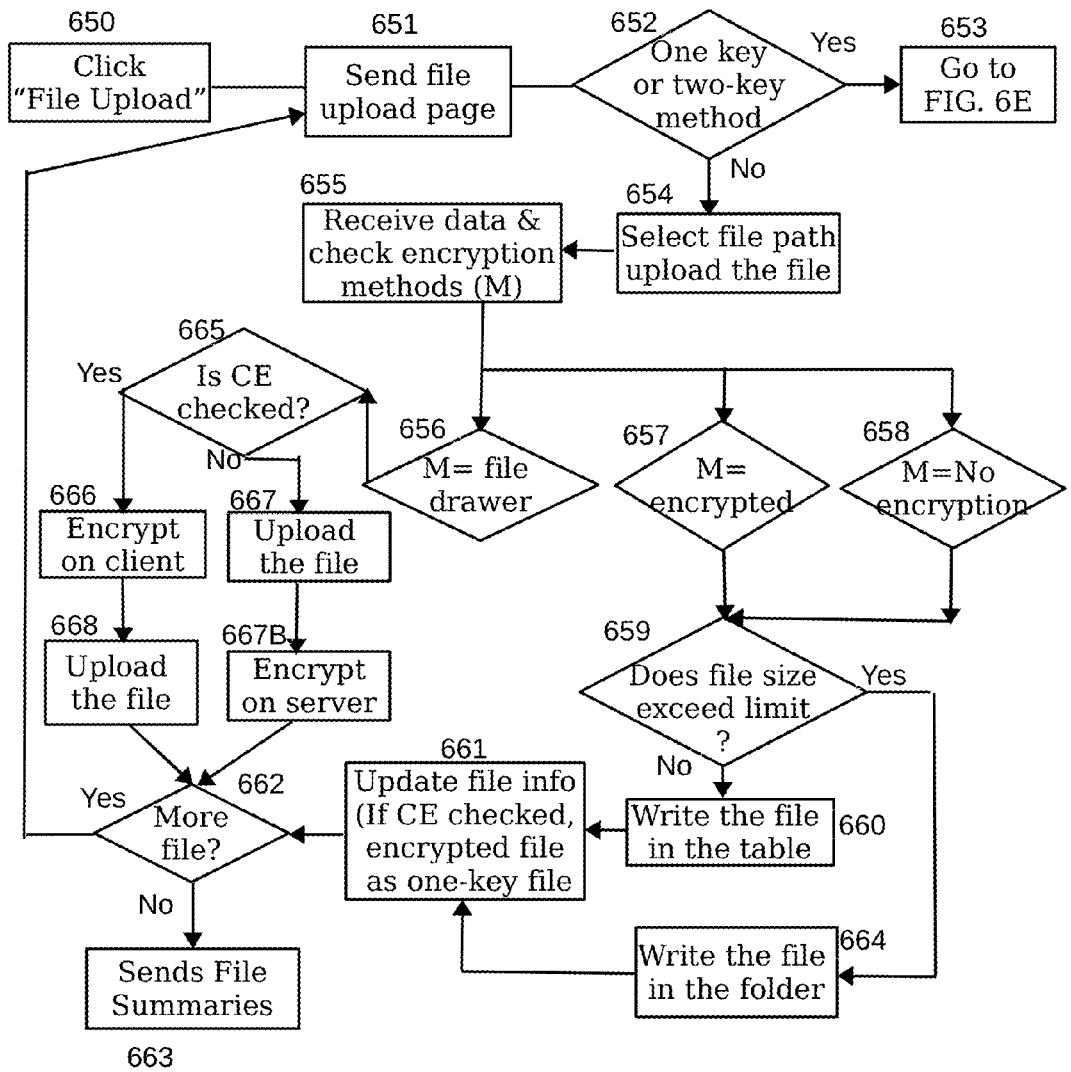
FIG. 6F shows the steps for uploading a file without using an individual encryption key.

The user can upload pre-encrypted file or not-encrypted file, the user selects a proper option, selects a file status, finds a file path on the client computer, and submits the form. The general steps of submitting a file without using private encryption keys in one implementation are described in (FIG. 6F). The user clicks a link for uploading a file at Step 650 and sends the file-uploading page at Step 651. The user selects a method that does not require encryption at Step 652. The user finds the file path for the file on the client computer and submits the page at Step 654. The server receives the submitted data, gets file status, file size, and the file data, gets the server's system time, verifies the identity of the safe, and checks the encryption method at Step 655. If the user has chosen "no encryption" or "encrypted file" method at Step 655, the server determines if the file size exceeds the size limit at Step 659. If the file size exceeds the size limit, the server writes the file in the safe's folder at Step 664 and updates the file record in the file_info table at Step 661. If the file size does not exceed the size limit, the server writes the file in the file_info table at Step 660, and updates file information in the file_info table at Step 661. At the end of updating the file at Step 661, the server asks if more files are to be uploaded at Step 662. If the user chooses to upload more files, the server sends the file-uploading page at Step 651. Otherwise, it sends File Summaries at Step 663. If the user chooses to upload the file to the file drawer at Step 656, the server checks if client-side encryption ("CE") is selected on the setup at Step 665. If client-side encryption is selected, the client computer encrypts the file before it is sent to the server at Step 666, and otherwise, the file together with encryption key is sent to the server, and is encrypted on the server at Step 667. The server asks the user if more files are uploaded at Step 662. If the user clicks on "Yes", the server sends the file-uploading page at Step 651. If the user clicks on "No," the server sends File Summaries at Step 663.

Figure 6G:
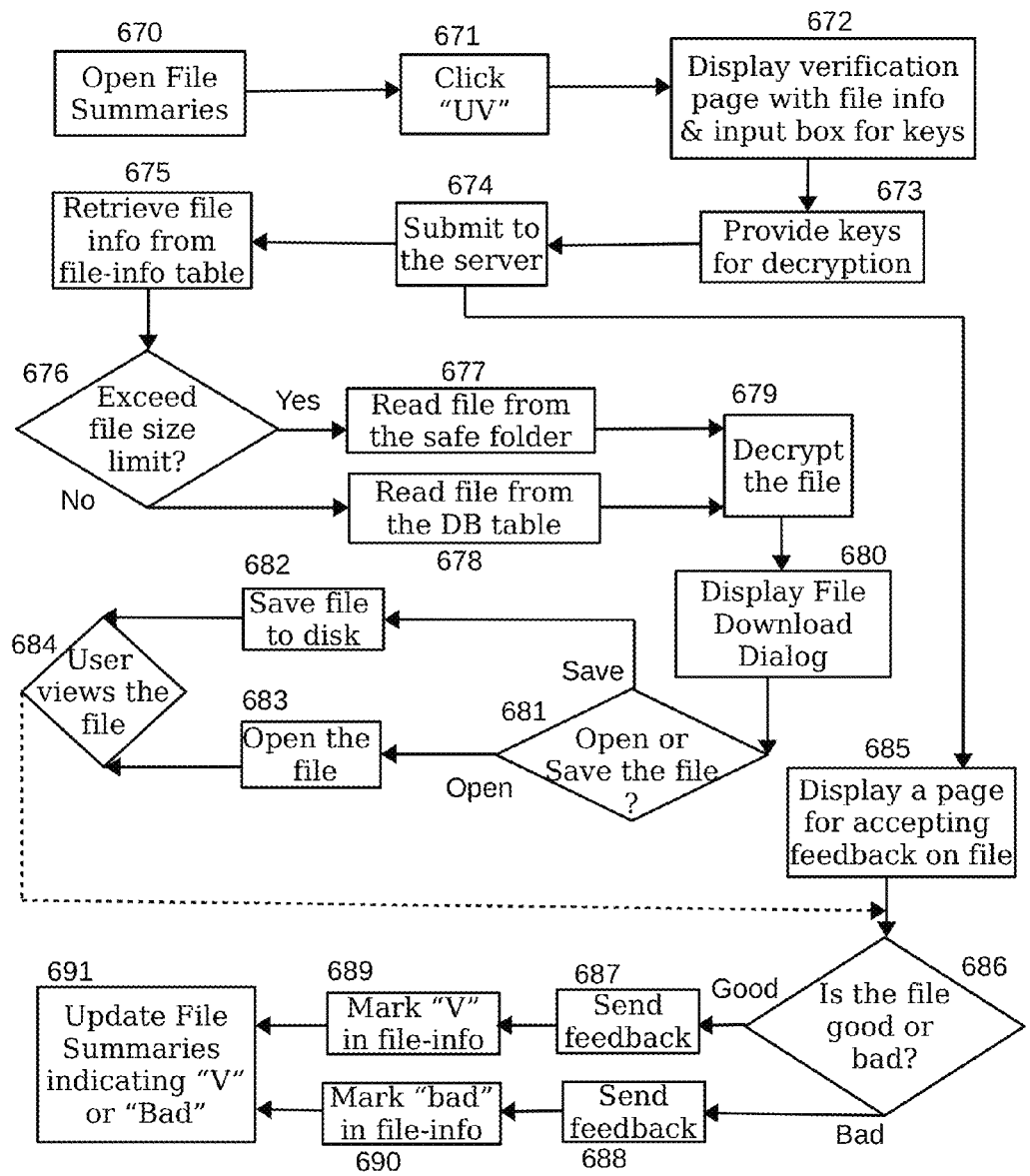
FIG. 6G shows the steps for verifying if a previously uploaded file is good.

If a file is uploaded without verifying its condition, the user can later verify the file by clicking "UV" according to the process shown in FIG. 6G. The user first clicks "UV" for the file at Step 671 to open a verification form at Step 672. The user provides key or keys in the input boxes at Step 673 and submits the filled form at Step 674. The server, in response, sends a file condition feedback form with Yes and No buttons at Step 685. The server also retrieves file information such as encryption method and file path (if it is an over-sized file) from the file_info table at Step 675. The server either reads the file from a folder at Step 677 or from the database table at Step 678, decrypts the file using the user-provided keys at Step 679, and sends a file download dialog with two options (open or save) and an OK button at Step 680. The user saves the file at Step 682 or opens the file at Step 683, and inspects the file at Step 684. The user determines if the file is good or bad at Step 686. The user clicks "Yes" on the file condition feedback form at Step 687, the server marks "V" in the "verified" field of the related record in the file_info table at Step 689. If the user clicks "No" on the file condition feedback form at Step 688, the server writes "bad" in the "verified" filed of the related record in the file_info table at Step 690. Finally, the server updates File Summaries reflecting the verification status of the file at Step 691.

The most difficult issue is the preservation of encryption key. On one hand, the method must be safe enough so that safe users would not hesitate to store highly confidential files on the system. On the other hand, the storage system must provide enough tools that help the owner successfully decrypt the files many years later. The user should be advised to have the sole responsibility to securely keep encryption keys permanently. The safe system may provide help instructions in selecting and securely keeping encryption keys. For example, the user should be provided with useful tips on how to select encryption keys and keep them. If a user has important confidential files in the safe, the user should store the encryption keys in one or more security firms by special arrangements without disclosing the use. If one or more files are encrypted prior to uploading, sufficient decryption instructions, without disclosing anything that can associate the stored files with the particular safe, should be kept permanently. When a need arises to decrypt a file in the safe, the user can get encryption keys and the decryption instructions from the security firms.

There are several useful guiding rules for selecting encryption keys. When a file is encrypted using keys A and B, the two keys may be kept in two security firms X and Y. The person who places the file in the safe may write instructions of using keys A and B to decrypt the file. The instructions, which must be kept permanently with sufficient security protection, do not have the keys. The instructions do not expressly tell where the keys are kept, but the user must remember where the two keys are kept. The instructions may serve as a partial reminder of using two keys.

In this arrangement, the employees of the security firms cannot directly access both the keys and instructions. Even if someone has access to the keys (A_number=123456 and B_number=654321), they do not know the purpose of each of the keys, the method of combination, and the use instructions. This information would be viewed as junk. Another person, who has gained access to the decryption instructions, cannot find the keys. The instructions may contain a description of doing something by using A_number and B_number. The instructions may be very obscured and contain assumptions that are understandable to the creator of the instructions or the people who are close to the creator. The arrangement for storing encryption keys in the security firm does not completely prevent its employees from knowing the keys. A hacker may be able to get the keys from intercepted correspondences between the user and the security firm. Therefore, it is important that the security firms should not use mail to release the encryption keys, and may release the keys to the user only upon satisfactory approval of the user's identity.

The second methodology is that the user permanently "remembers" encryption keys. By using this methodology, the keys must be numbers and/or words that are easy to remember by the user. Since the keys are never displayed, the server encourages the user to write a hint for each of the encryption keys (FIG. 6A); and the hints 612 and file information 611 are provided to the user whenever the user wants to download and decrypt the file (FIG. 6B). The following are some helpful hints for selecting encryption keys.

First, encryption keys should not be based on personal information such as social security number and birthday directly. Those numbers may be used in combination with other numbers or words. Second, encryption keys should not be associated with personal subjective preference such as favorable numbers, favorable car model because subjective preference may change over time. Third, encryption keys should not be based upon erasable personal memory and instead they must be based upon ascertainable external evidence. A reminder that "the place John Doe visited in May 1970" may be a bad choice because John Doe would not be able to remember the trip many years later, and there would be nothing left for establishing the place. Fourth, hints for the encryption keys should not be understandable to other persons. "The first house on Red Light Street in Baltimore, Md." may be understandable to any person because one can find the house number. Fifth, the subject matters serving as reminders of encryption keys shall not change over time, or, even if they change, external evidence must be available for establishing the subject matters. Good subjects include house, street number, landmark, and historical major events.

A good reminder may be like the "The house in Arizona in 1980" if the person once lived in the Arizona house for several months in 1980 and it is not a permanent residence and there is no other house the person ever lived in Arizona in his life. This reminder does not reveal the connection between the house and the person, and the connection can be established by the person's unforgettable memory. It is highly unlikely that the person forgets this house completely. Even if the person forgets the house address, the person can establish its address by conducting some investigation because it is impossible that all traces concerning the house is erased from all public records. It is also obvious that a person cannot determine the address of the house from this statement alone and an unrelated person cannot establish this connection.

The third methodology is to use a one-way "chain reminder." When the user opens the download form to download the same file, the server sends a page showing one or two hints to the user. The user enters a hint "5-31-2006 note." This note's name must be unique. Soon after the file was successfully uploaded, the user wrote this note titled "5-31-2006 note." This note contains an encryption key without disclosing its use. It is preferable that the note includes an obvious statement that the note must be kept permanently and its use is triggered by an external event so that the user will dutifully keep this note permanently.

The server administrators cannot access the file because there is no way for them to have this note. The note may be so innocent that there is no conceivable possibility for others to understand. The note may contain two headings and two average passages. Unrelated people, who encounter the note, do not know the connection between the note and the safe.

Many years late, when the person downloads the file, the server prints the hint, "Please enter the encryption key" with "5-31-2006 note" as a hint. The user then finds the note and the key in the note. The risk of using this methodology is that if the user loses the note, the user will not be unable to access the file. It is also important that if the user dies, an arrangement must be made so that the estate will keep the note permanently.

H. File Summaries and File Download

After the user logs into the safe, the server presents a default home page for the safe account (FIG. 7A). The home page comprises menu 700, safe identity information 705, selection menu 710, and page-number navigation bar 715. The default view is the user own safe. If the user clicks "Other User's Safes," the server generates a table showing files from other safes (FIG. 7B) the user has right to access. If the user clicks "Your File Drawer," the server generates a table showing the files (FIG. 7C). Each of the file numbers is also a link for opening the File Details page for the file. Each of the files on File Summaries (all three tables) has a "Download" or "Decrypt" link, depending on if a private key was used in encrypting the file when the file was uploaded.

The "Your Own Safe" table shows files by file number, owner, description, size, uploading date and time, encryption method, and access type. The column headings have the following meanings:

"File No." means serial numbers generated automatically by the server for files. Preferably each of the file numbers is system-wide unique.

"Description" means a description of each of the files for identification purpose.

"Uploading Date/Time" means the uploading dates and times that the files are uploaded, and they cannot be changed.

"Size (K)" means the sizes of files.

"Encryption" means the encryption methods used for associated files. "Single key" and "two keys" mean that the associated file is encrypted using one private key or two private keys, "encrypted file" means that the associated file is encrypted before the uploading, and "not encrypted" means that the associated file is not encrypted.

"Status" indicates the status of the file. "Inactive" means that the file can be read and downloaded only by the file owner and cannot be accessed by other users. "Active" file can be accessed from both current safe and all authorized safes.

"Verified" means the status of a file concerning its condition. "V" indicates that the file has been verified upon successful uploading. "UV" means that a file has not been verified and the user may verify it any time later. If a file is found to be illegible upon uploading, the file is deleted immediately. If a file is found illegible in a later verification test, the file is marked as "bad."

The "Your Own Safe" table is generated from the data in the file_info table. An example file_info table contains safe_name, file_no, file_description, file_uploading_time, file_size, file_security, key_hint, key_hint2, file_status, file_verified, file_path, [file_content], file_index, and encrypted_details. The files of suitable sizes are stored in the field of "file_content," but this field may be placed in a separate file_table or removed if all files are to be stored in a folder; file_path holds a file path for storing the file on the server if the file is stored in the safe folder. The "file_path" field may also contain file type, which is required for file download. The data are retrieved from the table in creating file summaries. "encrypted_detail" should have a VARBI-NARY or BLOB binary string data type or equivalents so as to avoid potential problems arising from trailing space removal or character set conversion. Also care should be taken to ensure that the increased size caused by encryption. One example of SQL statements for retrieving the encrypted file summary would be: select file_no, file_description, DATE_FORMAT (file_uploading_time, "%m/%d/%Y %T"), file_size, file_security, file_status from file_info where file_owner='account' and file_status<>'Delete' order by file_no.

The table under "Other Users' Safe" shows the files that the user is authorized to access. The owner column shows the file's owner, and other columns show description, size, uploading date and time, encryption, and access type. The table does not show file status and verification status. If the safe owner does not have required keys for decrypting the files, the safe owner cannot open them. Access control in one version of the embodiment is realized by using the grant_access table having the fields: safe_name, file_no, grant_id, [status], recipient_safe, recipient_no, grant_time, access_type, access_number, expiration_time, expired, [access_count], used_number. "Status" is replaced by "expired" while "used_number" is to replace "access_count" in a later version of embodiment. When right to access to a file is granted to another person's safe, a record is created, which includes the values of the safe_name, file_no, recipient_safe, and recipient_no. "grant_time" contains the day and time that the right of access is granted; "access_type" holds information that includes (1) the right to view the file information only, (2) the right to download the file, and (3) the right to download and decrypt the file. "Access_number" is the maximum number of accesses that the recipient may have before the expiration date. Viewing a file summary is not counted as an access if the right of access is to download the file. "Used_number" is the number of accesses the recipient safe owner has used. "Expiration_time" stores the day and time at which a granted access right expires regardless of the actual number of accesses the user has made. The value in "expired" indicates if the right of access has expired, revoked, or is still valid. Each time when an access to a file is made, the server checks the system time and compares the time with the value in the expiration_time to determine if access right has expired and writes the status, if necessary. Access right for a file may be set as "expired" if the number of used accesses has reached the limit. If this value is "Y," the server will deny an access request.

When a "grant_access" record is created, the access status is set as a valid grant. Each time when an access request is made by the recipient user, the server first checks the value of "expired" to determine if the right of access has expired. If it is, the server denies the access request. If the value indicates the grant is still valid, the server then determines if the right of access has expired due to the running of time after the last access. If the time has not expired, the server grants access to the file. After an access is made successfully, the server then determines if the number of access has been used up. The server counts all prior accesses, computes the number of the remaining accesses, and shows the remaining number as in FIG. 7D. The server may add one to the "access_count" after reach access. At the end of each access, the server then compares the number of accesses granted and the number of accesses used. If they are equal, the server saves the grant record as an expired grant in an archival table and deletes this grant record from active grant table. In the alternative, the server marks the "status" or "expired" as expired. If the access period has expired or if the access count reaches the access number, the server marks the value of the "expired" field as expired. Otherwise, it keeps the "N" value.

The files in the Other Safes table are retrieved from "file_info" and "grant_access" tables. An example SQL statement for retrieving information for constructing "Files You Have Right To Access" table would be as follows: select a.file_no, a.file_description, a.file_size, a.file_security, DATE_FORMAT (a.file_uploading_time, '%m/%d%Y %T'), b.recipient_safe from file_info a, grant_access b where a.file_status< >'Delete' and a.file_no=b.file_no and b.recipient_safe='safe account' order by a.file_no.

The files in the secure file drawer may be stored in a folder. The folder is provided for storage of the files that do not require the proof of uploading dates and times. Upon clicking "Your File Drawer", the server sends a page to display all files in the file folder. While the files are stored in the safe's folder physically, they may be displayed in different ways. They may be displayed in a folder-tree view or a table view. A custom client application may be used to show the files in a file tree view. Regardless of the method of display, the server must find the folder, get files information such as folder structure/file paths, file names, file types, and files sizes, and use the information for displaying the folder tree on the browser or a custom client application. The files in the secure file drawer are different from files in the user own safe in several aspects. The files are not assigned by system-wide file numbers, are not encrypted by individual keys, and can be deleted without trace. The files are saved in an account folder or other proper folder. A plurality of folders may be assigned to one single safe account, and the storage folders for the whole may be allocated on multiple storage partitions. It is preferred that each safe has a personalized folder.

Files can be downloaded from the File Summaries page (FIG. 7A) or the File Download page. Each of the files on the File Summaries table is associated with a link of Decrypt or Download. The files that are encrypted with single key or two keys are associated with Decrypt links while the files that are pre-encrypted or not encrypted are associated with a simple download link. File summary also has a page-navigating bar at the bottom, which shows up only when the found records are more than the page can accommodate under its current setting.

Figure 7E:
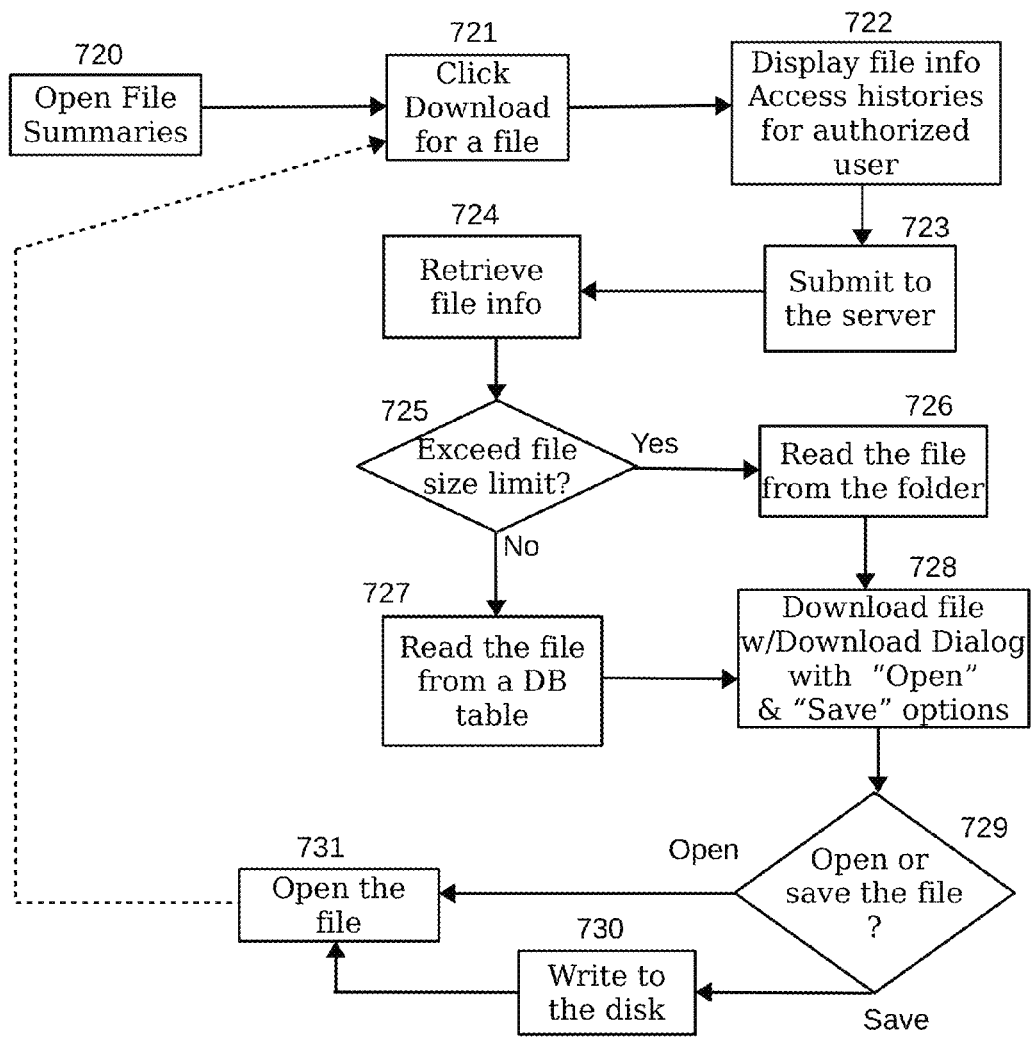
FIG. 7E shows the steps for downloading a file that does not require encryption key.

The process for downloading a file without private keys is shown in FIG. 7E. When a user clicks "Download" for a file at Step 721, the server generates a file-downloading page with a submission button at Step 722. The user submits the filled form to the server at Step 723. After receiving the submitted form, the server retrieves file information at Step 724. If the file size exceeds the size limit (in Step 725), the server reads the file from the safe's folder to a file buffer at Step 726; otherwise, it reads the file from the file_info table at Step 727. The server sends a file download dialog at Step 728. If the user chooses to save the file at Step 729, the client computer saves the downloaded file on the client computer at Step 730. If the user chooses to open the file at Step 729, the client computer displays the downloaded file for the user at Step 731.

Figure 7G:
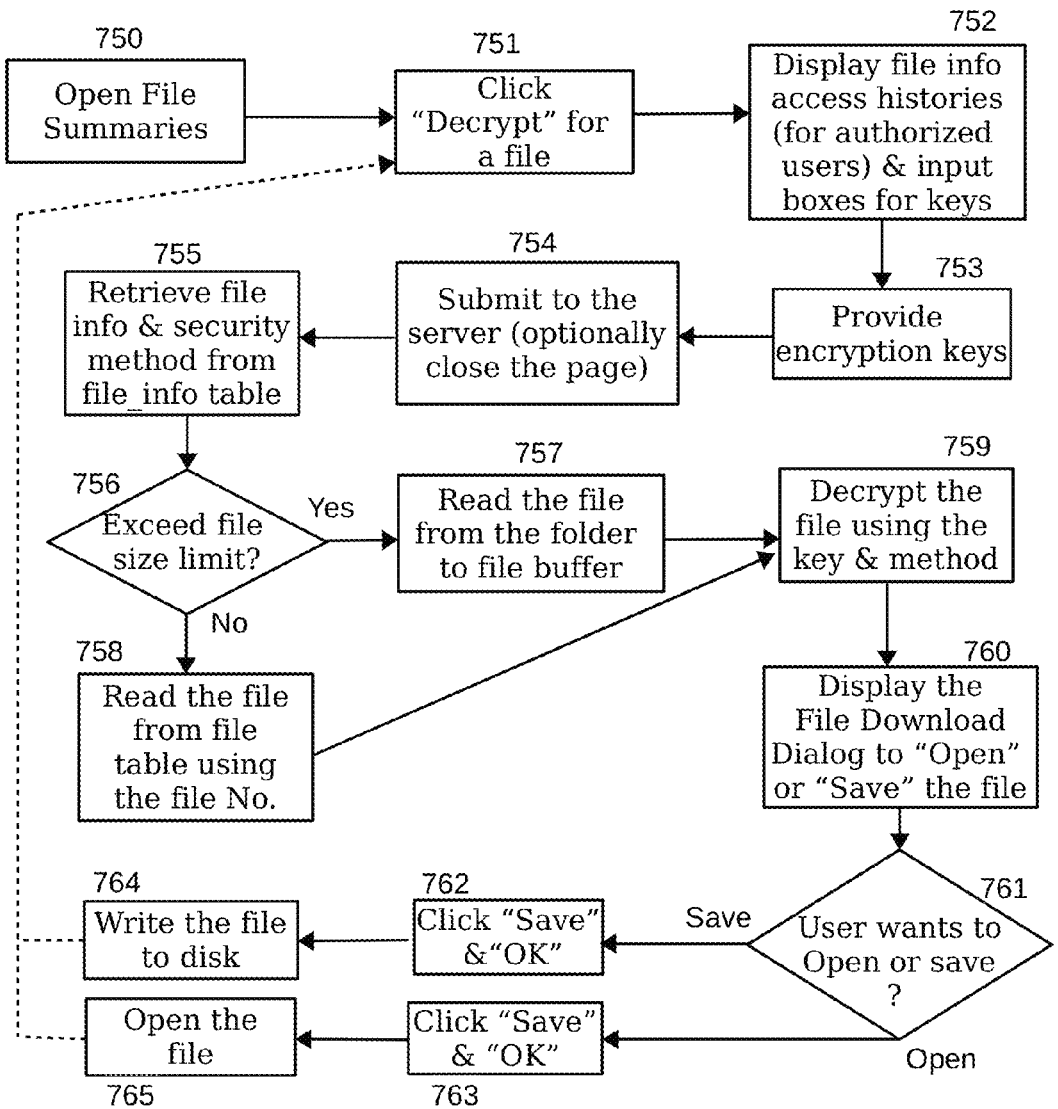
FIG. 7G shows the steps for decrypting and downloading a file.

FIG. 7F shows an exemplar page for decrypting and downloading a file. This page contains file information 735, and prompts the user to enter a key below a displayed hint in Block 740. The process of decrypting and downloading a file is shown in FIG. 7G. When the user clicks "Decrypt" for a file at Step 751, the server generates a form with input boxes for downloading the file at Step 752. If the file is encrypted by one encryption key, the form has an input box for one key, and if the file is encrypted with two keys, the form has two input boxes for two keys. The user provides encryption keys in the input boxes at Step 753 and submits the filled form to the server at Step 754. After receiving the form, the server retrieves file information including encryption method at Step 755. If the file size exceeds the size limit, the server reads the file from the safe's folder to a file buffer at Step 757; otherwise, the server reads the file from the file_info table at Step 758. The server decrypts the file using the user-provided keys and the same encryption method which have been used to encrypt the file at Step 759, and then sends to the client a file-downloading dialog (with options to save and open file and an OK button) at Step 760. If the user chooses to save the file at Step 761 and clicks on "OK" at Step 762, the client computer saves the file on the disk at Step 764. If the user chooses to open the file at Step 761, and clicks "OK" at Step 763, the client computer displays the file for the user at Step 765. The user may decrypt another file at Step 751.

The user may download a file by directly clicking "Download" directly on the navigation button (FIG. 7A). In downloading a file, the server retrieves the file from the database table or the safe's folder, and sends it to the client computer. The server needs to keep track of file type from the "file_path" field. If the file is in a format that the browser can open it, it is opened on the browser unless the file is encrypted before it was uploaded. If the file is in a file format requiring a special application to open, the user is prompted by the browser to save the file on the disk of the client computer.

If the user downloads a file that is encrypted by one or two keys, the server retrieves the two hints from the relevant record in the "file_info" table and sends a page to display hints next to the two input boxes for accepting encryption keys. After the user types in two keys, the user starts downloading the file by clicking the "download" button. After the file is downloaded, the user may be prompted to send back a feedback about the file condition if the file has not been downloaded before. The test result may be written in an optional field "verified" in the database table "file_info." If this field has been marked as good, the server does not prompt the user to send feedback. When a user downloads a file, the general steps for downloading the file are as follows:

(1) The server generates a web page for downloading the file, the page contains file number, file type, input boxes for encryption keys; the page may also include one or two hints.

(2) A user provides the encryption keys in the input boxes on the browser and submits the page to the server.

(3) The server retrieves the values for the encryption keys from the submitted data.

(4) The server uses the file number to find the record from the database table "file_info" and gets the value from "security" field, and constructs a decryption method.

(5) The server retrieves the file from a source folder or from the "file_content" field of the file record in the database table "file_info."

(6) The server then decrypts the file using the same encryption algorithm and the keys.

(7) The server discards and deletes the encryption keys.

(8) The server sends the file download dialog for downloading the file.

(9) The user chooses to open the file or to have the file saved, and starts the download process, and has the temporary file deleted.

(10) The browser opens the file if the user selects this method, or saves the file on the local disk if the user selects this method.

(11) The user opens the file using a proper application if the file has been saved.

The server sends the download form and receives a filled form and data by using SSL layer.

I. File Details and Related Features

In the "Files in Your Own Safe" page, the user can open the "File Details" page (FIG. 8A) by clicking any file number (FIG. 7A) or an optional "details" link. The File Details page contains side menu 800, file details, and information about third parties who have right to access (in Block 801).

At the top of the File Details page shown is the basic information such as safe name, safe number, safe owner, and access code. This page contains the details of the file that the user has selected. File details include file number, uploading date and time, description, encryption method, file size, verification status, and file status together with several operation buttons on the left. It also shows the safes and access codes of the safes that have right to access the file.

On the "File Details" page (FIG. 8A), the user can use the left menus 800 to change the file status (FIG. 8B), delete a file (FIGS. 8C, 8D), change access right (FIGS. 8E-8H), order certificates (FIGS. 8K-8P), view encrypted details, and view file access histories. Each of the operations works only on the file associated with the file number.

The user can open the page for changing file status by clicking "Change Status" (Block 802 in FIG. 8B). Active files can be shared by authorization, and global files are accessible by any user. The default value of the file's status is "active" and the user can change it to "inactive" or "global." When the file is inactive, it can be accessed only by the safe owner while an active file can be accessed from both the owner safe and authorized safes. To change file status, the user just selects a status option, and hits the "Enter" key or clicks the "Change" button. In response, if the status is changed successfully, the server returns a success message. Otherwise, it returns an error message. File status is stored in the field "file_status" of the "file_info" table. One of examples of the SQL statements for implementing the status would be: update file_info set file_status='the selected status value' where file_no='the file number the user selected.'

Figure 8C:
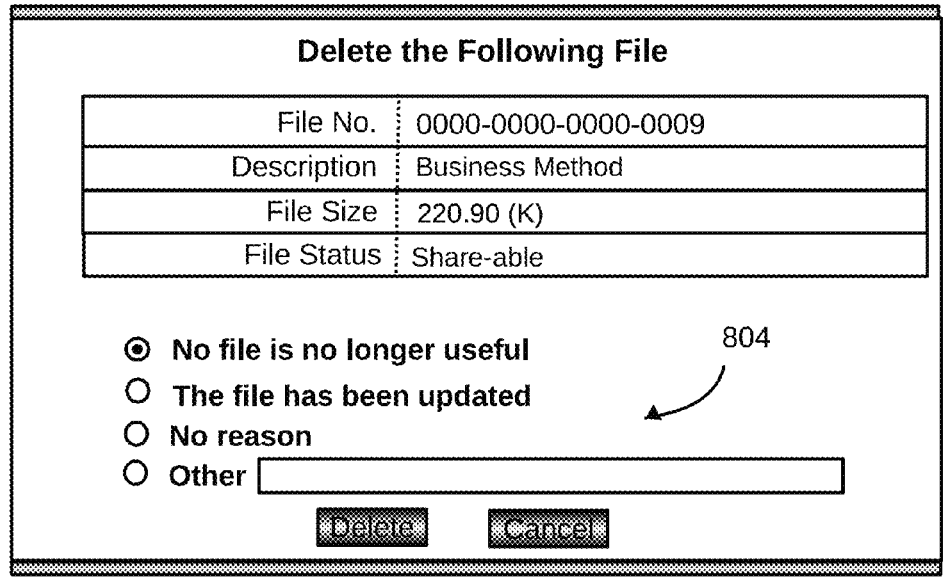
FIG. 8C shows the page for deleting a file.
Figure 8D:
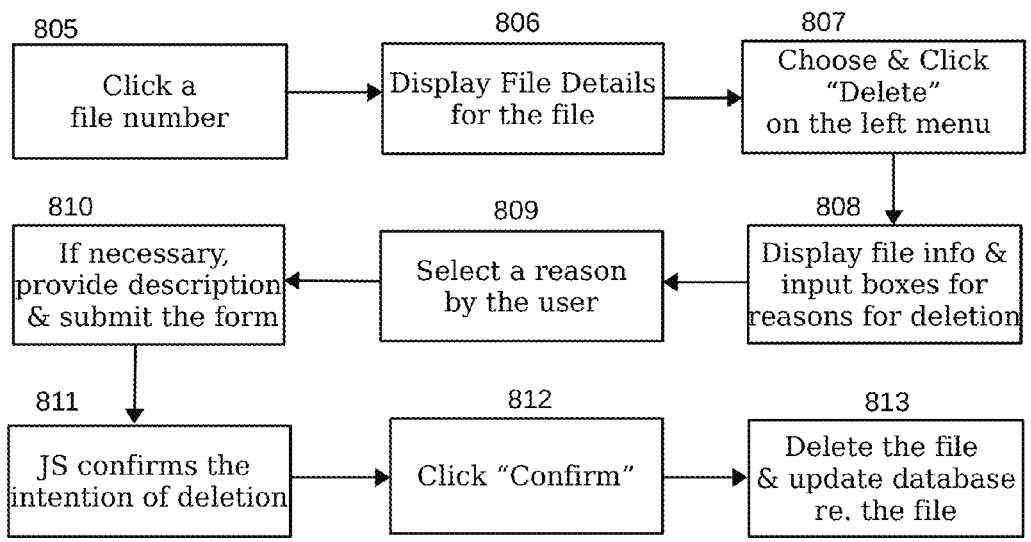
FIG. 8D shows the steps for deleting a file.

On "File Details" page, the user clicks "Delete File" on the left menu, and the server sends the page for deleting the file (FIG. 8C). This page allows a user to choose reason for deletion in Block 804. The process of deleting a file is shown in FIG. 8D. The user cannot delete file of others that the user has right view, download or decrypt. After a file is deleted, it is not shown on the "File Summaries" table. However, file histories for deleted files are maintained for a period of time. It is preferable that the user may have an option to view the file histories of deleted files. The information to be viewed by the safe owner includes file number, update date, deletion date, file description, and a series of access-history data such as access date, access type, and access party.

The process for deleting a file is shown in FIG. 8D. On the File Summary page, the user clicks a file number at Step 805. The server sends the page of showing file details for the file at Step 806 and the user clicks "Delete" on the left menu at Step 807. In response, the server sends a page with multiple choices and an input box for entering the reason for deletion at Step 809. The user selects a reason from the multiple choices or types in a reason in the input box, and submits the filled form at Step 810. The browser displays a dialog with a "Yes" button for confirming that the file will be deleted at Step 811. Upon clicking "Yes" at Step 812, the server deletes the file and file information, and writes a record in the table for deleted files at Step 813.

If the file is deleted successfully, the server returns the message that "the file has been deleted successfully!" If the server encounters an error, it returns an error message. Once the file is deleted, it cannot be downloaded. When a file is deleted, the file is permanently deleted and is no longer available for download. The file may be recoverable only from backup media under special circumstances. When a file is deleted, basic file information and past access histories are stored in the "deleted_files" table. The table used in one version embodiment has the following fields: safe_name, file_no, description, deletion_id, delete_time, file_delete_reason, and file_access_summary. The deletion time and the reason for deletion are also stored in the "deleted_files" table. The server then copies the uploading time and file description from the "file_info" table and actual access times, access safes, and access type from the table "access_histories," and writes them in the "file_access_summary" field. The format may be a series of delimited data groups (access date, access party, access type; access date, access party, access type).

Figure 8E:
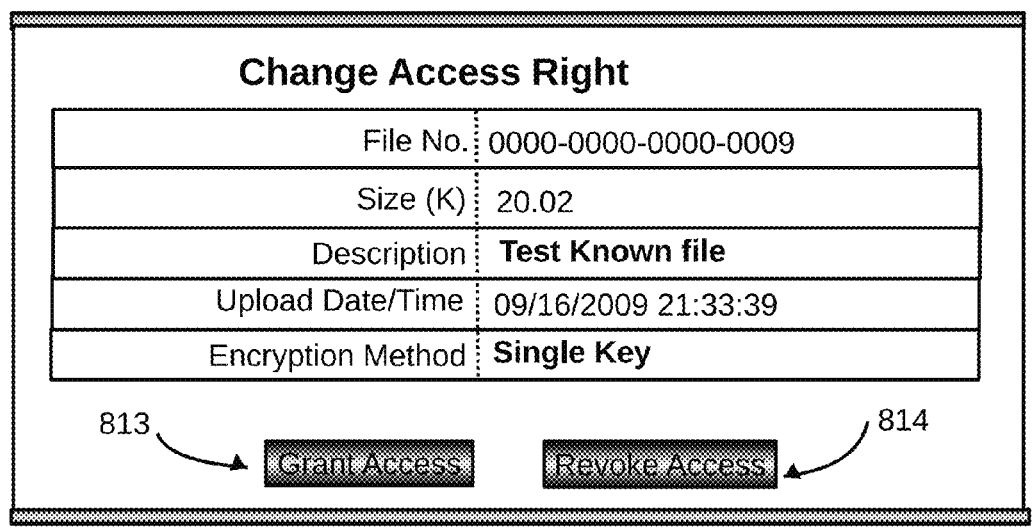

The user can grant the right of access to a safe of a second user by clicking "Change Access Right" (FIGS. 8E-8H). FIG. 8E shows Grant Access 813 and Revoke Access 814.

"Type of Access" defines three kinds of rights of access: "View Summary", "View Summary and Download File", and "View Summary, Download & Decrypt File." The first option allows an authorized safe owner to read the summary information about the file only. The second option allows the authorized safe to read summary information and download the file. The third option allows the authorized safe to read the basic information about the file, decrypt it, and download it.

"Access Number Limit" is used to limit the total number of complete access. If access type is to view file summary and download file, viewing summary and downloading the file is counted as one access. Viewing the file summary alone is not counted as a complete access. The default value is that no limit, but the user can select or type in a number.

"Access Period Limit" is the time period that the authorized user can access the file. The default value may be 30 days, but the user can modify this value by entering any access period with a proper unit. If a second user is granted the right to download the file twice in 30 days, the user must exercise this right before the expiration of the 30-day period. The right expires when the number of access has reached the limit.

"Access number" is the access number made by authorized safe and is written in the access_number field.

Access code is used for verification purpose in granting or revoking right of access. The purpose is to prevent unintended grant of right of access as result of a typing error. The server compares the user-provided access code against the value in the "user_info" table to determine if the recipient safe name is correct. The right of access is implemented in a grant_access table. The general principle is that each of the grant records contains complete information for defining a unique access right. The record in the grant_access table is referred to as an "access record" or "grant record." The implementation must be able to handle active grants, expired grants and revoked grants. There are two ways to implement this feature. In one version of the embodiment of the present invention, only one grant table is declared and used for tracking all access rights. In this implementation, a "status"

or "expired" word is used for distinguishing active grants, expired grants and revoked grants. For any given file and given recipient safe, only one active grant is allowed. If the right of access to a file granted to a recipient is changed, the server marks the original grant as revoked and writes a new grant as active grant. If the user wants to grant the right of access to a file to a second user when a valid grant exists for the same recipient user and the same file number, the server first marks the existing grant as "revoked." It then creates a new record for the new grant for the same file and the same recipient. In this implementation, database records for revoked and expired grants will accumulate quickly and a large number of such records affect the speed at which the files are retrieved in recipient safes. This implementation preserves the complete grant history of each file. In the preferred embodiment, two separate tables are used. One table is used to store all active grants while the other table is used to store historical grants (all expired and revoked grants). When a grant is revoked, it is deleted from the grant_access table and written in the revoked_grants table. Whenever a grant is updated, the server moves the record from the active grant_access table to the revoked_grants table. If the server revokes and grants the access right successfully, it responds with the message "the access right is updated successfully!" Otherwise, the server returns the error message that "the safe name is incorrect" or "access code is incorrect."

A large number of grant records might exist for the same file and same safe. Among all grants, only the last one can grant right. All previous grant records are marked as "revoked" in the "status" field, or kept in the revoked_grants table. Even the last grant record may become invalid as a result of expiration of time and the use up of the granted access number. As a result, the file is not displayed in the recipient safe. For easy identification of grants, a unique "grant_id" is used for tracking the identifications of all grants. Each of the grant records is assigned with a unique id. There are two methods for tracking grant ID. Whenever a new grant record is to be created, the server gets the largest value from "grant_id", adds one, and writes the value in the "grant_id" of the new grant record. In the alternative, the grant-id field can be declared as an integer with automatic increment. This may impose a restriction on system administrators because it disallows them from manually assigning a grant number.

If the user wants to grant additional right for the same file and same user, the server creates a new grant record. There are two ways of implementing the method of updating right of access for any file. In the first method, all grant records are stored in one single table. When a record is revoked or expired, the value in the status field is assigned with a special value indicating its invalid status. The "status" field in the old grant record is marked as "revoked" or "expired." If two separate tables are used for managing and updating access rights, the two tables may be different. When a request is made to update a right of access for the same file and same recipient safe, the server copies all material information from the old grant record and saves it in a table holding revoked and expired grant records for record-keeping purpose. The revoked_grants table contains data such as revoke_id, revoke_time, grant_time, revoke_reason, and grant_info (text) that holds past grant histories (e.g., recipient_no, grant_time, access_type, access_number, and expiration_time). Whenever right of access is updated, one new grant record is created in the grant table and a revoked grant record is created in the revoked_grants table.

An example SQL statement for revoking access right would be: delete from grant_access where file_no='the file number the user selected' and recipient safe='the account of the user to be revoked'. An example SQL statement for granting new access right would be as follows: insert into grant_access(file_no, safe-name, recipient_safe, grant_time, access_type, access_number, access_period) values('the file number the user selected', 'the safe name of the file owner', 'the safe name of the second user', 'the current time of the server', 'the selected access type', 'the selected access number', 'the selected access period');

Before an old grant record is deleted, the server may extract all substance from the old grant record and write the substance in the "revoked_grants" table for permanent record. The table structure of the table for revoked grant records is flexible as long as the table can effectively use storage space. The server then deletes the old grant record.

Figure 8G:
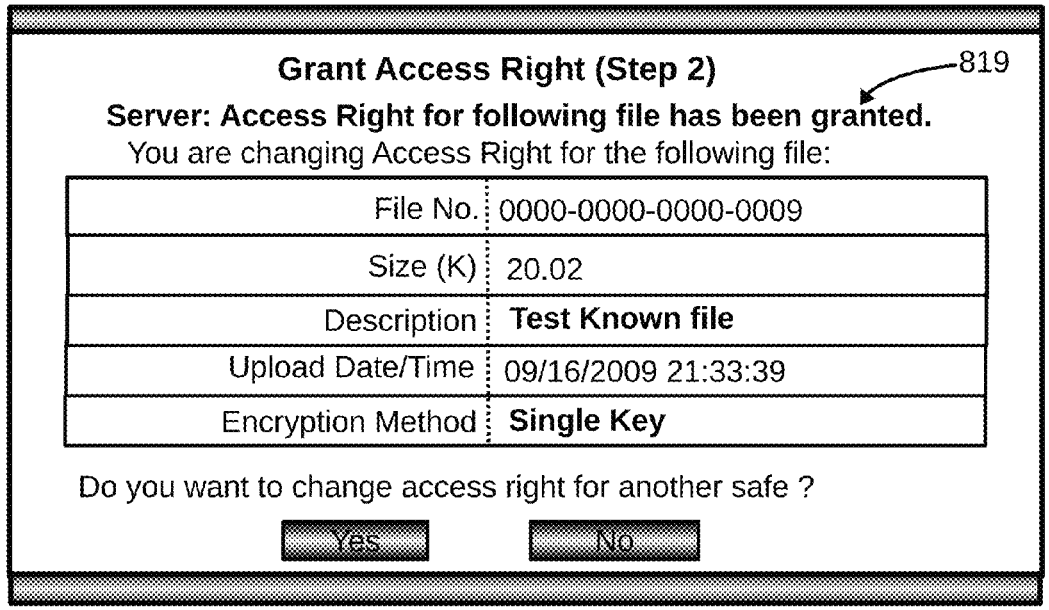
Figure 8H:
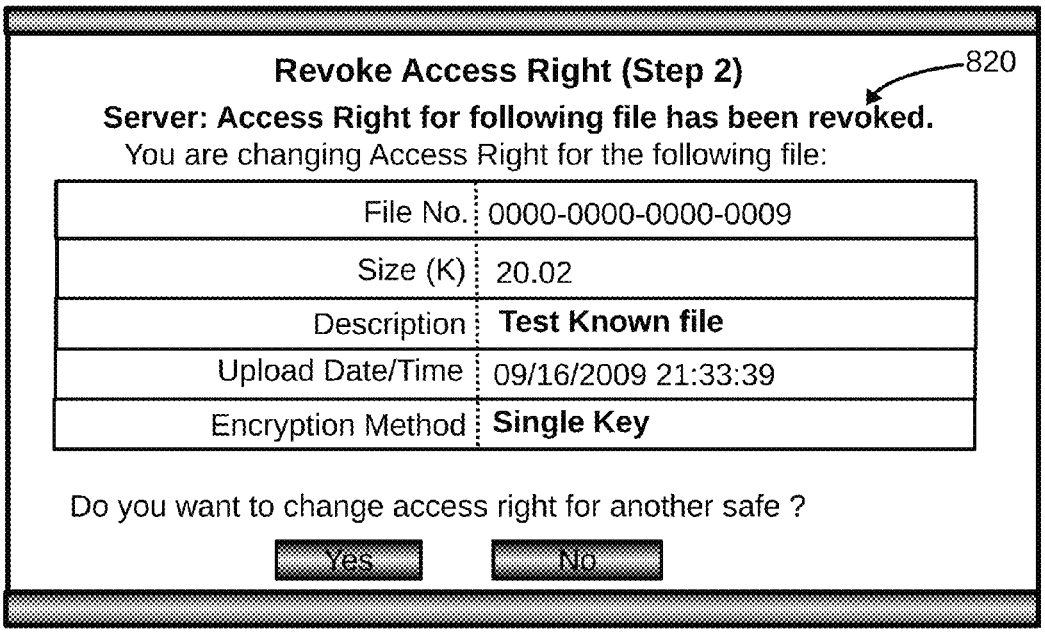
FIG. 8H shows the last page for revoking right of access for a single file from a safe.
Figure 8I:
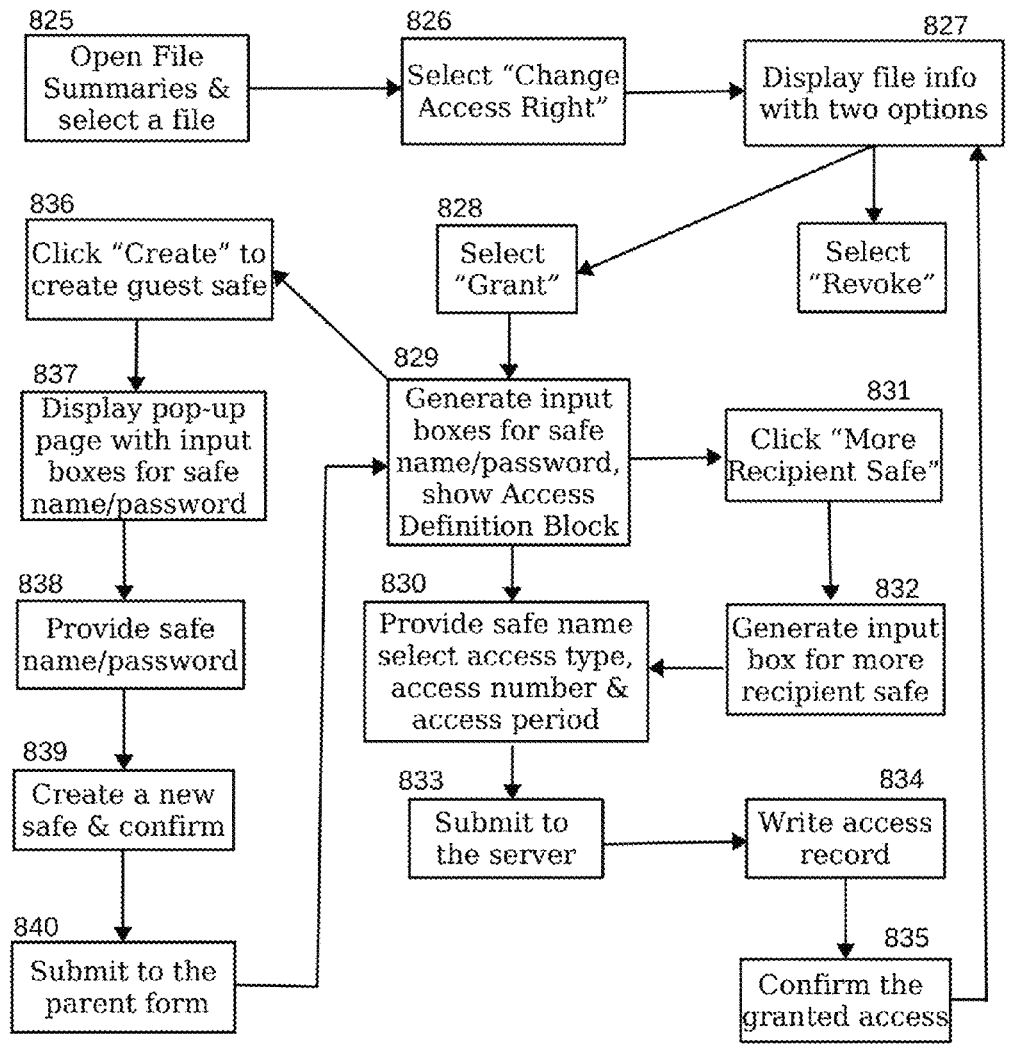
FIG. 8I shows the steps for granting right of access for a single file to a safe.

The process of granting right of access to a file is shown in FIG. 8I and the related web pages are shown in FIGS. 8E-8G. The user first opens File Summaries and selects a file at Step 825. The server sends a File Details page for the file together with the menu "Change Access right" on the left (FIG. 8A). The user clicks "Change Access right" at Step 826. The server sends a page showing file information with two options of "Grant" and "Revoke" and a "Continue" button at Step 827. The user clicks "Grant" and presses "Continue" at Step 828. The server updates the page by including a recipient safe name block consisting of two input boxes for safe name and access code and an access definition block at Step 829 (also see Block 816 and 818 in FIG. 8F). The access definition block allows the user to define access type, access number and access period (Block 818 in FIG. 8F). If the user wants to grant right of access to plural recipient safes, the user clicks "More Recipient Safe" at Step 831, and the web page generates one more recipient safe name block consisting of two input boxes at Step 832. The user may remove a recipient safe name block (except the first one) by clicking "Fewer Recipient Safe." (also Block 817 in FIG. 8F) The function of adding or removing a recipient name block is realized by running an embedded JavaScript program. The user then provides safe names and access code in the input boxes at Step 830 and submits the form to the server at Step 833.

Upon submission at Step 833, the server gets the values of the safe name and access code that the user has typed in and compares them with the values of safe names and access code in records in the "user_info" table. If a record is found, the safe name that the user has provided is assumed to be right. Otherwise, the server responds with an error message like "safe name is incorrect" or "access code is incorrect."

At Step 834, the server first checks if a prior grant exists for the same safe and the same file. If yes, the server deletes the old grant record from the active grant table and writes a copy of the old grant in the table for revoked and expired grants. The server then writes the new grant in the active grant table. The server responds with a message that right of access has been granted or updated (See also Block 819 in FIG. 8G), depending upon whether a prior grant exists for the same file and same safe. The server processes grant on the basis of the recipient safe. When right of access is granted to multiple safes, the grant may be a new grant for some safes but an updated grant for other safes. Plural messages may be returned for the recipient safes.

If an intended recipient does not have a safe on the system at Step 829, the user may create one for the recipient by clicking "CREATE" next to safe name caption in the recipient safe name block (FIG. 8F) at Step 836. In response, the server generates a pop-up page for creating a guest safe at Step 837. The user then provides proposed safe name and tentative password, and optional email address at Step 838. Upon pressing the "Create" button at Step 839, the server verifies if the proposed name has been used, creates a guest safe together with the safe name and a system-generated access code, and sends a pop-up window containing confirmation message. If the server is unable to create safe, it responds with an error message. The user "submits" the pop-up form at Step 840 to the parent form to repeat the Step 829, and the access code value will be copied to the input box for access code in the originating recipient safe name block at Step 829. The user follows the steps after Step 829.

If the user knows the safe name but does not know its access code, the user can click "FIND" next to the access code in the recipient safe (See Block 816 in FIG. 8F). In response, the server generates a pop-up form containing an input box for searching safe name in the safe account table. The pop-up search form may be filled with a safe name from the parent page or accept user-inputted safe name as a search key. The user then starts a search by clicking "Search" on the pop-up form. In response, the server sends a page to display the safe name, the access code, the owner's name, and optional information such as email address and phone number. If the safe is an intended recipient, the user submits the pop-up form to the parent form, and writes the found access code in the access code box in the recipient safe name block.

When the server grants the right of access to a file, it creates a record for the selected file number in the "grant_access" table. The recipient safe name is written in the recipient_safe field in the table. Upon successful grant, the server returns the message "the right is granted successfully!" If right of access to a file is granted to the same recipient, the server first retrieves the existing grant record, extracts substance from the record, and writes the substance in the archival table. It then deletes the existing grant record and writes a new grant record containing the user-defined parameters such as access type, number of access, and duration of access.

Figure 8J:
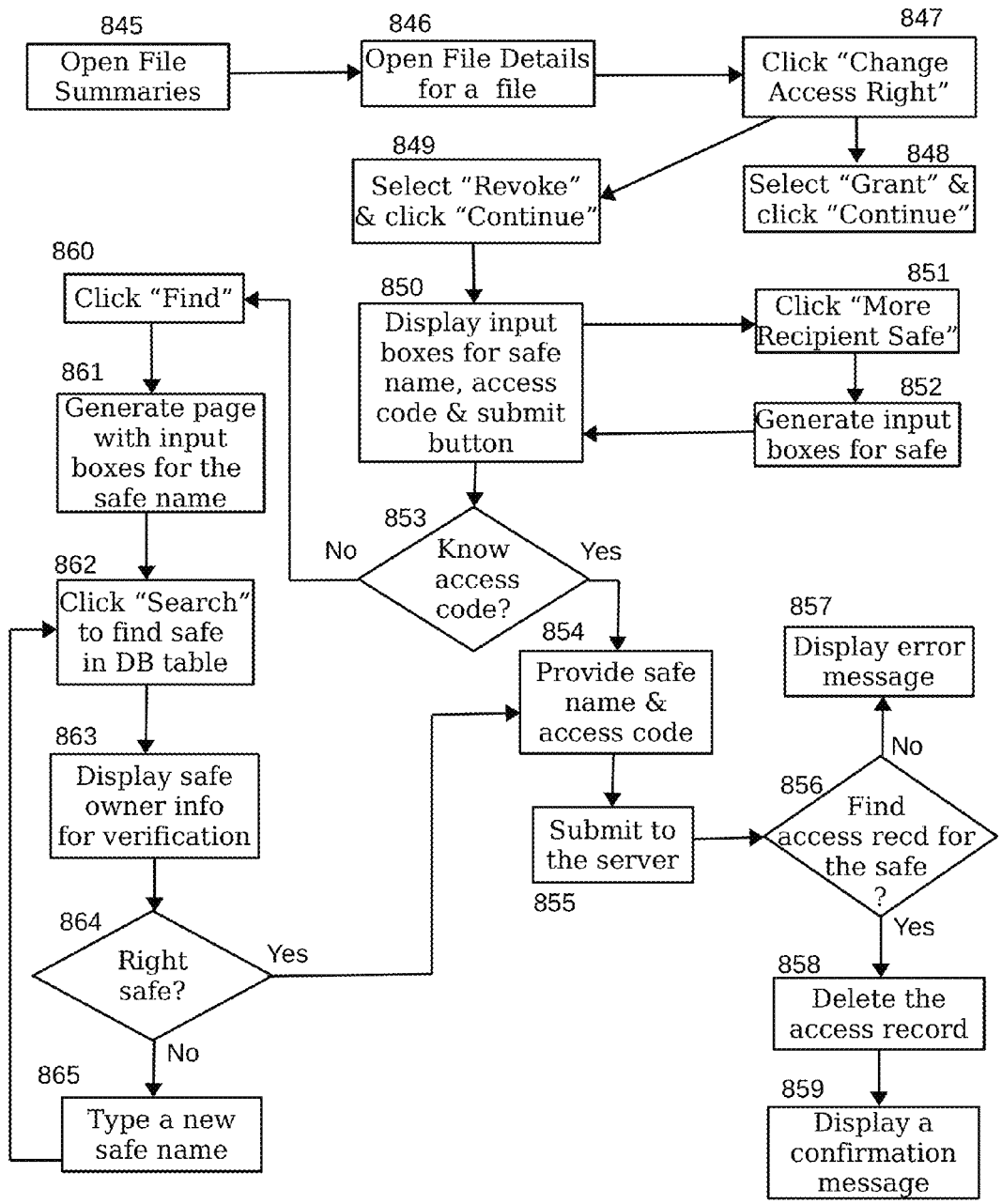
FIG. 8J shows the steps for revoking right of access for a single file from a safe.

A user can revoke right of access to the user's safe any time by the process shown in FIG. 8J. The user opens File Summaries at Step 845, and clicks a file number to open File Details at Step 846. The user then clicks "Change Access Right" at Step 847. In response, the server opens "Change Access Right" (FIG. 8E) with two options "Grant Access" or "Revoke" (See also Blocks 813 and 814 in FIG. 8E). The user selects "Revoke" and presses the "Continue" at Step 847. If the user clicks the "Revoke" button at Step 849, the server shows a page containing basic file information, a list of safes having right of access, and input boxes for safe name and access code at Step 850. The user determines if access code is available at Step 853. If the user knows the access code, the user provides safe name and access code at Step 854. If the user does not know the access code, the user clicks "FIND" at Step 860, generates a pop-up search page containing an input box for searching safe name at Step 861, conducts a search at Step 862, and displays the owner information at Step 863. The search result may include safe name, access code, owner's name, and optional information such as email address and phone number. If the user cannot find proper access code, the user conducts another search at Step 862. Otherwise, the user submits the safe name and access code to the parent form at Step 854. Upon submission, the server gets the values for the safe name and the access code, and finds a record from the "user_info" table at Step 855. The server then determines if a prior grant exists at Step 856. If it finds a valid grant for the same file and same recipient safe, the server retrieves the old grant record, gets data from the record, writes the data in a record in the "revoked_grants" table for archival purposes, and then deletes the old grant record at Step 858. It finally displays a confirmation page at Step 859 (See the message at Block 820 in FIG. 8H). If the server cannot find any grant record for the safe, it displays an error message at Step 857.

By clicking "Order Certificate" on the left of the "File Details" page (FIG. 8A), the server opens the page for ordering an authenticity certificate for a single file (FIG. 8K). The user may request three kinds of authenticity certificates for each of the files in the "File Summaries" page. The details for ordering a certificate showed in FIGS. 8K-8P are similar to the pages shown in FIGS. 11A-11B except that the user can order a certificate only for one file a time while the page in FIG. 11A allows the user to order a certificate for multiple files. The server shows file information 871 in FIG. 8K, the user selects a safe in Block 873 in FIG. 8L, and the server confirms the order with a prompt in Block 874 in FIG. 8M. The user can also order a hard-copy authenticity certificate by using the pages in FIGS. 8N-8P. The details for ordering a hard-copy certificate are similar to the process shown in FIGS. 11A, 11C except that the user can order a certificate only for one file. The server shows file information; then the user enters recipient safe in Block 875 in FIG. 8N, enters recipient address in Block 876 in FIG. 8N, selects to have the file included in Block 877 in FIG. 8N, and selects delivery media in Block 878 in FIG. 8O. The server shows a server message about the placed order with a prompt in Block 879 in FIG. 8P. One sample of certificates is shown in FIG. 9 together with a link for opening a PDF version in Block 900 in FIG. 9.

The File Details (FIG. 8A) allows the user to view encrypted file details of an individual file. In uploading the file, the server or the client creates a file details data string. This string was encrypted using the same algorithm and the key that were used to encrypt the file. When the user clicks "View Encrypted Details," the server retrieves the data, decrypts it by the same key and algorithm, splits up the decrypted string to get component data pieces, fills the data pieces in the form substantially similar to the file details page, and sends the page to the client computer for rendering.

The File Details (FIG. 8A) allows the user to view access histories by clicking "View Access Histories" on the left. An opened table shows the actual access parties, including safe_names and party full names. Each time when a file is accessed by a party, a record is generated containing access_no, file_no, safe_name, access_id, access_date, access_safe, and contact information and phone number of the accessing party, and action (view, decrypt and download the file). The "file_info" table may contain an optional field "access_total" for storing the total access number for the file. After each successful access to the file, this number increases its value by one unit. Therefore, the server immediately knows the total access number at any time.

J. Change Right of Access Under Access Management

Figure 10C:
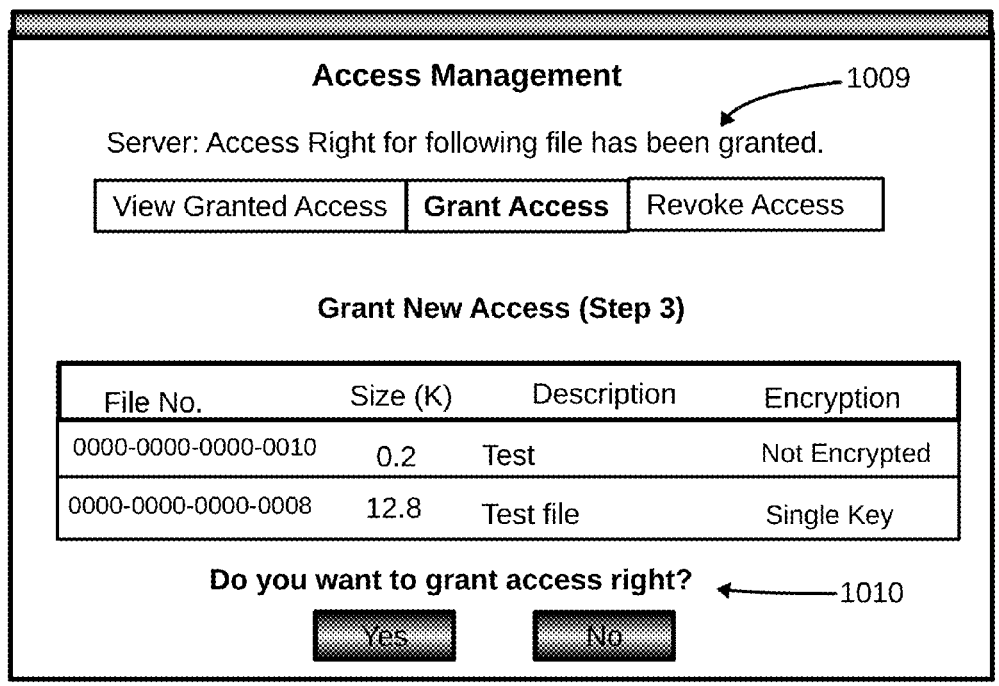

Under Access Management, the safe owner can view all granted rights of access by using the page initiated by clicking "View Granted Access" on the navigation bar (FIG. 10A). A safe owner can grant the right of access to his files to one or more other safes by clicking "Grant New Access" on the navigation bars (FIGS. 10A-10C). The functions of granting and revoking right of access page are similar to the functions of "Change Access Right" on the "File Details" page. The difference is that on this page the user can grant or revoke the right of access for several files at once.

Figure 10D:
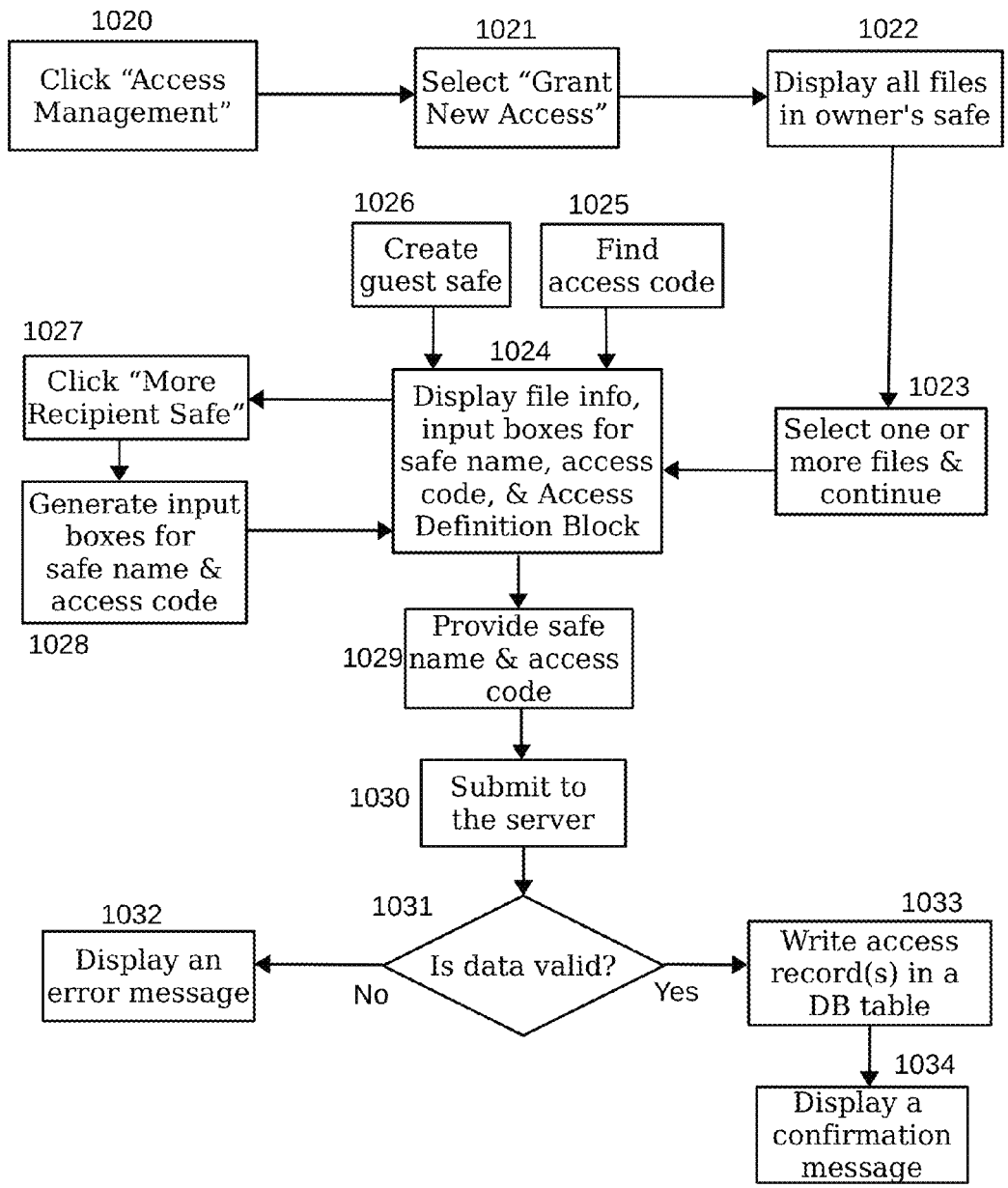
FIG. 10D shows the steps for granting right of access for a plurality of files in a safe.

The process of granting right of access to plural parties is shown in FIG. 10D. The user first opens Access Management at Step 1020. This page has menu "View Granted Access," "Grant Access" and "Revoke Access." (Shown in Block 1001 in FIG. 10A.) The user selects "Grant New Access" at Step 1021, and the server generates a page showing all files in the owner safe at Step 1022. The user selects from all the files (shown in Block 1002 FIG. 10A) the files that the user wants to grant right of access by checking the box next to each of the files (FIG. 10A) at Step 1023. The server sends a page showing file information for all selected files, a recipient safe name block, and an access definition block (see Blocks 1005, 1006 and 1008 in FIG. 10B) at Step 1024. The user provides safe names and access codes for intended recipient safes, and defines the right of access by clicking three sets of the selection buttons in the access definition block at Step 1029. The user submits it to the server at Step 1030. If the server finds that all data are valid at Step 1031, it writes grant records in the active grant table at Step 1033 and responds with a message that the operation succeeds at Step 1034 (See Block 1009 in FIG. 10C). If the operation fails, the server sends an error message at Step 1032. The server prompts the user to grant additional access right in Block 1010 in FIG. 10C.

In Step 1033, if the server finds that an existing grant record exists for a recipient safe, the server will update the access right. Before the old grant record is deleted, the server extracts data from the old grant record, writes the data in the "revoked_grants" table for permanent record, deletes the old grant record, and writes a new grant record in the active grant table. Like in the case of granting access right for a single file, the user may create more recipient safe name blocks for entering more safe names at Steps 1027-1028. The user can create one safe name block by clicking "More recipient safe" once, and remove a recipient safe name block by clicking "Fewer recipient name safe" once. If the recipient user does not have a safe account, the user can create a guest safe for a recipient user by clicking "Create" (See Block 1006 in FIG. 10B) at Step 1026. The page in FIG. 10B allows the user to search safe account database to find access code, in a way discussed for the process of revoking right of access in FIG. 8J.

Figure 10G:
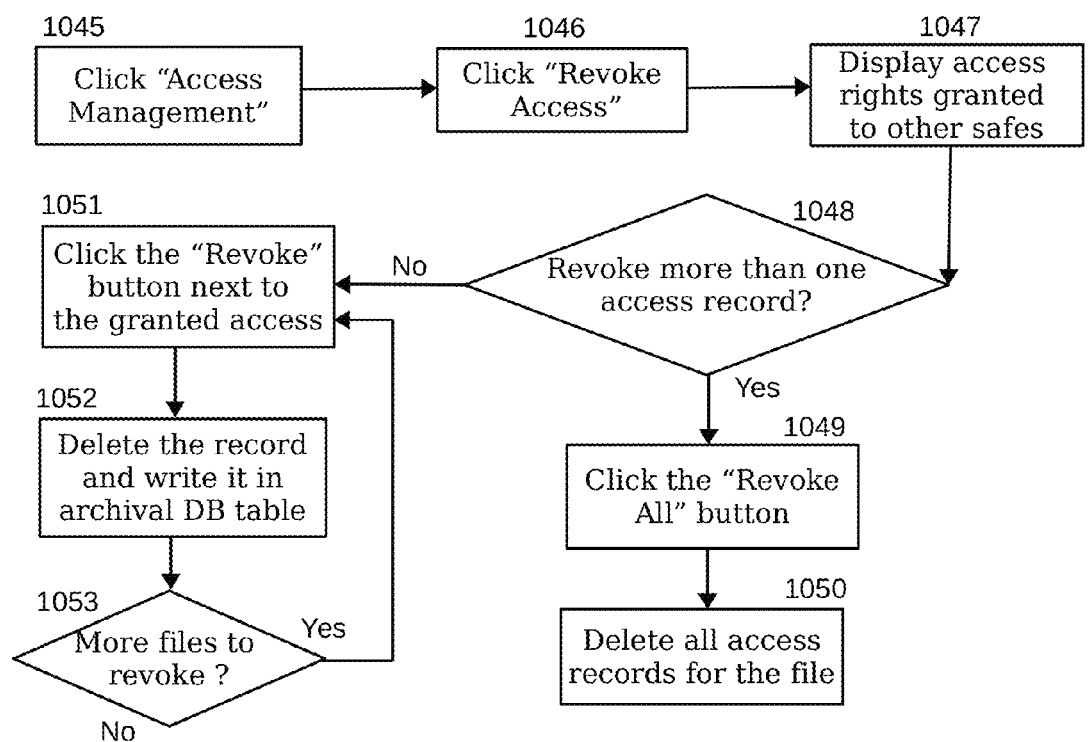
FIG. 10G shows the steps for revoking right of access for a plurality of files from safes.

The user can revoke right of access for plural files as shown in FIG. 10E-10F. The process is shown in FIG. 10G. The safe owner can perform this function by using the page initiated by clicking "Access Management" on the navigation bar (FIG. 10A). The user first opens Access Management at Step 1045, and clicks "Revoke Access" at Step 1046. In response, the server sends a page to display a list of existing grants shown in FIG. 10E. If the right of access to a file has been granted to many safes, the table contains one entry for each of the grant records. At the right side of each of the grant record entries on the table, a "Revoke" button is placed for use. If the user wants to revoke any of the grants, the user just clicks the button at Step 1051. In response, the server extracts data from the grant record, deletes the grant record from the active grant_access table, writes the data in the revoked_grants table for archival purposes and updates the web page reflecting the changes at Step 1052. The server returns a success message at the top of the page (Block 1042 in FIG. 10F). The user can repeat this process to revoke as many grants as the user wants. If the user wants to revoke more than one grant at Step 1048, the user just clicks the individual selection buttons on the left of the entries or clicks the column header button to select all entries, and clicks the "Revoke All" button at the bottom of the web form at Step 1049. In response, the server extracts the data from each of the grant records, deletes each of the grant records from the grant_access table, writes the extracted data for each revoked grant in the revoked_grants table for archival purposes, and responds with a confirmation message at Step 1050. As shown in FIG. 10E, the user can search file by using file number input box 1040 and recipient safe input box 1041.

K. Control Access by Encryption Key and File Status

After the right of access to a file is granted to a second user, the lack of encryption keys may still prevent the second user from accessing the file if the file is encrypted. The owner has the duty to give encryption keys to the second user so that the second user may decrypt it when the second user downloads the file. If the user provides encryption keys to the second user, the secrecy of the file will be lost forever. The system may provide an option that the user decrypts the file and stores it on the server so that the second user can access a file directly.

When the second user is granted right of access to a file, the second user can read file number, owner information, uploading date and time, file size, and encryption method. If the file is not encrypted, the second user can download and read the file. If the file is encrypted using one-key or two-key encryption method, the second user is prompted to enter the keys that the second user has received from the user by proper means. The server retrieves the file, decrypts it, and downloads it to the client computer of the second user. If the file is encrypted before it is uploaded, the second user may download the file that is still in an encrypted state. The duty to decrypt the file lies in the owner user and the second user.

The right of access to a file can be revolved by changing the encryption key for the file or making the file inactive. In each case, the user is informed of the effect of this action. In changing encryption keys, the server first uses the old keys to decrypt the file, then uses new keys to re-encrypt the file, and copies the old uploading time. In updating encryption method, the system may create a new file record in the file_info table with a new file number. The system may keep the old file as an inactive file for a period of time, and delete it after the user has successfully downloaded the newly encrypted file and decrypted the file with a success feedback. Before the server deletes the file, it can move the old file record and the file itself from the "file_info" table to a correspondent archival table. It is preferable that an email message is sent to the email address of the safe owner concerning the access to the file.

Figures 12, 13:
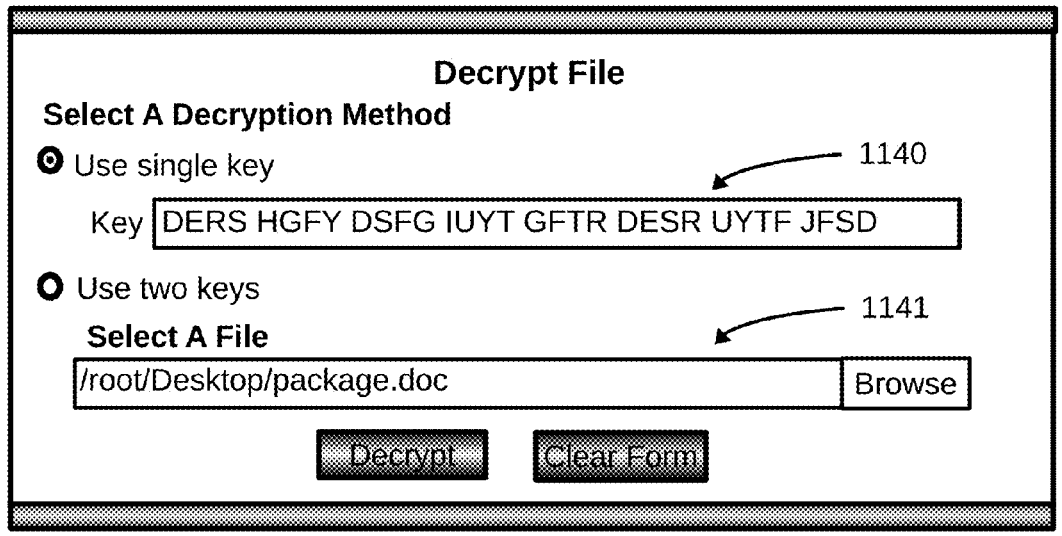
FIG. 12 shows the page for decrypting a standalone file that has been encrypted according to the encryption method used by the safe system.
FIG. 13 shows the page for conducting a search for files that are marked as global files.

Additional features include an independent decrypting function (FIG. 12) and global search function (FIG. 13). The page for decrypting file contains a file path browser 1141 and an encryption key input box 1141. The global search page contains a search box 1201. Both of the functions may be called from any client computer without logging in any safe. By using this function, a user can decrypt a file that has been encrypted by a private key and using an encryption algorithm on the same system, but has been downloaded without decrypting it. This function includes selecting one-key or two-key encryption method, uploading the file, decrypting the file on the server, and downloading the decrypted file back to the client computer.

The global search function allows users to search all files that are designed as global files, download and decrypt found files with private keys the users provide. If a file is not encrypted, anyone can find it, download it, and open it. If the file is encrypted, the user needs the encryption key to open it.

L. Order Authenticity Certificates for Plural Files

By clicking the "Certificates" button on the navigation bar, the server opens the page for ordering authenticity certificates (FIG. 11A). On the page "Certificate Management", the user may view electronic certificates, hard-copy certificates the user has ordered, and certificates from other safes by clicking respective buttons (Block 1100 in FIG. 11A).

The default table shows all files in the safe. The user can view a certificate for any of the files by clicking the "View" button under column View Electronic Certificate. A copy of the authenticity certificate for single file is shown in FIG. 9. The certificate contains a statement for certifying the authenticity of the file's basic information and may have an official seal of the corporation running the system. If a certificate is issued for only a few files, all information may be printed inside the certificate. If a certificate is intended for a large number of files, the file information may be printed on separate attached pages. The user can get a copy of PDF authenticity certificate by clicking the link at the bottom of the page FIG. 9. In response, the server sends a download dialog to prompt the user to select an option to save or open the certificate.

The user can download and print the certificate, and the user can freely distribute the certificate by email, mail or any suitable means. Such certificates are highly reliable because neither the safe owner nor the server staff can tamper them. The certificate may be used to prove or disapprove a transaction or event. The authenticity of the file contents can be established by the process of decrypting, downloading, and reviewing the file. The ability to access a decrypted file by intended recipients on the system allows the recipients to see the uploading time and the substance of the file. A certificate can provide further documentary evidence for the file.

Figure 11B:
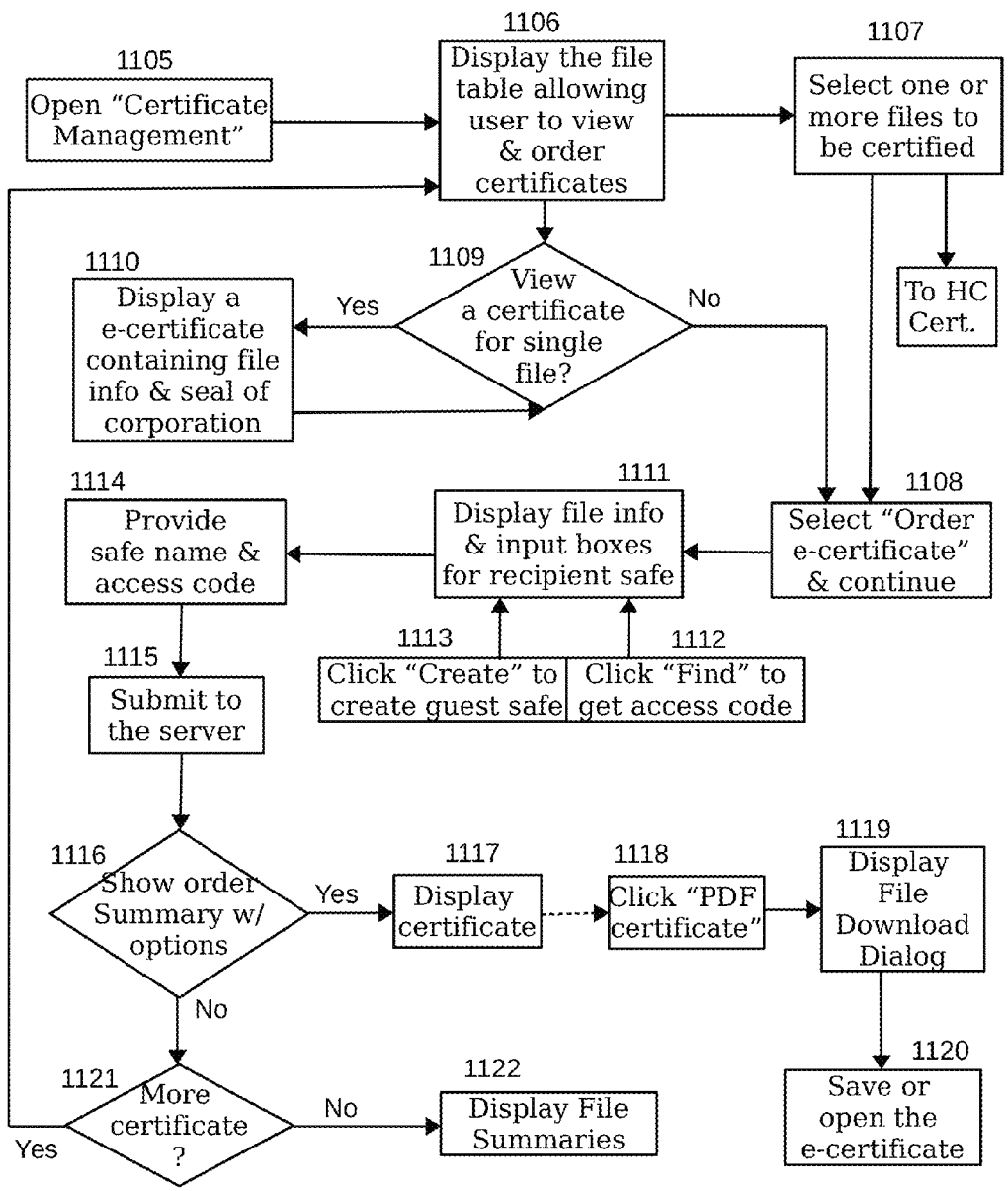
FIG. 11B shows the steps for ordering an authenticity certificate for a plurality of files.

Hard-copy certificate together with decrypted files on a suitable media may be directly sent from the custodian of records of the system management to the intended recipients. To order a certificate, the user checks the right boxes for the files to be included, and clicks the "Ordering Electronic Certificate" or "Order Hard-Copy Certificate" button in Block 1201 in FIG. 11A and presses the "Continue" button. The process of ordering an electronic certificate is shown in FIG. 11B, with web page views being similar to FIGS. 8K-8M. The user clicks "Certificate Management" at Step 1105, the server opens the page "Order New Certificate" at Step 1106. The page shows active files in the owner safe. If the user wants to view electronic certificate for a file, the user clicks it at Step 1109, and the server generates a certificate at Step 1110. If the user wants to order certificate at Step 1009, the user clicks "Order Electronic Certificate" and presses "Continue" at Step 1108, the server generates and sends an updated page showing all selected files and recipient safe name block at Step 1111. The user provides safe name and access code at Step 1114, and submits the filled form to the server at Step 1115. The server sends an order summary at Step 1116. The order summary contains (1) a summary of file information which will be printed on the certificate (2) choices for ordering another certificate or ending the ordering process, and (3) a link at the top of the summary table. If the user wants to view the certificate, the user clicks the link at Step 1116. The server displays a certificate at Step 1117. If the user clicks PDF file link at Step 1118, the server sends a file download dialog with Save and Open options and an "OK" button at Step 1119. The user may view the certificate or have it saved on the local disk at Step 1120. If the user chooses to end the process at Step 1121, the server sends File Summaries at Step 1122. If the user chooses to order another certificate at Step 1121, the server sends the page "Order New Certificate" again at Step 1106.

In creating a certificate, the server gets the file information from the file_info table and places them inside the certificate. A good image may be used to provide background color. The web page is just a HTML page. A certificate for two files may contain following information:

File No: 1111-2222-3333-0000
Description: XYX Invention
File Size: 245 K
Uploading Date/Time: Aug. 27, 1970 12:20:54
Status: Active
File No: 1111-2222-3333-1111
Description: YYY Invention
File Size: 345 K
Uploading Date/Time Aug. 27, 1980 12:30:54
Status: Active The user can save certificate, print it, and distribute it to intended parties. An option is provided so that the user may have the PDF certificate sent to the user's email address. Optionally, the user may click "Create" to create a guest safe for a second user if the intended second user does not have a safe account on the server at Step 1113. The user may create input boxes for additional recipient safes by clicking "More recipient safe" at Step 1112. The page also has the function of finding access code by clicking "Find."

In an example implementation, the certificate is saved in the field "certificate" in the database table "certificates" or safe's folder. The table for storing certificate order in one version of the embodiment contains the following fields: safe_name, file_no, certificate_id, recipient_safe, recipient_safe_no, prefix, firstname, lastname, title, address, city, state, zip, country, phone, email, order_date, and certificate. The certificate may be delivered to intended recipients by (1) delivering it to the associated email address, (2) making the certificate available for downloading by the recipient, and (3) saving a copy in the recipient safe's folder. It is preferable to send the certificate to the email address of the intended recipient. If the certificate is made available for download from the safe's folder or the "certificates" table, it is preferable to send an email to notify the recipient that an electronic certificate is available for download. In addition, it is desirable to display a notice to the recipient when the recipient logs in the safe next time.

Figure 11C:
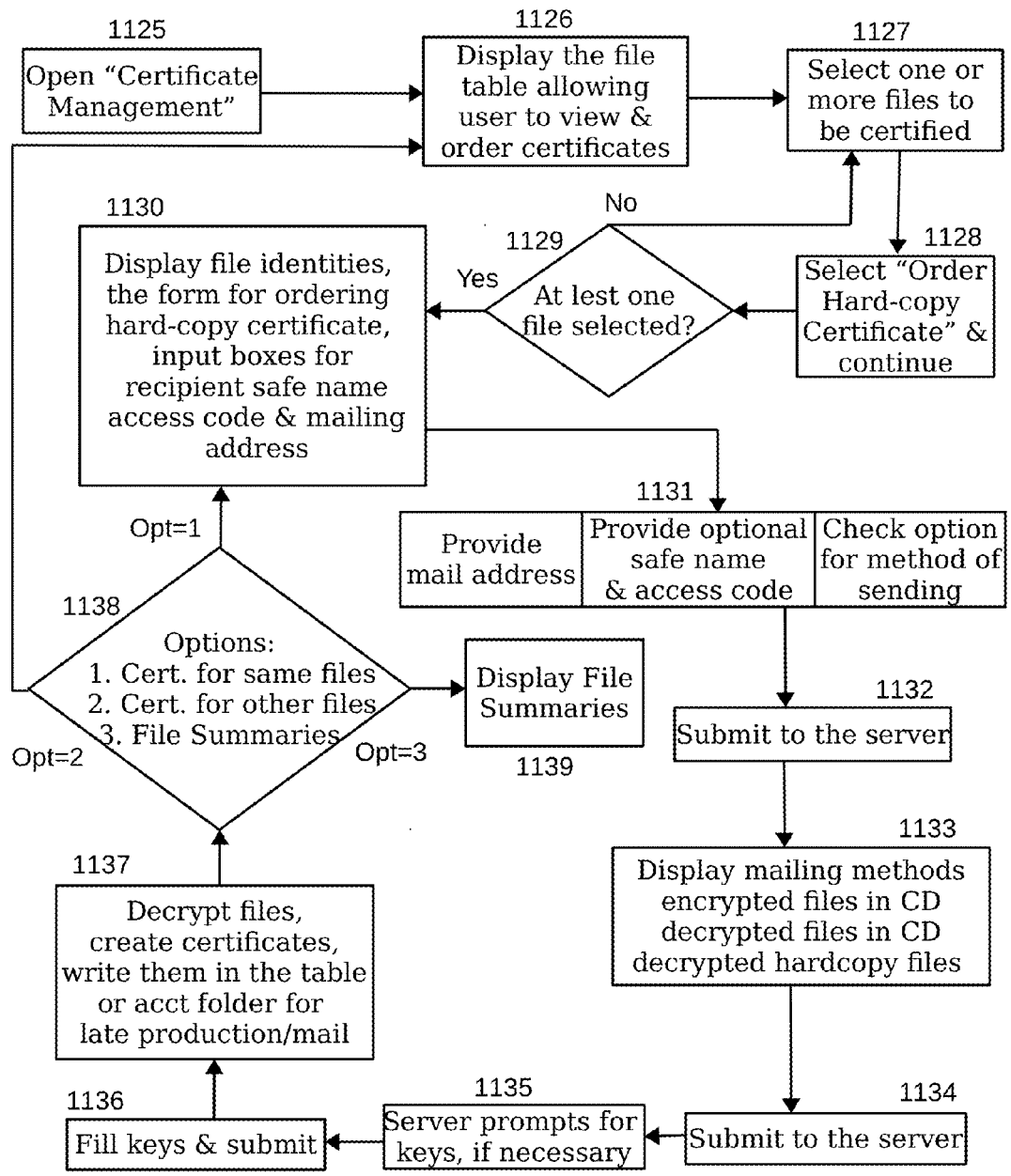
FIG. 11C shows the steps for ordering a hard-copy certificate for a plurality of files.

The user may order a hard-copy certificate for any of the files for any recipients by the process shown in FIG. 11C (similar to web page views in FIGS. 8N-8P). After opening Certificate Management at Step 1125, the server opens the page "Order New Certificate" at Step 1126. The page shows only active files in the owner safe. The user selects files at Step 1127, selects "Order hard-copy Certificate" and presses "Continue" at Step 1128. If no file is found at Step 1129, the web page (e.g., an embedded JavaScript) prompts the user to select files again at Step 1127. In response to a valid submission, the server opens the page for ordering hard-copy certificate at Step 1130. This page contains file summary for selected files, a recipient safe name block, a mailing address block, and an option for including file (similar to FIG. 8N). The user can inspect file summary of the selected files to ensure that the files are the intended files. The user may grant access to the files by providing the safe name and access code of the second user or ignore them at Step 1131. If an intended recipient does not have a safe account, the user can create a guest safe for the recipient. The user then provides the detailed mailing address in the mailing address block and indicates whether the files to be included at Step 1131. By default, the files are included unless a file is one that cannot be decrypted. After the user provides all information and makes all choices, the user submits the filled form at Step 1132. In response, the server generates a form concerning the media of the files and encryption state of the files at Step 1133. The options provided for each file on this form are (1) Encrypted File on CD, (2) Decrypted file on CD, and (3) Decrypted file printed on papers. If a file is not encrypted, the file cannot be decrypted, regardless of user's choice. The user makes necessary selection and submits this form to the server at Step 1134. In response, the server generates a form containing input boxes for encryption keys for each of the files in the table format at Step 1135. The user provides keys and submits this form to the server at Step 1136. Upon submission, the server processes the order, decrypts the files that are encrypted, generates a certificate, and writes the order in an order table at Step 1137. At Step 1138, the server finally responds with a page containing the file summary information, a link for viewing the certificate, and the options, respectively, for (a) ordering a certificate for the same files for another party, (b) ordering a certificate for other files, and (c) going to File Summaries. If the user chooses to order a certificate for the same files, the server sends the page at Step 1130. If the user chooses to order a certificate for other files, the server sends the page at Step 1126. If the user chooses to view Files Summaries, the server sends "File Summaries" at Step 1039.

In ordering a hard-copy certificate, the user may be optionally prompted to provide payment information in the proper boxes. Preferably, the web page has JavaScript for validating the data for each of the variable names to ensure that the address is good for successful mail delivery. The certificate is saved in the "certificates" table while order information is saved in a separate table. The staff of the system prints a copy of the certificate and the required files, necessary, and mails them to designated recipients by mail. Encrypted files and non-printable files such as binary files, sound files, and video files may be sent by CD discs.

M. Email Notification and Other Features

Optionally, the system has an email notification component for sending email notice upon the happening of an event according to a predetermined scheme. Events triggering the sending of email include, but not limited to, the following:

(1) When a user invites a second user to create a guest safe so that the user later can grant right of access to a file to the second user, the server sends email notice to the email address used by the second user.

(2) When a user sets up a guest safe and invites a second user to use it, the server sends email notice to the associated address of the second user.

(3) After many attempts are made to access a safe, the server sends email to the owner of the safe.

(4) When a user changes encryption keys for the purpose of revoking outstanding rights of access, the server sends email notice to the parties whose rights of access are revoked.

(5) When a user marks a file as inactive for the purpose of revoking rights of access, the server sends email notice to the parties whose rights of access are revoked.

(6) When the password of a safe is given to another party though online operation due to necessity, the server sends email notice to the email address of the safe owner.

Any of those events happens, the email notification component sends an email message to relevant email addresses according to the predetermined scheme. The email notification component may use different email addresses for different events. Optionally, a safe account may have one or more email notification addresses of commercial email systems.

The implementation of email notification is well known prior art. For Linux based server, the function may be realized by using the sendmail program. The message may be prepared and saved in a file or a field of a database table. The notification component reads a message text from the file or the suitable table and sends the message to recipient addresses by using the sendmail program. The notification component may be called upon the happening of a user's action. In the alternative, the notification component may be implemented in one single program by using a series of conditional statements for sending email. A message text file and particular email addresses may be associated with a particular event. For the example, the general email function in a CGI C module format may be SendNotification (int event, char text_body[ ], char email_address[ ][Max]) { . . . }, where the email_address variable contains a list of email addresses, which are read from a text file or a database table or constructed in run time. Several email addresses are allowed because it is necessary to send a message to different email addresses. Additional fields may be added to hold the recipient's names and title. For example, the table may look like:

| Event | Message Body | Email address |
|-------|--------------|---------------|
| 1 | Inviting message | address A, address B, . . . |
| 2 | Thank you message | address D |

In constructing the table, a unique integer is assigned to each "event" (For example, 1 for invitation, 2 for changing file status, and 3 for updating access right). On the basis on the integer value, the server first reads the related message text from the file or the table into the "text_body[ ]" and reads the email addresses from the file or the database table into "email_address[ ][MAX]." Then, the server makes a call to the program for sending email, and has the email sent. In one version of the embodiment of the present invention, the general steps for sending email are as follows:

(1) An event happens as a result of a user action or a server action such as expiration of time.

(2) The server reads a message text from a file or a database field consistent with the event.

(3) The server retrieves correspondent email addresses from the file or the database table consistent with the event.

(4) The server constructs the message body, and, if necessary, adds a link in the message body.

(5) The server sends the email message to the recipients using the email addresses.

Sometimes, email is not sent until a certain action takes place. For example, the server needs to check whether a grant of right has expired. The action of making this determination may be scheduled to take place at a certain time each day. Such scheduled email may be sent in a Linux machine by using Cron, which is a command scheduler that resides on the server and executes commands at intervals in seconds. It can be used to control daily, weekly or monthly jobs.

N. Different Implementations

The system of the present invention at an elementary level may be built to host a limited number of safe accounts. To show the concept of the present invention, there is no need to use commercial relationship database. A root folder may be assigned to each of the safe accounts and files may be saved in safe account folders. File information may be maintained in a system file for tracking file information. However, an implementation using a database application has two advantages. It can handle a large number of files efficiently and it allows users to search files efficiently.

Moreover, the database tables disclosed in this disclosure serve as examples. There are an infinite number of variations in the possible arrangements. While the example implementation is realized using Java and JSP, virtually any other programming languages may be used to implement the concept. For example, CGI C programs and Apache HTTP can be used to implement all of the functions. Even Shell scripts can be used to write code for implementing substantially all of those web pages. The same system may be implemented on a Windows Platform.

The present invention uses a browser as an interface with users. However, an alternative custom client can be used according to the concept of the present invention. The required building components can be found in many FTP clients, which were in the public domain. Many FTP clients have been published or are available for download as free or shareware, and they have the common features of browsing server file directories, showing file tree structures, uploading files to server, downloading files from a server, and changing files status such as security setting. Some FTP clients may be downloaded with source code. Therefore, those components can be used in combination with the encryption method and the secure file drawer to arrive at a secure drag-drop file drawer and digital safe. Also, the algorithms and source code for browsing directories, viewing files, changing file names are also available in many open source Linux systems. The source code can readily be modified to arrive at a secure file drawer and safe with drag-and-drop features. A custom client for a drag-drop file box can be developed for Windows, Mac, Linux, and Unix operating systems.

In those exemplary embodiments of the present invention, specific components, hardware parts, arrangements, and processes are used to describe the invention. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A file storing system, comprising at least one server and at least one client computer, both the at least one server and the at least one client computer being connected to the Internet, the system comprising:

means for creating a user account or a safe by a user, the safe or the user account being used by a first user;

means for encrypting a mark with an encryption algorithm as a common encryption algorithm and an encryption key as a common encryption key, and saving the encrypted mark for the first user on the at least one server;

means for determining if a current encryption algorithm is the same as or compatible with the common encryption algorithm and if an encryption key is the same as the common encryption key, wherein the determining means further comprises means for decrypting the encrypted mark using the current encryption algorithm and an encryption key, presenting the resulted mark to a user on one of the client computers, and accepting a confirmation of the user or a confirmation of the client computer;

means for generating a file-uploading form to be rendered on the client computer;

means for uploading a file from the client computer to the safe of the first user on the at least one server;

means for encrypting the file on one of the at least one server after uploading the file or encrypting the file on the client computer before uploading the file, the encryption being performed on the file by using the current encryption algorithm that has been determined to be compatible with the common encryption algorithm using the common encryption key, one user-provided encryption key, or two user-provided encryption keys;

means for saving the uploaded and encrypted file along together with file-tracking information on the at least one server;

means for showing on the client computer the uploaded file together with other individually encrypted files as a user safe or other files in a secure file drawer of the first user;

means for showing on the client computer any files in the user safe or any files in the secure file drawer of the first user; and means for generating a file-downloading page for a file, decrypting the file on one of the at least one server before downloading the file or decrypting the file on the client computer after downloading the file, the decryption being performed by using the current encryption algorithm and the common encryption key, a single-user provided encryption key, or two user-provided encryption keys, and downloading the file to the client computer of the first user.

2. The system of claim 1, further comprising means for selecting an encryption machine and means for saving location information of the common encryption key on the at least one server, whereby the at least one server generates a proper script for getting the common encryption key stored on the client computer.

3. The system of claim 2, further comprising means for granting right of access to at least one file in the user safe of the first user to a safe of a second user, means for the second user to select a file from the at least one file of the user safe of the first user, means for allowing the second user to provide one or two proper encryption keys, means for decrypting the selected file on one of the at least one server or a client computer, and means for downloading the selected file to the client computer of the second user.

4. The system of claim 3, further comprising means for encrypting a copy of the mark using an account password, saving the encrypted mark as a reference mark on the at least one server at a time of creating the encrypted mark, and means for decrypting the reference mark using the current encryption algorithm and the account password to yield a second resulted mark, and comparing the first resulted mark from decrypting the reference mark to determine if the current encryption algorithm is compatible with the common encryption algorithm.

5. The system of claim 1, further comprising means for allowing the first user to get an authenticity certificate for at least one of the files in the user safe, the authenticity certificate for each of the at least one of the files containing file uploading time, file size, and file description.

6. The system of claim 1, further comprising means for authorizing the safe owner of a second user to retrieve from the at least one server an authenticity certificate for at least one file in the user safe of the first user or the means for sending an authenticity certificate to the second user by email.

7. The system of claim 1, further comprising means for making a file in the user safe of the first user to be globally accessible, whereby any user of the system on a client computer can access the file and any user having one or two correct encryption keys can decrypt the file on one of the at least one server and download the decrypted file, or download the file and decrypt the file on a client computer.

8. The system of claim 1, further comprising means for downloading a program including the common encryption algorithm for decrypting standalone files that have been encrypted using the same algorithm and one or two encryption keys in uploading the files to the at least one server.

9. The system of claim 1, further comprising means for ordering at least one hard copy file together with an authenticity certificate containing a file description, uploading time, and file size.

10. A method of storing confidential files on a file storage system comprising at least one server and at least one client computer for proving a substance and creation time of the files, the method comprising the steps of:
creating a user account as a safe by a first user or another user using a safe name, an account name, or a number as the identity of the safe;
encrypting a mark with an encryption algorithm as a common encryption algorithm, and an encryption key as a common encryption key, and saving the encrypted mark on the at least one server;
determining if a current encryption algorithm is the same as or compatible with the common encryption algorithm used to encrypt the mark and if a user-provided encryption key is the same as the common encryption key used to encrypt the mark, wherein the determining step comprises decrypting the encrypted mark using the current encryption algorithm and a user-provided encryption key, presenting the resulted mark to the first user on the client computer, and accepting a confirmation of the first user;
generating an uploading form by one of the at least one server for uploading a file as a current file, wherein the uploading form supports file encryption using the common encryption key, one user-provided encryption key, or two user-provided encryption keys;
encrypting the current file by using the current encryption algorithm, which has been determined to be compatible with the common encryption algorithm used to encrypt the mark, and the common encryption key, one user-provided encryption key, or two user-provided encryption keys;
uploading the current file from the client computer of the first user to the at least one server after the file is encrypted on a client computer or uploading the current file from the client computer to the at least one server before the file is encrypted on one of the at least one server;
saving the uploaded and encrypted file along together with file-tracking information for the first user on the at least one server;
sending a file summary page to the client computer of the first user to display file-tracking information about the files in the safe of the first user, wherein the file-tracking information comprises at least two data fields selected from the group consisting of a file number, information about an encryption method, an encryption key hint, a file descriptions, uploading time and file size;
displaying any of the files, stored in the safe of the first user on the client computer; and
generating a file-downloading page for a file, wherein the file downloading page indicates the use of the common encryption key or contains containing one or two input boxes for accepting one or two encryption keys for the file;
downloading and decrypting the file in the steps of: from one of the at least one server to the client computer of the first user, getting a common encryption key from the client computer or obtaining one user-provided key or two user-provided encryption keys, decrypting the downloaded file using the obtained common encryption key, the one user-provided key or the two user-provided encryption keys, and saving the decrypted file on the client computer.

11. The method of claim 10, wherein downloading and decrypting steps, as modified as a result of selecting a server as an encryption machine, comprise obtaining a common encryption key from the client computer or obtaining one user-provided encryption key or two user-provided encryption keys, decrypting the file on one of the at least one server using the common encryption algorithm and the obtained common key, the one user-provided encryption key, or the two user-provided encryption keys, downloading the decrypted file from the one of the at least one server to the client computer of the first user, and save the decrypted file on the client computer.

12. The method of claim 11, further comprising a step of authorizing the safe of the second user to retrieve an authenticity certificate for at least one of the files in the user safe of the first user or a step of sending the authenticity certificate to the second user by email.

13. The method of claim 11, further comprising sending a verification page for verifying the encrypted file, prompting the first user to enter one or two encryption keys, sending the encryption keys to the at least one server and decrypting the uploaded file on the at least one server by using the received encryption keys, downloading the decrypted file to the client computer of the first user for inspection, and marking the uploaded file as a verified file upon successful verification feedback.

14. The method of claim 10, further comprising allowing the first user to get an authenticity certificate for any of the encrypted files in the safe of the first user, wherein the authenticity certificate contains at least two of file uploading time, file size, and file description.

15. The method of claim 10, granting right of access to at least one file in the safe of the first user to a safe of a second user, and enabling the second user to access the at least one file of the first user; decrypt the at least one file, and download the at least one file to the client computer of the second user.

16. The method of claim 10, further comprising steps of encrypting a copy of the mark by using an account password, saving the encrypted mark, as a reference mark on the at least one server at the time of creating the encrypted mark, and steps of decrypting the reference mark using the current encryption algorithm and the account password to yield a second resulted mark, and comparing the first resulted mark from decrypting the encrypted mark with the second resulted mark from decrypting the reference mark to determine if the current encryption algorithm is compatible with the common encryption algorithm.

17. The method of claim 10 wherein the uploading form contains an input box for accepting a hint for each of the one or two encryption keys and the file-downloading page displays each hint that has been entered for each of the encryption keys and has been saved on the at least one server.

18. The method of claim 10, further comprising a step of ordering by the second user hard copy files granted to the second user, together with an authenticity certificate showing file descriptions, uploading times, and file sizes.

19. A computer program product for use in operating a file storage system comprising a server and at least one client computer, the computer program product comprising a non-transitory computer usable medium having computer readable code embodied on the medium, the computer program code further comprising:
program code for creating a user account or a safe, the user account or the safe being identified by a safe name or an account number in the file storage system;
program code for encrypting a mark with an encryption algorithm as a current encryption algorithm and an encryption key as a common encryption key, and saving the encrypted mark on the server;
program code for determining if a current encryption algorithm is the same as or compatible with the common encryption algorithm used to encrypt the mark and if an encryption key is the same as the common encryption key used to encrypt the mark, wherein the program code further comprises code for decrypting the encrypted mark using the current encryption algorithm and a user-provided encryption key presenting the resulted mark to a first user on a client computer, and accepting a confirmation of the first user or a confirmation of the client computer;
program code for generating a file-uploading form on the server to be rendered on the client computer;
program code for uploading a file from the client computer to a database table or a folder for the first user on a server;
program code for encrypting a file on the server or on the client computer by using the current encryption algorithm that has been determined to be compatible with the common encryption algorithm used to encrypt the mark using one or two encryption keys that the first user has provided;
program code for saving the uploaded file with file-tracking information on the server;
program code for sending a summary page for displaying files in the safe of the first user on the server; and
program code for generating a file-downloading page for accepting one or two encryption keys for a file by using the current encryption algorithm that has been determined to be compatible with the common encryption algorithm and the one or two encryption keys that the first user has provided, and downloading the decrypted file to the client computer of the first user.

20. A computer program product of claim 19, further comprising program code for using an encryption algorithm for decrypting standalone files that have been encrypted using the same algorithm and one or two user-provided encryption keys in uploading the files to the server.

21. A computer program product of claim 19, further comprising program code for setting up a client computer as an encryption machine, program code for creating a encrypted mark as a reference mark, and program code for determining if the current encryption algorithm on a client computer is compatible with the common encryption algorithm used in creating the encrypted mark and the reference mark.

22. A computer program product of claim 19, further comprising program code for sending a verification page for testing a newly uploaded file; wherein the testing process comprises prompting the first user to enter one or two encryption keys or no encryption key on the verification page, submitting the verification page to the server, decrypting the file on the server using a common encryption algorithm and one or two user-provided keys, downloading the decrypted file to the client computer of the first user for inspection, prompting the first user to indicate if the file is good, and marking the uploaded file as a verified file; or the testing process comprises prompting the first user to provide one or two encryption keys or no key on the verification page, downloading the file from the server to the client computer, obtaining a common encryption key from the client computer or one or two user provided encryption keys, decrypting the file on the client computer, prompting the first user to indicate if the file is good, and marking the file as a verified file.

23. A computer program product of claim 19, further comprising program code for granting right of access to at least one file of the first user to a safe of a second user and program code for decrypting the file by the second user by using a common encryption algorithm and one or two encryption keys, and downloading the at least one file to the client computer of the second user.

* * * * *